US010659812B2

(12) United States Patent
Jin et al.

(10) Patent No.: US 10,659,812 B2
(45) Date of Patent: May 19, 2020

(54) METHOD AND DEVICE FOR VIDEO DECODING AND METHOD AND DEVICE FOR VIDEO ENCODING

(71) Applicant: SAMSUNG ELECTRONICS CO., LTD., Suwon-si (KR)

(72) Inventors: Bo-ra Jin, Yongin-si (KR); Min-woo Park, Yongin-si (KR); Chan-yul Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 15/777,512

(22) PCT Filed: Nov. 24, 2016

(86) PCT No.: PCT/KR2016/013589
§ 371 (c)(1),
(2) Date: May 18, 2018

(87) PCT Pub. No.: WO2017/090993
PCT Pub. Date: Jun. 1, 2017

(65) Prior Publication Data
US 2018/0343469 A1 Nov. 29, 2018

Related U.S. Application Data

(60) Provisional application No. 62/259,173, filed on Nov. 24, 2015.

(51) Int. Cl.
H04N 19/59 (2014.01)
H04N 19/593 (2014.01)
(Continued)

(52) U.S. Cl.
CPC ........... *H04N 19/59* (2014.11); *H04N 19/105* (2014.11); *H04N 19/11* (2014.11); *H04N 19/117* (2014.11);
(Continued)

(58) Field of Classification Search
CPC ...... H04N 19/59; H04N 19/82; H04N 19/593; H04N 19/80; H04N 19/132; H04N 19/11;
(Continued)

(56) References Cited

U.S. PATENT DOCUMENTS 8,665,950 B2    3/2014  Min et al.
9,615,105 B2    4/2017  Park
(Continued)

FOREIGN PATENT DOCUMENTS

EP    2 770 739 A1    8/2014
KR    1020130045149 A    5/2013
(Continued)

OTHER PUBLICATIONS

International Search Report and Written Opinion (PCT/ISA/210 and PCT/ISA/237), dated Mar. 15, 2017 by International Searching Authority in International Application No. PCT/KR2016/013589.
(Continued)

*Primary Examiner* — Allen C Wong
(74) *Attorney, Agent, or Firm* — Sughrue Mion, PLLC

(57) ABSTRACT

Provided is a video decoding method including obtaining, from a bitstream, information about a prediction mode of a current block; when the prediction mode of the current block is an intra mode, obtaining information about an intra prediction mode of the current block; obtaining a predicted sample value of the current block by using at least one sample that is from among samples included in an adjacent reference region of a plurality of lines and is located, from the current block, in an intra prediction direction indicated
(Continued)

by an intra prediction mode. The adjacent reference region of the plurality of lines may include a plurality of lines that are in a vertical direction and located at a left side of the current block, or a plurality of lines that are in a horizontal direction and located at an upper side of the current block.

15 Claims, 36 Drawing Sheets

(51) Int. Cl.
*H04N 19/46* (2014.01)
*H04N 19/105* (2014.01)
*H04N 19/11* (2014.01)
*H04N 19/117* (2014.01)
*H04N 19/80* (2014.01)
*H04N 19/132* (2014.01)
*H04N 19/176* (2014.01)
*H04N 19/82* (2014.01)

(52) U.S. Cl.
CPC ......... *H04N 19/132* (2014.11); *H04N 19/176* (2014.11); *H04N 19/46* (2014.11); *H04N 19/593* (2014.11); *H04N 19/80* (2014.11); *H04N 19/82* (2014.11)

(58) Field of Classification Search
CPC .... H04N 19/46; H04N 19/176; H04N 19/105; H04N 19/117
USPC .................................................. 375/240.12
See application file for complete search history.

(56) References Cited

U.S. PATENT DOCUMENTS

| | | | |
|---|---|---|---|
| 2009/0232207 A1 | 9/2009 | Chen | |
| 2013/0301709 A1* | 11/2013 | Lim | ..................... H04N 19/105 375/240.03 |
| 2014/0334542 A1* | 11/2014 | Lee | ..................... H04N 19/593 375/240.12 |
| 2018/0152713 A1 | 5/2018 | Jeong et al. | |
| 2018/0160112 A1 | 6/2018 | Gamei et al. | |

FOREIGN PATENT DOCUMENTS

| | | |
|---|---|---|
| KR | 1020140110808 A | 9/2014 |
| KR | 1020140124443 A | 10/2014 |
| KR | 1020140145606 A | 12/2014 |

OTHER PUBLICATIONS

Shohei Matsuo et al: "Extension of Intra Prediction Using Multiple Reference Lines", ITU-Telecommunications Standardization Sector, Study Group 16 Question 6, Video Coding Experts Group (VCEG), 32nd Meeting: San Jose, CA, USA, Apr. 20, 2017-Apr. 21, 2017, Document VCEG-AF05, Filename: VCEG-AF05.doc, XP030003526. (7 pages total).
Jani Lainema et al: "Intra Coding of the HEVC Standard", IEEE Transactions on Circuits and Systems for Video Technology, Institute of Electrical and Electronics Engineers, USA, vol. 22, No. 12, Dec. 1, 2012, pp. 1792-1801, XP011487148. (10 pages total).
Communication dated Jul. 4, 2018 by the European Patent Office in counterpart European Patent Application No. 16868889.3.

* cited by examiner

FIG. 20

| DEPTH \ BLOCK SHAPE | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... |

METHOD AND DEVICE FOR VIDEO DECODING AND METHOD AND DEVICE FOR VIDEO ENCODING

TECHNICAL FIELD

The present disclosure relates to a video decoding method and apparatus and a video encoding method and apparatus, and more particularly, to a video decoding method and apparatus and a video encoding method and apparatus, which perform intra prediction in an intra prediction mode.

BACKGROUND ART

With the development and supply of hardware capable of reproducing and storing high resolution or high definition image content, a necessity for a codec that effectively encodes or decodes the high resolution or high definition image content is increasing. According to an existing video codec, a video is encoded according to a limited encoding scheme based on coding units having a tree structure.

Image data in a spatial domain is transformed into coefficients in a frequency domain by using frequency transformation. To perform a fast calculation in the frequency transformation, a video codec partitions an image into blocks having a predetermined size, performs a discrete cosine transform (DCT) transformation on each of the blocks, and thus encodes frequency coefficients in each block unit. Compared to the image data in the spatial domain, the coefficients in the frequency domain are easily compressed. Because an image pixel value in the spatial domain is expressed as a prediction error via inter prediction or intra prediction by the video codec, when the frequency transformation is performed on prediction errors, much data may be transformed into 0. The video codec decreases an amount of data by changing data, which sequentially and repeatedly occurs, into small-size data.

DESCRIPTION OF EMBODIMENTS

Technical Problem

According to various embodiments, a value of a current block which is similar to a value of an original block may be predicted by performing intra prediction on the current block by using samples of an adjacent reference region of a plurality of lines located in an intra prediction direction of an intra prediction mode, therefore, encoding and decoding efficiency may be enhanced.

Provided is a computer-readable recording medium having recorded thereon a program for executing a method according to various embodiments.

The technical problems of various embodiments are not limited to the aforementioned features, and other unstated technical problems will be clearly understood by one of ordinary skill in the art in view of descriptions below.

Solution to Problem

The technical problems of the present disclosure are not limited to the aforementioned features, and other unstated technical problems will be clearly understood by one of ordinary skill in the art in view of descriptions below.

According to various embodiments, a video decoding method may include obtaining, from a bitstream, information about a prediction mode of a current block; when the prediction mode of the current block is an intra mode, obtaining information about an intra prediction mode of the current block; obtaining a predicted sample value of the current block by using at least one sample that is from among samples included in an adjacent reference region of a plurality of lines and is located, from the current block, in an intra prediction direction indicated by an intra prediction mode, wherein the adjacent reference region of the plurality of lines includes a plurality of lines that are in a vertical direction and located at a left side of the current block, or a plurality of lines that are in a horizontal direction and located at an upper side of the current block.

When the intra prediction direction indicates an omni-direction based on a direct current (DC) mode, the obtaining of the predicted sample value of the current block may include calculating an average value of samples included in the adjacent reference region of the plurality of lines at the left side or the upper side of the current block; and obtaining the predicted sample value of the current block by using the calculated average value of the samples.

The adjacent reference region of the plurality of lines may be a reference region of N left lines or N upper lines (where N is an integer equal to or greater than 1) adjacent to an upper left corner of the current block, and N may be determined based on a size of the current block.

The calculating of the average value of the samples may include calculating an average value of samples included in an adjacent reference region of an available left line or an available upper line, based on whether a left line or an upper line located adjacent to the current block is available.

The video decoding method may further include determining whether to obtain the predicted sample value of the current block by using an adjacent reference region of one line adjacent to the current block or whether to obtain the predicted sample value of the current block by using the adjacent reference region of the plurality of lines located adjacent to the current block, wherein the obtaining of the predicted sample value of the current block includes, when it is determined to obtain the predicted sample value of the current block by using the adjacent reference region of the plurality of lines located adjacent to the current block, obtaining the predicted sample value of the current block by using the at least one sample that is from among the samples included in the adjacent reference region of the plurality of lines and is located, from the current block, in the intra prediction direction indicated by the intra prediction mode.

When the intra prediction direction is a prediction direction based on a planar mode, the obtaining of the predicted sample value of the current block may include performing filtering on a plurality of first adjacent samples that are located in a horizontal direction from a first adjacent sample adjacent to a left corner of the current block; performing filtering on a plurality of second adjacent samples that are located in a vertical direction from a second adjacent sample adjacent to an upper corner of the current block; and obtaining the predicted sample value of the current block, based on the plurality of filtered first adjacent samples and the plurality of filtered second adjacent samples.

When the intra prediction direction is a specific direction based on a specific-angle directional mode, the obtaining of the predicted sample value of the current block may include obtaining the predicted sample value of the current block by using at least one of a plurality of first adjacent samples that are located in the specific direction from a first adjacent sample adjacent to a left corner or an upper corner of the current block.

The obtaining of the predicted sample value of the current block by using the at least one of the plurality of first adjacent samples that are located in the specific direction from the first adjacent sample adjacent to the left corner or the upper corner of the current block may include performing filtering on the plurality of first adjacent samples that are located in the specific direction from the first adjacent sample adjacent to the left corner or the upper corner of the current block; and obtaining the predicted sample value of the current block, based on the plurality of filtered first adjacent samples, and the performing of the filtering may include, when an extension line extending in the specific direction from the first adjacent sample adjacent to the left corner or the upper corner passes through a fractional sample location, calculating a weighted average value of adjacent integer samples, based on distances between the fractional sample location and locations of adjacent integer samples.

When the intra prediction direction is a specific direction based on a specific-angle directional mode, and when an angle in the specific direction from the horizontal direction is greater than an angle in a 45-degree direction from the horizontal direction and is less than an angle in a vertical direction, the obtaining of the predicted sample value of the current block may include performing filtering on a plurality of first adjacent samples located in the specific direction from a first adjacent sample adjacent to an extension line extending in the horizontal direction from an upper corner of the current block; and obtaining the predicted sample value of the current block according to the specific direction by using the plurality of filtered first adjacent samples.

When the intra prediction direction is a specific direction based on a specific-angle directional mode, and when an angle in the specific direction from the horizontal direction is less than an angle in a 45-degree direction from the horizontal direction, the obtaining of the predicted sample value of the current block may include performing filtering on a plurality of first adjacent samples located in the specific direction from a first adjacent sample adjacent to an extension line extending in the vertical direction from a left corner of the current block; and obtaining the predicted sample value of the current block according to the specific direction by using the plurality of filtered first adjacent samples.

The obtaining of the predicted sample value of the current block may include performing filtering on the plurality of first adjacent samples by varying a weight depending on a distance between the current block and each of samples included in the plurality of first adjacent samples; and obtaining the predicted sample value of the current block, based on the plurality of filtered first adjacent samples.

The obtaining of the predicted sample value of the current block may include selecting an adjacent sample from among the plurality of first adjacent samples that are distant from the current block; and obtaining the predicted sample value of the current block by using a value of the selected adjacent sample.

The obtaining of the predicted sample value of the current block may include selecting a filtering method from among a plurality of filtering methods; performing, based on the selected filtering method, filtering on at least one sample that is from among the samples included in the adjacent reference region of the plurality of lines and is located, from the current block, in the intra prediction direction indicated by the intra prediction mode; and obtaining the predicted sample value of the current block, based on the filtered at least one sample.

According to various embodiments, a video decoding apparatus includes an obtainer configured to obtain, from a bitstream, information about a prediction mode of a current block, and when the prediction mode of the current block is an intra mode, to obtain information about an intra prediction mode of the current block; and an intra predictor configured to obtain a predicted sample value of the current block by using at least one sample that is from among samples included in an adjacent reference region of a plurality of lines and is located, from the current block, in an intra prediction direction indicated by an intra prediction mode, wherein the adjacent reference region of the plurality of lines includes a plurality of lines that are in a vertical direction and located at a left side of the current block, or a plurality of lines that are in a horizontal direction and located at an upper side of the current block.

According to various embodiments, a video encoding method includes obtaining a predicted sample value of a current block by using at least one sample that is from among samples included in an adjacent reference region of a plurality of lines and is located, from the current block, in an intra prediction direction indicated by an intra prediction mode of the current block; encoding the current block by using the predicted sample value; and generating a bitstream including information about the intra prediction mode of the current block and information about the encoded current block, wherein the adjacent reference region of the plurality of lines includes a plurality of lines that are in a vertical direction and located at a left side of the current block, or a plurality of lines that are in a horizontal direction and located at an upper side of the current block.

According to various embodiments, a video encoding apparatus includes an intra predictor configured to obtain a predicted sample value of a current block by using at least one sample that is from among samples included in an adjacent reference region of a plurality of lines and is located, from the current block, in an intra prediction direction indicated by an intra prediction mode of the current block; and a bitstream generator configured to encode the current block by using the predicted sample value, and to generate a bitstream including information about the intra prediction mode of the current block and information about the encoded current block, wherein the adjacent reference region of the plurality of lines includes a plurality of lines that are in a vertical direction and located at a left side of the current block, or a plurality of lines that are in a horizontal direction and located at an upper side of the current block.

According to various embodiments, a non-transitory computer-readable recording medium includes a recorded program for executing the video encoding and decoding methods.

Advantageous Effects of Disclosure

According to various embodiments, a value of a current block which is similar to a value of an original block may be predicted by performing intra prediction on the current block by using samples of an adjacent reference region of a plurality of lines located in an intra prediction direction of an intra prediction mode, therefore, encoding and decoding efficiency may be enhanced. In particular, it is possible to predict the value of the current block which is similar to the value of the original block by using a plurality of samples included in an adjacent region of the plurality of lines.

BRIEF DESCRIPTION OF DRAWINGS

FIG. 20 illustrates an operation of determining a depth of a coding unit as the shape and size of the coding unit varies when a plurality of coding units are determined by recursively partitioning the coding unit, according to an embodiment.

BEST MODE

Figure 1A:
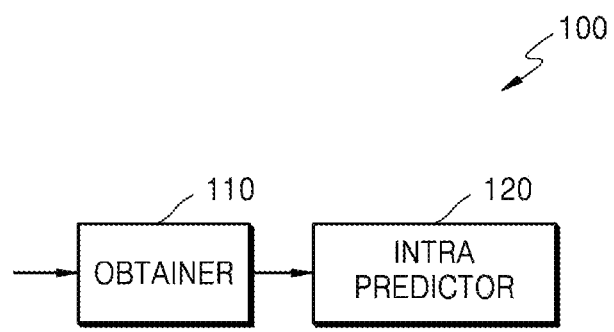
FIG. 1A illustrates a block diagram of a video decoding apparatus, according to various embodiments.

According to various embodiments, a video decoding method includes obtaining, from a bitstream, information about a prediction mode of a current block; when the prediction mode of the current block is an intra mode, obtaining information about an intra prediction mode of the current block; obtaining a predicted sample value of the current block by using at least one sample that is from among samples included in an adjacent reference region of a plurality of lines and is located, from the current block, in an intra prediction direction indicated by an intra prediction mode, wherein the adjacent reference region of the plurality of lines includes a plurality of lines that are in a vertical direction and located at a left side of the current block, or a plurality of lines that are in a horizontal direction and located at an upper side of the current block.

According to various embodiments, a video decoding apparatus includes an obtainer configured to obtain, from a bitstream, information about a prediction mode of a current block, and when the prediction mode of the current block is an intra mode, to obtain information about an intra prediction mode of the current block; and an intra predictor configured to obtain a predicted sample value of the current block by using at least one sample that is from among samples included in an adjacent reference region of a plurality of lines and is located, from the current block, in an intra prediction direction indicated by an intra prediction mode, wherein the adjacent reference region of the plurality of lines includes a plurality of lines that are in a vertical direction and located at a left side of the current block, or a plurality of lines that are in a horizontal direction and located at an upper side of the current block.

According to various embodiments, a video encoding method includes obtaining a predicted sample value of a current block by using at least one sample that is from among samples included in an adjacent reference region of a plurality of lines and is located, from the current block, in an intra prediction direction indicated by an intra prediction mode of the current block; encoding the current block by using the predicted sample value; and generating a bitstream including information about the intra prediction mode of the current block and information about the encoded current block, wherein the adjacent reference region of the plurality of lines includes a plurality of lines that are in a vertical direction and located at a left side of the current block, or a plurality of lines that are in a horizontal direction and located at an upper side of the current block.

According to various embodiments, a video encoding apparatus includes an intra predictor configured to obtain a predicted sample value of a current block by using at least one sample that is from among samples included in an adjacent reference region of a plurality of lines and is located, from the current block, in an intra prediction direction indicated by an intra prediction mode of the current block; and a bitstream generator configured to encode the current block by using the predicted sample value, and to generate a bitstream including information about the intra prediction mode of the current block and information about the encoded current block, wherein the adjacent reference region of the plurality of lines includes a plurality of lines that are in a vertical direction and located at a left side of the current block, or a plurality of lines that are in a horizontal direction and located at an upper side of the current block.

According to various embodiments, a non-transitory computer-readable recording medium includes a recorded program for executing the video encoding and decoding methods.

MODE OF DISCLOSURE

Hereinafter, an "image" may indicate a still image of a video or may indicate a moving picture that is the video itself.

Hereinafter, a "sample" may refer to data that is allocated to a sampling location of an image and is a processing target. For example, pixels in an image of a spatial domain may be samples.

Hereinafter, a "current block" may refer to a block of an image which is to be encoded or decoded.

FIG. 1A illustrates a block diagram of a video decoding apparatus, according to various embodiments.

A video decoding apparatus 100 according to various embodiments includes an obtainer 110 and an intra predictor 120.

The obtainer 110 may obtain, from a bitstream, information about a prediction mode of a current block. For example, the prediction mode of the current block may be an intra mode or an inter mode. The intra mode refers to a mode of generating a predicted sample value of the current block by using a sample value of an adjacent block of the current block, the adjacent block being from among blocks of a current picture which was previously decoded, and the inter mode refers to a mode of generating a predicted sample value of the current block by using a sample value of a reference block of at least one reference picture which is different from the current picture.

When the information about the prediction mode of the current block indicates the intra mode, the obtainer 110 may obtain information about an intra prediction mode of the current block.

For example, the intra prediction mode of the current block may be one of a direct current (DC) mode, a planar mode, and a specific-angle directional mode. The DC mode refers to a mode of generating a predicted sample value of samples included in the current block by using a sample value of an adjacent reference region. In this regard, an intra prediction direction in the DC mode may be an omni-direction. That is, the predicted sample value of the current block may be generated by using samples of an adjacent reference region located at a left side or an upper side of the current block. The planar mode may refer to a mode of generating a predicted sample value of a current sample by using a first reference sample located in a left direction of the current sample included in the current block, a second reference sample located in an up direction of the current sample, a third reference sample located in a direction toward, from the current sample, a lower left corner of the current block, and a fourth reference sample located in a direction toward, from the current sample, an upper right corner of the current block. The specific-angle directional mode may refer to a mode of generating a predicted sample value of the current sample by using a reference sample located in a direction by a specific angle from the current sample. The specific-angle directional mode may also be referred to as an angular mode.

When the prediction mode of the current block is the intra mode, the intra predictor 120 may perform intra prediction on the current block, based on the intra prediction mode of the current block.

The intra predictor 120 may obtain the predicted sample value of the current block by using a reference sample located in an intra prediction direction indicated by the intra prediction mode of the current block. For example, the intra predictor 120 may obtain the predicted sample value of the current block by using at least one sample that is from among samples included in an adjacent reference region of a plurality of lines and is located, from the current block, in the intra prediction direction indicated by the intra prediction mode.

In this regard, the adjacent reference region of the plurality of lines may refer to a region including a plurality of lines that are in a vertical direction and located at a left side of the current block or a region including a plurality of lines that are in a horizontal direction and located at an upper side of the current block. Because a region located at a right side or a lower side of the current block may be decoded after the current block, the intra predictor 120 may use, as the adjacent reference region, a region of samples located in the region at the left side or the upper side, the region having a high probability that decoding occurs prior to the current block.

A portion of the adjacent reference region which is located at the left side or the upper side may not have been decoded or may not be available because the portion is apart from a boundary of a picture. In this case, the intra predictor 120 may determine a sample value of a sample in an unavailable region by using a sample value of an adjacent available sample, and may perform the intra prediction on the current block by using the determined sample value of the sample in the unavailable region and the sample value of the adjacent available sample. However, the present disclosure is not limited thereto, and in a case where an unavailable sample exists, the intra predictor 120 may perform the intra prediction on the current block by using only available samples, except for the unavailable sample.

The obtainer 110 may obtain, from the bitstream, a first flag with respect to an upper data unit including the current block. The first flag may be a flag that indicates whether to obtain a predicted sample value of lower data units included in the upper data unit by using at least one sample located in the intra prediction direction from the lower data units. The at least one sample located in the intra prediction direction from the lower data units may be at least one from among samples included in the adjacent reference region of the plurality of lines.

When the first flag indicates to obtain the predicted sample value of the lower data units by using the at least one sample located in the intra prediction direction from the lower data units, the obtainer 110 may obtain, from the bitstream, a second flag with respect to the current block. In this regard, the second flag may be a flag indicating whether to obtain the predicted sample value of the current block by using at least one sample that is located in an intra prediction direction from the current block and is from among the samples included in the adjacent reference region of the plurality of lines.

When the second flag indicates to obtain the predicted sample value of the current block by using at least one sample that is located in the intra prediction direction from the current block and is from among the samples included in the adjacent reference region of the plurality of lines, the intra predictor 120 may obtain the predicted sample value of the current block by using a reference sample located in the intra prediction direction indicated by the intra prediction mode of the current block. For example, the upper data unit including the current block may be a coding unit, and the current block may be a transform unit.

When a size of the current block satisfies a predetermined condition, the intra predictor 120 may obtain the predicted sample value of the current block by using the at least one sample that is located in the intra prediction direction from the current block and is from among the samples included in the adjacent reference region of the plurality of lines. In this regard, the predetermined condition may be a condition about whether the size of the current block is larger than 4×4, or may be a condition about whether the size of the current block is 8×4 or 4×8.

In addition, when a partition type about the current block corresponds to a predetermined partition type, the intra predictor 120 may obtain the predicted sample value of the current block by using the at least one sample that is located in the intra prediction direction from the current block and is from among the samples included in the adjacent reference region of the plurality of lines. In this regard, the predetermined partition type may be 2N×2N.

That is, the current block may be a transform unit, and the partition type about the current block may be a partition type of a prediction unit including the current block.

The intra predictor 120 may perform filtering on blocks in the periphery of an edge, based on a quantization parameter of the blocks around the edge, the blocks being from among adjacent blocks of the current block, and then may obtain the predicted sample value of the current block by using the at least one sample that is located in the intra prediction direction from the current block and is from among the samples included in the adjacent reference region of the plurality of lines.

However, the present disclosure is not limited thereto, and the intra predictor 120 may not perform filtering on the blocks in the periphery of the edge, based on the quantization parameter of the blocks in the periphery of the edge, the blocks being from among the adjacent blocks of the current block, and may obtain the predicted sample value of the current block by using the at least one sample that is located in the intra prediction direction from the current block and is from among the samples included in the adjacent reference region of the plurality of lines. Because filtering based on a quantization parameter does not consider the intra prediction direction, when intra prediction is performed by using a value obtained by performing filtering based on the quantization parameter, a prediction error may be increased.

When the intra prediction direction indicates the omni-direction by the DC mode, the intra predictor 120 may obtain a predicted sample value of the current block by using samples included in a reference region of a plurality of lines at a left side or an upper side of the current block. For example, the intra predictor 120 may calculate an average value of the samples included in the reference region of the plurality of lines at the left side or the upper side of the current block, and may obtain a predicted sample value of samples included in the current block by using the calculated average value of the samples. In this regard, the reference region of the plurality of lines may be a reference region of N left lines located in the periphery of a left corner of the current block, or may be a reference region of N upper lines located in the periphery of an upper corner of the current block. In this regard, N may be an integer greater than 1. In addition, a "line" may refer to a region including a plurality of samples in a horizontal direction or a vertical direction.

N may be determined based on a size of the current block. For example, when the size of the current block is X×Y (where, X and Y are each an integer), N may be determined based on X and Y. The reference region of the N left lines may be a reference block of N×N (where, N is an integer greater than 1) located at the left side of the current block. The reference region of the N upper lines may be a reference block of N×N (where, N is an integer greater than 1) located at the upper side of the current block.

However, the present disclosure is not limited thereto, and N may be determined based on at least one of the size of the current block, the intra prediction direction of the current block, the intra prediction mode of the current block, adjacent coding information, a characteristic of an adjacent image, a user input, and computational complexity.

Information about N may be signalled by at least one of a block unit, a slice unit, a picture unit, a sequence unit, and a video unit. For example, the information about N may be signalled by the picture unit, and in addition, the information about N may be signalled by the slice unit, thus, N may be determined by using the information about N which is signalled by the picture unit and the slice unit.

The intra predictor 120 may obtain the predicted sample value of the current block by using a sample value of an available left line or an available upper line, based on whether a left line or an upper line located in the periphery of the current block is available. For example, in a case where a block included in the left line located in the periphery of the current block is available, and a block included in the upper line located in the periphery of the current block is not available, the intra predictor 120 may obtain the predicted sample value of the current block by using a sample value of the block included in the left line.

However, the intra predictor 120 is not limited to obtaining the predicted sample value of the current block by using the reference region of the plurality of lines located in the periphery of the current block, and may obtain the predicted sample value of the current block by selectively using a reference region of a line adjacent to the current block. For example, the intra predictor 120 may determine whether to obtain the predicted sample value of the current block by using the reference region of the line adjacent to the current block, or whether to obtain the predicted sample value of the current block by using the reference region of the plurality of lines located in the periphery of the current block. For example, the obtainer 110 may obtain, from the bitstream, a flag indicating whether to obtain the predicted sample value of the current block by using the reference region of the line adjacent to the current block or whether to obtain the predicted sample value of the current block by using the reference region of the plurality of lines located in the periphery of the current block, and may determine to obtain the predicted sample value of the current block by using the reference region of the plurality of lines located in the periphery of the current block, based on the flag.

When it is determined that the predicted sample value of the current block is obtained by using the reference region of the plurality of lines located in the periphery of the current block, the intra predictor 120 may obtain the predicted sample value of the current block by using the at least one sample that is located in the intra prediction direction from the current block and is from among the samples included in the adjacent reference region of the plurality of lines, wherein the intra prediction direction is indicated by the intra prediction mode.

When the intra prediction direction is a direction based on the planar mode, the intra predictor 120 may obtain the predicted sample value of the current block by using a plurality of first adjacent samples and a plurality of second adjacent samples, wherein the plurality of first adjacent samples are located in a horizontal direction from a first adjacent sample adjacent to a left corner of the current block, and the plurality of second adjacent samples are located in a vertical direction from a second adjacent sample adjacent to an upper corner of the current block.

When the intra prediction direction is a specific direction based on the specific-angle directional mode, the intra predictor 120 may obtain the predicted sample value of the current block according to the specific direction by using at least one of a plurality of first adjacent samples located in the specific direction from a first adjacent sample adjacent to a left corner or an upper corner of the current block. In more detail, when the intra prediction direction is the specific direction based on the specific-angle directional mode, the intra predictor 120 may perform filtering on the plurality of first adjacent samples located in the specific direction from the first adjacent sample adjacent to the left corner or the upper corner of the current block, and may obtain the predicted sample value of the current block, based on a value of the plurality of filtered first adjacent samples. In a case where, when filtering is performed, an extension line extending in the specific direction from the first adjacent sample adjacent to the left corner or the upper corner passes through a fractional sample location, a weighted average value of adjacent integer samples may be calculated based on a distance between the fractional sample location and locations of the adjacent integer samples.

Hereinafter, a case in which the intra predictor 120 obtains the predicted sample value of the current block when the intra prediction direction with respect to the current block is the specific direction based on the specific-angle directional mode and is a direction with a specific angle close to a vertical direction will be described.

In a case where the intra prediction direction is the specific direction based on the specific-angle directional mode, and an angle in the specific direction from a horizontal direction is greater than an angle in a 45-degree direction from the horizontal direction and is less than an angle in the vertical direction (i.e., 90 degrees) from the horizontal direction, the intra predictor 120 may perform filtering on a plurality of first adjacent samples located in the specific direction from a first adjacent sample adjacent to an upper corner of the current block or adjacent to an extension line extending in the horizontal direction from the upper corner, and may obtain the predicted sample value of the current block according to the specific direction by using values of the plurality of filtered first adjacent samples.

Hereinafter, a case in which the intra predictor 120 obtains the predicted sample value of the current block when the intra prediction direction with respect to the current block is the specific direction based on the specific-angle directional mode and is a direction with a specific angle close to a horizontal direction will be described.

In a case where the intra prediction direction is the specific direction based on the specific-angle directional mode, and an angle in the specific direction from the horizontal direction is less than an angle in a 45-degree direction from the horizontal direction, the intra predictor 120 may perform filtering on a plurality of first adjacent samples located in the specific direction from a first adjacent sample adjacent to a left corner of the current block or adjacent to an extension line extending in a vertical direction from the left corner. The intra predictor 120 may obtain the predicted sample value of the current block according to the specific direction by using a value of the plurality of filtered first adjacent samples.

The intra predictor 120 may perform filtering on the plurality of first adjacent samples by varying a weight depending on a distance between the current block and each of samples included in the plurality of first adjacent samples.

Alternatively, the intra predictor 120 may perform filtering on the plurality of first adjacent samples by varying a weight depending on a difference between values of the samples included in the plurality of first adjacent samples.

The intra predictor 120 may select one adjacent sample from among the plurality of first adjacent samples, and may obtain the predicted sample value of the current block by using a value of the selected one adjacent sample. For example, the obtainer 110 may obtain, from the bitstream, an index indicating the one adjacent sample from among the plurality of first adjacent samples, and the intra predictor 120 may select, based on the index, the one adjacent sample from among the plurality of first adjacent samples.

The intra predictor 120 may select a filtering method from among a plurality of filtering methods, may perform, based on the selected filtering method, filtering on at least one sample that is from among the samples included in the adjacent reference region of the plurality of lines and is located in the intra prediction direction from the current block, wherein the intra prediction direction is indicated by the intra prediction mode, and may obtain the predicted sample value of the current block, based on a value of the filtered at least one sample.

The video decoding apparatus 100 may obtain, from the bitstream, information about a residual signal of the current block, and may generate a residual block of the current block by decoding the information about the residual signal of the current block.

The video decoding apparatus 100 may reconstruct the current block by using the predicted sample value of the current block and a residual sample value of the residual block. That is, a reconstructed block of the current block may be generated.

The video decoding apparatus 100 may include an image decoder (not shown), and the image decoder (not shown) may include the obtainer 110 and the intra predictor 120. The image decoder will be described with reference to FIG. 2.

Figure 1B:
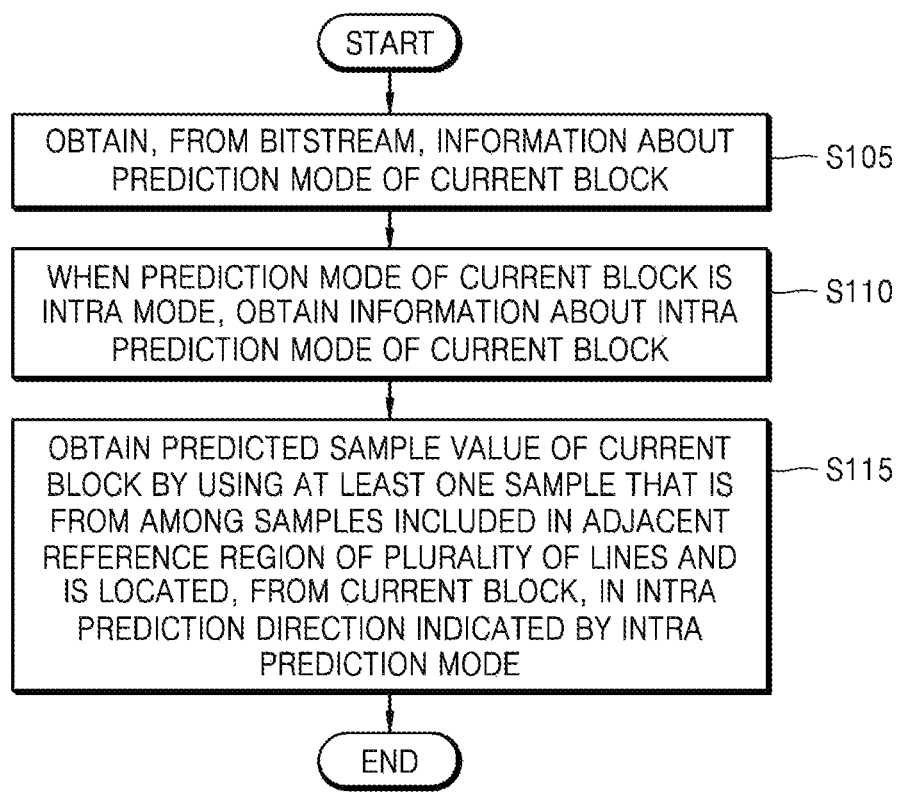
FIG. 1B illustrates a flowchart of a video decoding method, according to various embodiments.

FIG. 1B illustrates a flowchart of a video decoding method, according to various embodiments.

In operation S105, the video decoding apparatus 100 may obtain, from a bitstream, information about a prediction mode of a current block.

In operation S110, when the prediction mode of the current block is an intra mode, the video decoding apparatus 100 may obtain information about an intra prediction mode of the current block.

In operation S115, the video decoding apparatus 100 may obtain a predicted sample value of the current block by using at least one sample that is from among samples included in an adjacent reference region of a plurality of lines and is located, from the current block, in an intra prediction direction indicated by the intra prediction mode.

The video decoding apparatus 100 may obtain, from the bitstream, a residual signal of the current block, and may reconstruct the current block by using the residual signal of the current block and the predicted sample value of the current block. That is, the video decoding apparatus 100 may generate a reconstructed sample value of the current block by summing a residual sample value of the current block and the predicted sample value of the current block, the residual sample value of the current block being indicated by the residual signal of the current block.

Figure 1C:
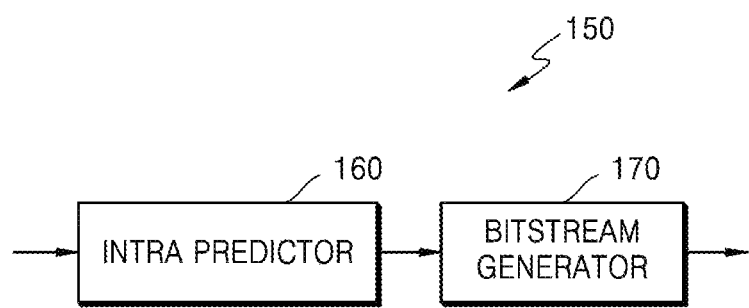
FIG. 1C illustrates a block diagram of a video encoding apparatus, according to various embodiments.

FIG. 1C illustrates a block diagram of a video encoding apparatus, according to various embodiments.

A video encoding apparatus 150 according to various embodiments includes an intra predictor 160 and a bitstream generator 170.

The intra predictor 160 may obtain a predicted sample value of a current block by using at least one sample that is from among samples included in an adjacent reference region of a plurality of lines and is located, from the current block, in an intra prediction direction indicated by an intra prediction mode. In this regard, the adjacent reference region of the plurality of lines may refer to a region including a plurality of lines located at a left side of the current block or a region including a plurality of lines located at an upper side of the current block.

There may be an unavailable sample in the adjacent reference region. In this case, the intra predictor 160 may determine a sample value of the unavailable sample by using a sample value of an adjacent available sample, and may perform intra prediction on the current block by using the determined sample value of the unavailable sample and the sample value of the adjacent available sample. However, the present disclosure is not limited thereto, and when the unavailable sample exists, the intra predictor 160 may perform the intra prediction on the current block by using only available samples, except for the unavailable sample.

When the intra prediction is performed on the current block according to a DC mode, the intra predictor 160 may obtain a predicted sample value of the current block by using samples included in a reference region of a plurality of lines in a left side or an upper side of the current block in an omni-direction that is an intra prediction direction based on the DC mode.

For example, the intra predictor 160 may calculate an average value of the samples included in the reference region of the plurality of lines in the left side or the upper side of the current block, and may obtain a predicted sample value of samples included in the current block by using the calculated average value of the samples. In this regard, the reference region of the plurality of lines may be a reference region of N left lines located in the periphery of a left corner of the current block, or may be a reference region of N upper lines located in the periphery of an upper corner of the current block. In this regard, N may be an integer greater than 1.

N may be determined based on a size of the current block. For example, when the size of the current block is X×Y (where, X and Y are each an integer), N may be determined based on X and Y. The reference region of the N left lines may be a reference block of N×N (where, N is an integer greater than 1) located at the left side of the current block. The reference region of the N upper lines may be a reference block of N×N (where, N is an integer greater than 1) located at the upper side of the current block.

In addition, N may be determined based on at least one of the size of the current block, the intra prediction direction of the current block, the intra prediction mode of the current block, adjacent coding information, a characteristic of an adjacent image, a user input, and computational complexity.

Information about N may be signalled by at least one of a block unit, a slice unit, a picture unit, a sequence unit, and a video unit. For example, the information about N may be signalled by the picture unit, and in addition, the information about N may be signalled by the slice unit, thus, N may be determined by using the information about N which is signalled by the picture unit and the slice unit.

The intra predictor 160 may obtain the predicted sample value of the current block by using a sample value of an available left line or an available upper line, based on whether a left line or an upper line located in the periphery of the current block is available. For example, in a case where a block included in the left line located in the periphery of the current block is available, and a block included in the upper line located in the periphery of the current block is not available, the intra predictor 160 may obtain the predicted sample value of the current block by using a sample value of the block included in the left line.

However, the intra predictor 160 is not limited to obtaining the predicted sample value of the current block by using the reference region of the plurality of lines located in the periphery of the current block, and may obtain the predicted sample value of the current block by selectively using a reference region of a line adjacent to the current block.

The intra predictor 160 may obtain the predicted sample value of the current block by using the at least one sample that is from among the samples included in the adjacent reference region of the plurality of lines and is located, from the current block, in the intra prediction direction indicated by the intra prediction mode. The current block may be encoded based on the predicted sample value of the current block. The intra predictor 160 may obtain a predicted sample value of the current block by using a reference region of an adjacent line in the periphery of the current block. The current block may be encoded based on the predicted sample value of the current block.

The video encoding apparatus 150 may compare the encoding results of both cases and then may determine whether the predicted sample value of the current block is obtained by using the reference region of the adjacent line in the periphery of the current block, or whether the predicted sample value of the current block is obtained by using the reference region of the plurality of lines located in the periphery of the current block.

In a case where the intra prediction mode of the current block is a planar mode, the intra prediction direction may be a direction according to the planar mode, thus, the intra predictor 160 may obtain a predicted sample value of the current block by using a plurality of first adjacent samples and a plurality of second adjacent samples, wherein the plurality of first adjacent samples are located in a horizontal direction from a first adjacent sample adjacent to a left corner of the current block, and the plurality of second adjacent samples are located in a vertical direction from a second adjacent sample adjacent to an upper corner of the current block.

The intra prediction mode of the current block is a specific-angle directional mode, the intra prediction direction may be a specific direction based on the specific-angle directional mode, and the intra predictor 160 may obtain the predicted sample value of the current block by using at least one of a plurality of first adjacent samples located in the specific direction from a first adjacent sample adjacent to a left corner or an upper corner of the current block.

In more detail, when the intra prediction direction is the specific direction based on the specific-angle directional mode, the intra predictor 160 may perform filtering on the plurality of first adjacent samples located in the specific direction from the first adjacent sample adjacent to the left corner or the upper corner of the current block, and may obtain the predicted sample value of the current block, based on a value of the plurality of filtered first adjacent samples. In a case where, when filtering is performed, an extension line extending in the specific direction from the first adjacent sample adjacent to the left corner or the upper corner passes through a fractional sample location, the intra predictor 160 may calculate a weighted average value of adjacent integer samples, based on a distance between the fractional sample location and locations of the adjacent integer samples.

Hereinafter, a case in which the intra predictor 160 obtains the predicted sample value of the current block, when the intra prediction direction with respect to the current block is the specific direction based on the specific-angle directional mode and is a direction with a specific angle close to a vertical direction will be described.

In a case where the intra prediction direction is the specific direction based on the specific-angle directional mode, and an angle in the specific direction from a horizontal direction is greater than an angle in a 45-degree direction from the horizontal direction and is less than an angle in the vertical direction (i.e., 90 degrees) from the horizontal direction, the intra predictor 160 may perform filtering on a plurality of first adjacent samples located in the specific direction from a first adjacent sample adjacent to an upper corner of the current block or adjacent to an extension line extending in the horizontal direction from the upper corner, and may obtain the predicted sample value of the current block according to the specific direction by using the plurality of filtered first adjacent samples.

Hereinafter, a case in which the predicted sample value of the current block is obtained when the intra prediction direction with respect to the current block is the specific direction based on the specific-angle directional mode and is a direction with a specific angle close to a horizontal direction will be described.

In a case where the intra prediction direction is the specific direction based on the specific-angle directional mode, and an angle in the specific direction from the horizontal direction is less than an angle in a 45-degree direction from the horizontal direction, the intra predictor 160 may perform filtering on a plurality of first adjacent samples located in the specific direction from a first adjacent sample adjacent to a left corner of the current block or adjacent to an extension line extending in a vertical direction from the left corner. The intra predictor 160 may obtain the predicted sample value of the current block according to the specific direction by using values of the plurality of filtered first adjacent samples.

The intra predictor 160 may perform filtering on the plurality of first adjacent samples by varying a weight depending on a distance between the current block and each of samples included in the plurality of first adjacent samples.

The intra predictor 160 may select one of a plurality of first adjacent samples distant from the current block, and may obtain the predicted sample value of the current block by using a value of the selected adjacent sample.

The intra predictor 160 may perform, based on a plurality of filtering methods, filtering on at least one sample that is from among the samples included in the adjacent reference region of the plurality of lines and is located in the intra prediction direction from the current block, wherein the intra prediction direction is indicated by the intra prediction mode, and may obtain the predicted sample value of the current block, based on the filtered at least one sample. The current block may be encoded based on predicted sample values of the current block based on the plurality of filtering methods.

The video encoding apparatus 150 may compare encoding results of the cases and then may select one filtering method from among the plurality of filtering methods.

The video encoding apparatus 150 may reconstruct the current block by using the predicted sample value of the current block and a sample value of a residual block of the current block. That is, a reconstructed block of the current block may be generated.

The bitstream generator 170 may encode the current block by using the predicted sample value. In more detail, the bitstream generator 170 may generate a residual signal of the current block by using an original block of the current block and the predicted sample value of the current block, and may encode the residual signal of the current block. For example, the bitstream generator 170 may quantize, transform, and entropy encode the residual signal of the current block.

The bitstream generator 170 may generate a bitstream further including information about a prediction mode of the current block.

The bitstream generator 170 may generate the bitstream including information about the intra prediction mode of the current block and information about the encoded current block. In this regard, the intra prediction mode may be at least one of the DC mode, the planar mode, and the specific-angle directional mode. The specific-angle directional mode may be at least one of directional modes of various angles including a horizontal direction and a vertical direction.

The video encoding apparatus 150 may include an image encoder (not shown), and the image encoder (not shown) may include the intra predictor 160 and the bitstream generator 170. The image encoder will be described with reference to FIG. 3.

Figure 1D:
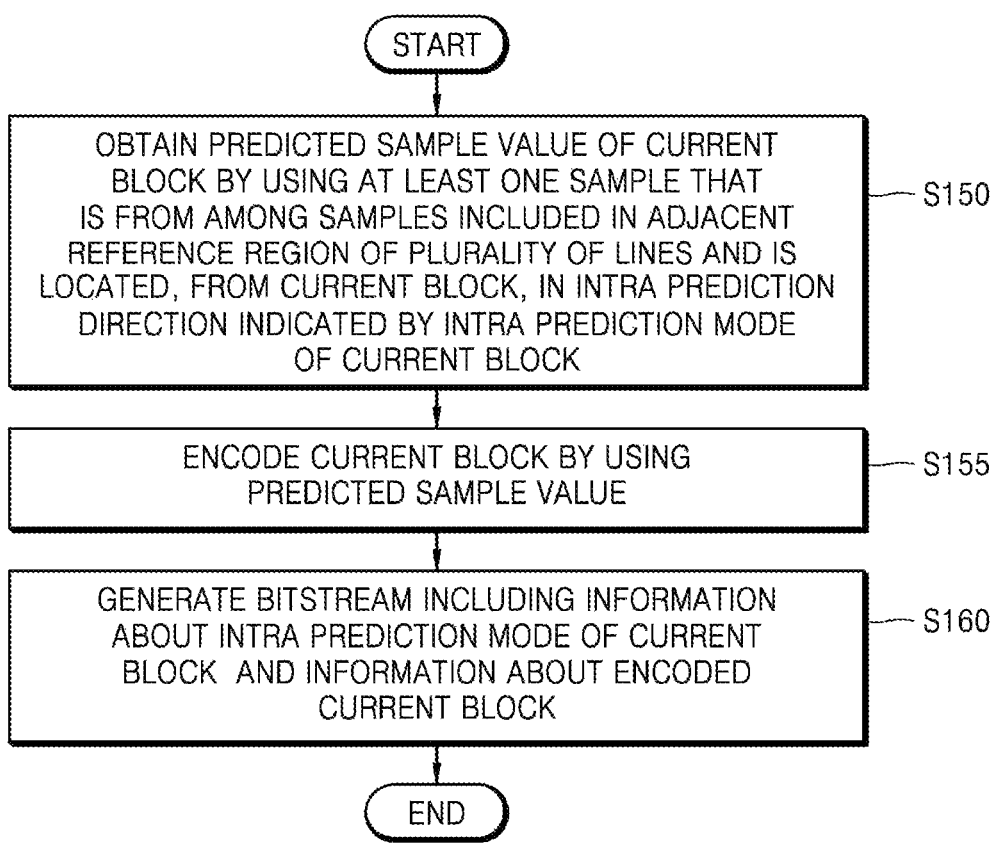
FIG. 1D illustrates a flowchart of a video encoding method, according to various embodiments.

FIG. 1D illustrates a flowchart of a video encoding method, according to various embodiments.

In operation S150, the video encoding apparatus 150 may obtain a predicted sample value of a current block by using at least one sample that is from among samples included in an adjacent reference region of a plurality of lines and is located, from the current block, in an intra prediction direction indicated by one intra prediction mode from among a plurality of intra prediction modes.

In operation S155, the video encoding apparatus 150 may encode the current block by using the predicted sample value of the current block. The video encoding apparatus 150 may encode a residual signal of the current block which indicates a difference between a sample value of an original block of the current block and the predicted sample value of the current block.

In operation S160, the video encoding apparatus 150 may generate a bitstream including information about the intra prediction mode of the current block and information about the encoded current block.

Figure 2:
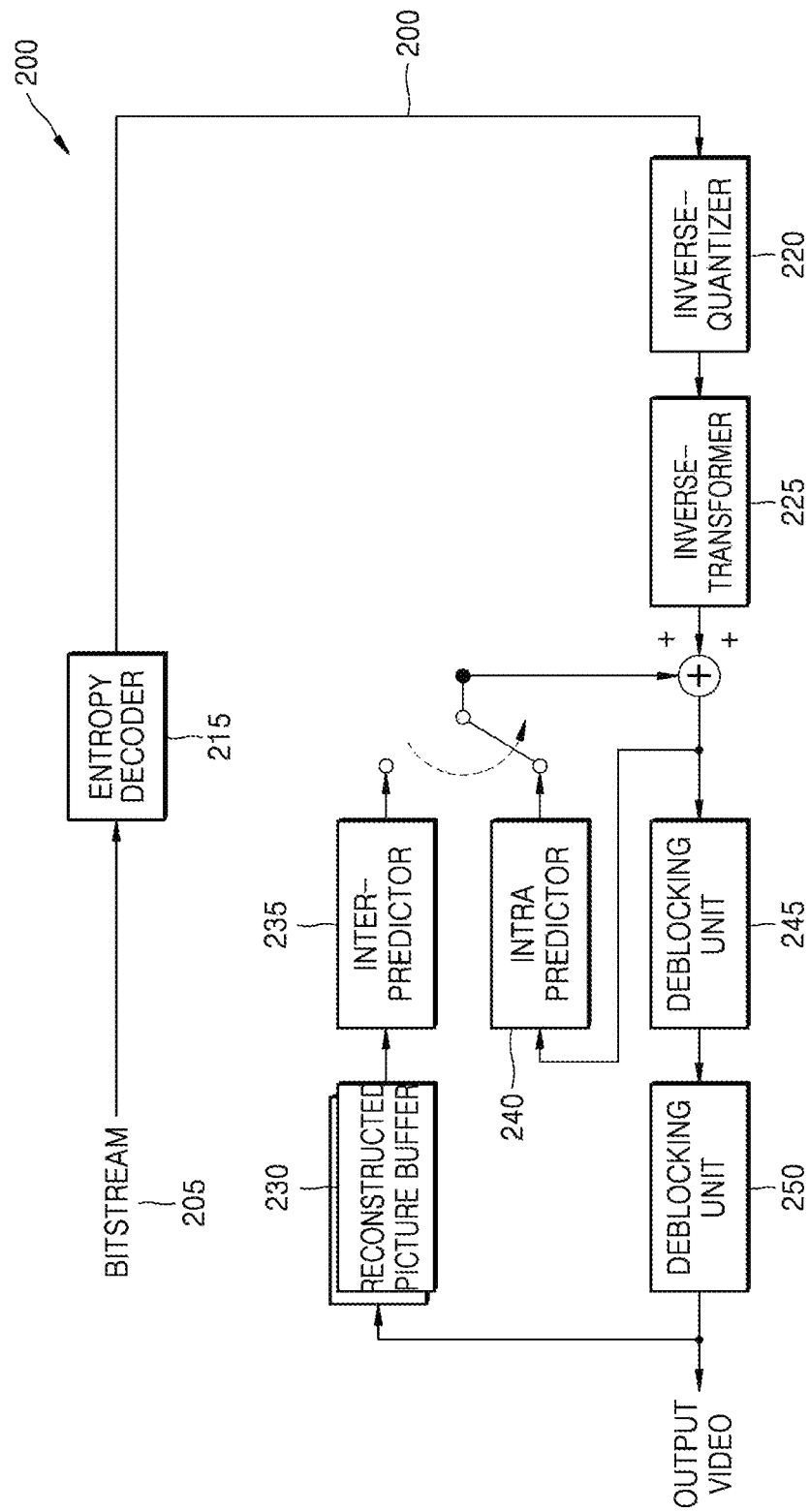
FIG. 2 illustrates a block diagram of an image decoder, according to various embodiments.

FIG. 2 illustrates a block diagram of an image decoder 200, according to various embodiments.

The image decoder 200 according to various embodiments corresponds to the image decoder (not shown) of the video decoding apparatus 100, and performs operations for decoding image data. Referring to FIG. 2A, an entropy decoder 215 parses, from a bitstream 205, encoded image data that is a decoding target and encoding information that is required in decoding. The encoded image data is a quantized transform coefficient, and an inverse-quantizer 220 and an inverse-transformer 225 reconstruct residual data from the quantized transform coefficient.

An intra-predictor 240 performs intra prediction on each of blocks. An inter-predictor 235 performs inter prediction on each of the blocks by using a reference image obtained from a reconstructed picture buffer 230. In this regard, an intra predictor 240 of FIG. 2 may correspond to the intra predictor 120 of FIG. 1A.

Predicted data and residual data with respect to each block, which are generated by the intra predictor 240 or the inter-predictor 235, are added such that data of a spatial domain with respect to a block of a current image in the bitstream 205 may be reconstructed, and a deblocking unit 245 and an sample adaptive offset (SAO) performer 250 may perform loop filtering on the reconstructed data of the spatial domain, thereby outputting a filtered reconstructed image. In addition, reconstructed images stored in the reconstructed picture buffer 230 may be output as a reference image.

In order for the image decoder (not shown) of the video decoding apparatus 100 to decode image data, the operations of the image decoder 200 according to various embodiments may be performed on each block.

Figure 3:
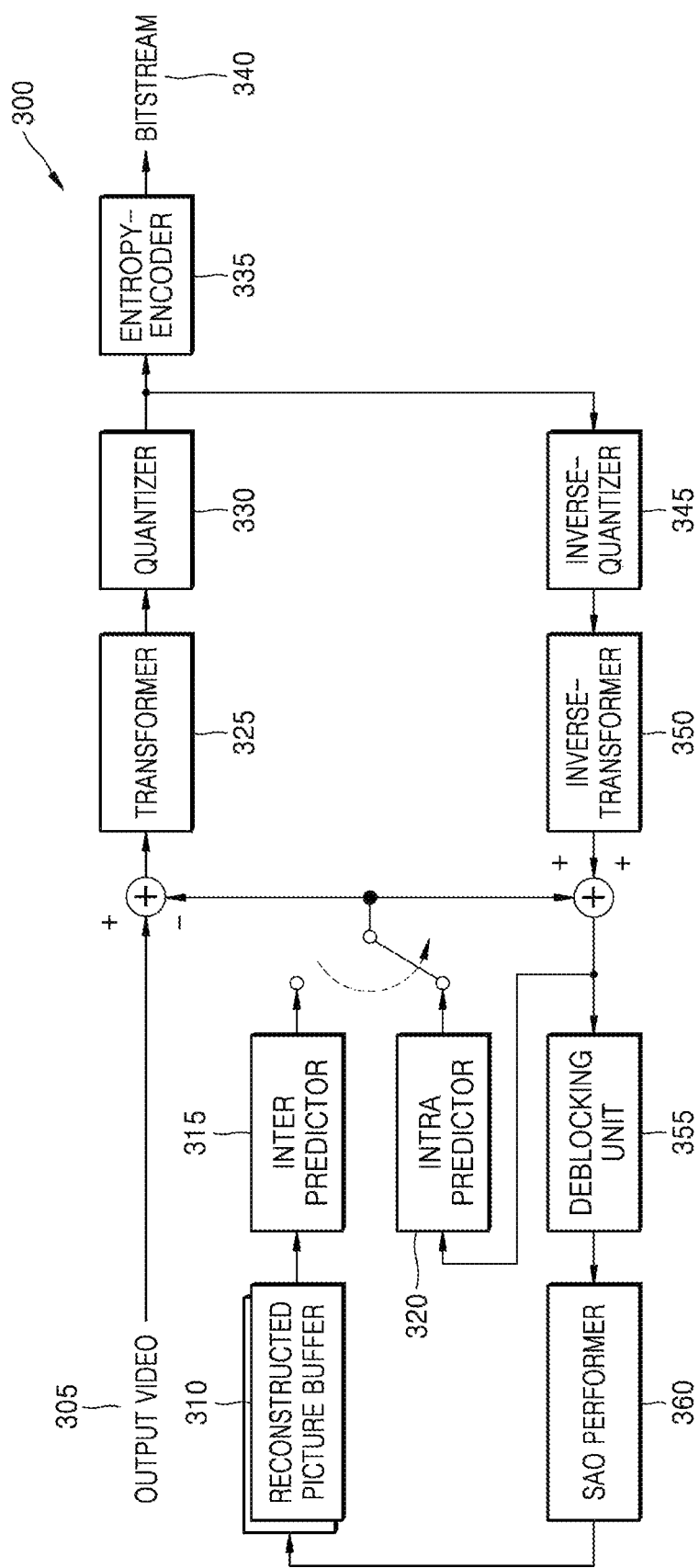
FIG. 3 illustrates a block diagram of an image encoder, according to various embodiments.

FIG. 3 illustrates a block diagram of an image encoder, according to various embodiments.

The image encoder 300 according to various embodiments corresponds to the image encoder (not shown) of the video encoding apparatus 150, and performs operations for encoding image data.

That is, an intra predictor 320 performs intra prediction on each of blocks in a current image 305, and an inter predictor 315 performs inter prediction on each of the blocks by using the current image 305 and a reference image obtained from a reconstructed picture buffer 310. In this regard, the intra predictor 320 of FIG. 3 may correspond to the intra predictor 160 of FIG. 1C.

Residual data is generated by subtracting predicted data from data of a block to be encoded in the current image 305, wherein the predicted data is with respect to each block output from the intra predictor 320 or the inter predictor 315, and the residual data passes through a transformer 325 and a quantizer 330 and then is output as a quantized transform coefficient of each block. The quantized transform coefficient passes through an inverse-quantizer 345 and an inverse-transformer 350 and then is reconstructed as residual data of a spatial domain. The reconstructed residual data of the spatial domain is added to the predicted data with respect to each block output from the intra predictor 320 or the inter predictor 315, such that data of the spatial domain for a block of the current image 305 is reconstructed. A deblocking unit 355 and an SAO performer 360 perform in-loop filtering on the reconstructed data of the spatial domain, thereby generating a filtered reconstructed image. The generated reconstructed image is stored in the reconstructed picture buffer 310. Reconstructed images stored in the reconstructed picture buffer 310 may be used as a reference image for inter prediction with respect to another image. An entropy-encoder 335 may entropy encode the quantized transform coefficient output from the transformer 325 and the quantizer 330, and the entropy-encoded coefficient may be output into a bitstream 340.

In order for the image encoder 300 according to various embodiments to be applied to the video encoding apparatus 150, the operations of the image encoder 300 according to various embodiments may be performed on each block.

Figure 4A:
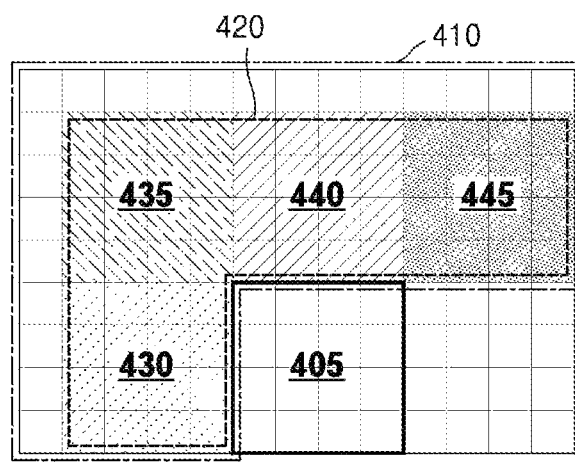
FIGS. 4A and 4B are diagrams for describing a process of performing intra prediction on a current block by using an adjacent reference region of a plurality of lines, according to various embodiments.
Figure 4B:
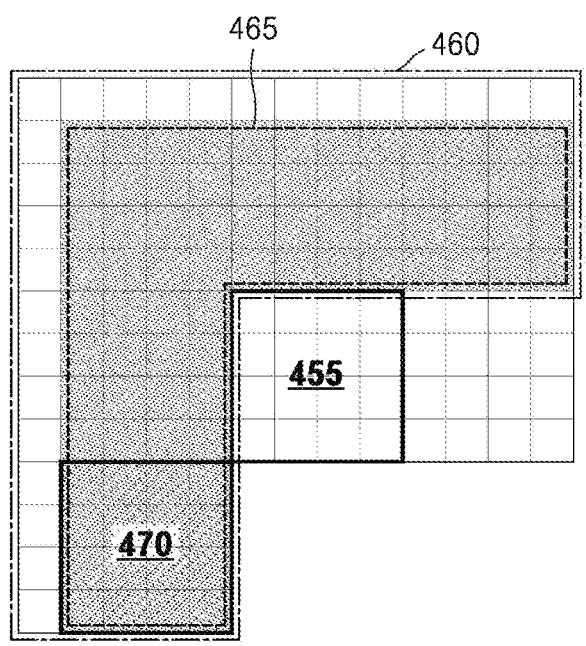

FIGS. 4A and 4B are diagrams for describing a process of performing intra prediction on a current block by using an adjacent reference region of a plurality of lines, according to various embodiments.

FIG. 4A is a diagram for describing a process of performing intra prediction on a current block by using an adjacent reference region of a plurality of lines, according to an embodiment.

Referring to FIG. 4A, the video decoding apparatus 100 may generate a predicted sample value of a current block 405 by using a sample of an adjacent reference region 420, wherein the sample is from among samples of a region 410 which were reconstructed prior to the current block 405 in a current picture.

For example, the adjacent reference region 420 of the current block 405 may be a portion in a plurality of left lines of the current block 405 and a plurality of upper lines of the current block 405. For example, the adjacent reference region 420 may be an adjacent block of the current block 405 which is located in a range away from a corner of the current block 405 by N samples. In this regard, according to FIG. 4A, N may be 4. The adjacent block of the current block 405 may include a left block 430, an upper left block 435, an upper block 440, and an upper right block 445.

N may be a fixed number, but the present disclosure is not limited thereto, and thus N may vary according to a size of the current block 405. For example, referring to FIG. 4A, the current block 405 may have a size of 4×4, and N may be determined to be 4, but when the size of the current block 405 becomes difference, N may be differently determined.

As an another example, N may be determined based on at least one of a size of a current block, an intra prediction mode of the current block, an intra prediction direction of the current block, adjacent coding information, a characteristic of an adjacent image, a user input, and computational complexity.

Information about N may be signalled by at least one of a block unit, a slice unit, a picture unit, a sequence unit, and a video unit.

The video decoding apparatus 100 may perform filtering on samples included in the adjacent reference region 420 by using a directional filter where an intra prediction direction indicated by an intra prediction mode is considered.

That is, the video decoding apparatus 100 may determine one or more samples in the adjacent reference region 420 according to the intra prediction direction indicated by the intra prediction mode, may perform filtering on the determined samples, and may generate the predicted sample value of the current block 405 by using values of the filtered samples.

For example, the video decoding apparatus 100 may determine samples in the adjacent reference region 420, the samples being located in the intra prediction direction from the current block 405, and may calculate an average value of the determined samples.

In this regard, a weighted average value of the determined samples may be calculated by varying a weight depending on distances between the current block 405 and the samples. For example, a relatively large weight may be applied to a sample that is relatively close to the current block 405, and a relatively small weight may be applied to a sample that is relatively distant from the current block 405. A type of the directional filter is not limited to a directional average filter but may vary including a smoothing filter, a sharpening filter, or the like.

Alternatively, a type of a filter may vary, and the video decoding apparatus 100 may perform filtering on adjacent samples by selectively using one of various types of filters. In this regard, the video decoding apparatus 100 may obtain, from a bitstream, an index indicating one of various filters, and may select one of the various filters, based on the index.

The video decoding apparatus 100 may determine whether to perform filtering on a sample included in an adjacent reference region of a plurality of lines, based on at least one of a size of a current block, an intra prediction mode of the current block, an intra prediction direction of the current block, adjacent coding information, a characteristic of an adjacent image, a user input, and computational complexity.

The video decoding apparatus 100 may receive, from a bitstream, a flag indicating whether to perform filtering on the sample included in the adjacent reference region of the plurality of lines, and may determine, based on the received flag, whether to perform filtering on the sample included in the adjacent reference region of the plurality of lines. For example, when the flag indicates to perform filtering on the sample included in the adjacent reference region of the plurality of lines, filtering may be performed on the sample included in the adjacent reference region of the plurality of lines, and when the flag indicates not to perform filtering on the sample included in the adjacent reference region of the plurality of lines, a predicted sample value of the current block may be generated by using samples included in an adjacent reference region of one left line or one upper line contacting the current block.

The video decoding apparatus 100 may determine the number of samples to be used in performing filtering, wherein the samples are from among samples located, from the current block, in an intra prediction direction of the current block. For example, the number of samples to be used in performing filtering may be one of 4, 8, and 12. A level of smoothing with respect to filtered samples may be adjusted by controlling the number of samples to be used in performing filtering. In this regard, the number of samples to be used in performing filtering may be determined in an adaptive manner by using an image characteristic of the adjacent reference region. For example, when many edges are in an adjacent region, the video encoding apparatus 150 may perform filtering on an adjacent sample by using a relatively large number of samples. As another example, the video encoding apparatus 150 may perform filtering on adjacent samples by varying the number of samples, may generate a predicted sample value of the current block, based on values of the filtered adjacent samples, and may encode the current block, based on the predicted sample value of the current block, and at this time, the video encoding apparatus 150 may determine the number of samples at which a rate-distortion cost is optimized, and may signal information about the determined number of samples via a bitstream. The video decoding apparatus 100 may obtain, from the bitstream, the information about the number of samples, and may determine the number of samples to be used in performing filtering, based on the information about the number of samples.

With reference to FIG. 4A, it is described that the adjacent reference region 420 is an adjacent block of the current block 405, the adjacent reference region 420 being located in the range away by N samples (where N is 4), but the present disclosure is not limited thereto, and an adjacent reference region may be an adjacent block of the current block, wherein the adjacent block is located in a range away from a left corner of the current block by N sample (where N is an integer) and in a range away from an upper corner of the current block by M samples (where M is an integer).

FIG. 4B is a diagram for describing a process of performing intra prediction on a current block by using an adjacent reference region of a plurality of lines, according to another embodiment.

Referring to FIG. 4B, the video decoding apparatus 100 may generate a predicted sample value of a current block 455 by using a sample of an adjacent reference region 465, wherein the sample is from among samples of a region 460 which were reconstructed prior to the current block 455 in a current picture. For example, the adjacent reference region 465 of the current block 455 may be a portion in a plurality of left lines and a plurality of upper lines of the current block 455. For example, the adjacent reference region 465 may be an adjacent block of the current block 455 which is located in a range away from the current block 455 by N samples. In this regard, according to FIG. 4B, N may be 4. However, unlike to FIG. 4A, referring to FIG. 4B, the adjacent reference region 465 of the current block 455 may further include a lower left block 470 of the current block 455. A decoding scanning method may be one of a zigzag scanning method and a raster scanning method, and according to the decoding scanning method, a left block or an upper block may be available because the left block or the upper block was previously decoded before the current block 455 is decoded. However, the present disclosure is not limited to the left block or the upper block, and in another case, a lower left block may be available because the lower left block was previously decoded before the current block 455 is decoded. Thus, as in FIG. 4, the adjacent reference region 465 may further include the lower left block 470.

In the above, it is described assuming that the samples included in the adjacent reference region 420 of FIG. 4A and the adjacent reference region 465 of FIG. 4B are all available. When a portion of an adjacent reference region is not available, filtering may be performed on only available samples, or a value of an unavailable sample is determined by using the available samples and then filtering may be performed on samples included in the adjacent reference region.

FIGS. 5A to 5D are diagrams for describing processes of performing intra prediction on a current block when an intra prediction mode is a DC mode, according to various embodiments.

Figure 5A:
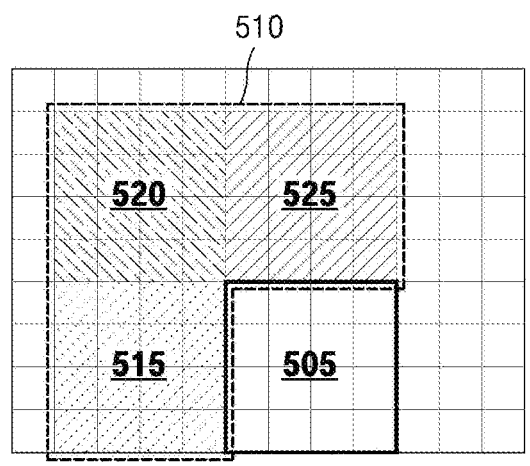
FIGS. 5A to 5D are diagrams for describing processes of performing intra prediction on a current block when an intra prediction mode is a direct current (DC) mode, according to various embodiments.

FIG. 5A is a diagram for describing a process of performing intra prediction on a current block when an intra prediction mode is a DC mode, according to an embodiment.

Referring to FIG. 5A, the video decoding apparatus 100 may determine an adjacent reference region 510 located in a range away from a left corner or an upper corner of a current block 505 by N samples. In this regard, N may be 4, and the adjacent reference region 510 may include a left block 515, an upper left block 520, and an upper block 525 of the current block 505 which are from among blocks adjacent to the current block 505.

When an intra prediction mode of the current block 505 is a DC mode, the video decoding apparatus 100 may calculate an average value of all samples in the adjacent reference region 510, and may generate predicted sample values of samples included in the current block 505 by using the average value of all samples.

Figure 5B:
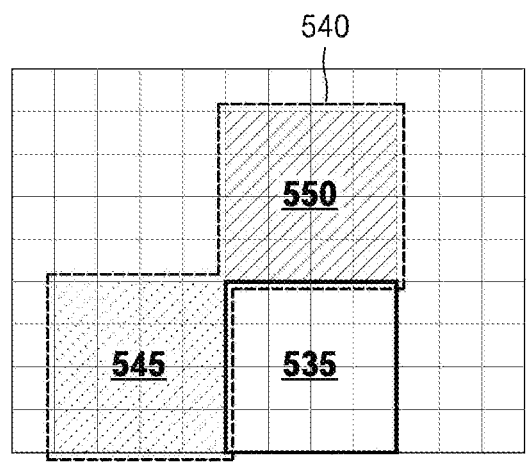

FIG. 5B is a diagram for describing a process of performing intra prediction on a current block when an intra prediction mode is a DC mode, according to another embodiment.

Referring to FIG. 5B, unlike to FIG. 5A, an adjacent reference region 540 may not include an upper left block of a current block 535 but may include a left block 545 and an upper block 550 of the current block 535.

When an intra prediction mode of the current block 535 is the DC mode, the video decoding apparatus 100 may calculate an average value of all samples in the adjacent reference region 540, and may generate predicted sample values of samples included in the current block 535 by using the average value of all samples of the adjacent reference region 540.

Figure 5C:
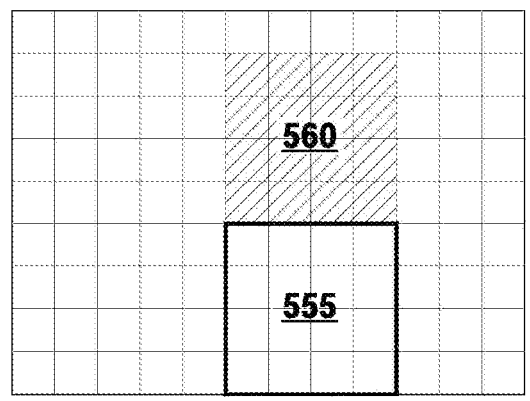
Figure 5D:
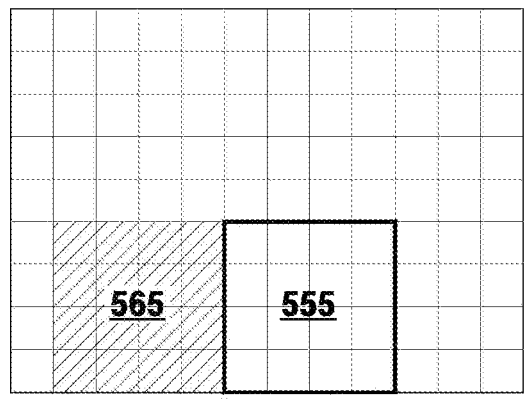

FIGS. 5C and 5D are diagrams for describing a process of performing intra prediction on a current block when an intra prediction mode is a DC mode, according to another embodiment.

In a case where a left region 545 in the adjacent reference region 540 illustrated in FIG. 5B is not available but an upper region 550 is available, referring to FIG. 5C, the video decoding apparatus 100 may generate a predicted sample value of a current block 555 by using samples included in an upper region 560.

In a case where the upper region 550 in the adjacent reference region 540 illustrated in FIG. 5B is not available but the left region 545 is available, referring to FIG. 5D, the video decoding apparatus 100 may generate a predicted sample value of the current block 555 by using samples included in a left region 565.

In a case where both the left region 545 and the upper region 550 in the adjacent reference region 540 illustrated in FIG. 5B are not available, the video decoding apparatus 100 may generate a predicted sample value of a current block by using a median value of a bit depth of a sample. In a case where the bit depth is 8, the median value of the bit depth of the sample may be $2^{(8-1)}=128$.

As illustrated in FIGS. 5A and 5B, it is described in detail that a reference region may have a shape of the adjacent reference region 510 or the adjacent reference region 540, and in addition, the reference region may have various shapes and may include samples adjacent to a current block.

Figure 6A:
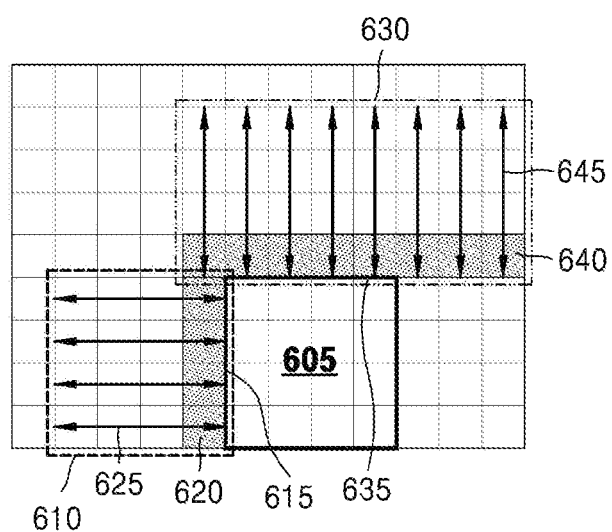
FIGS. 6A to 6C are diagrams for describing a process of performing intra prediction on a current block when an intra prediction mode is a planar mode, according to an embodiment.
Figure 6B:
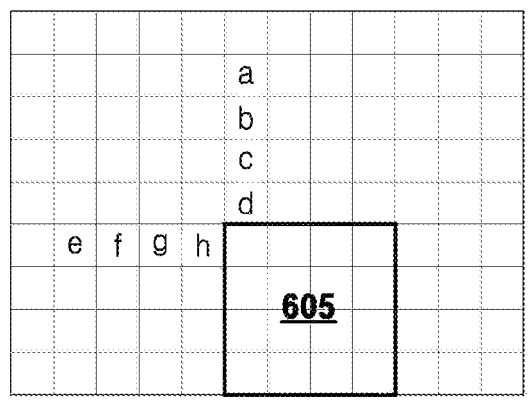
Figure 6C:
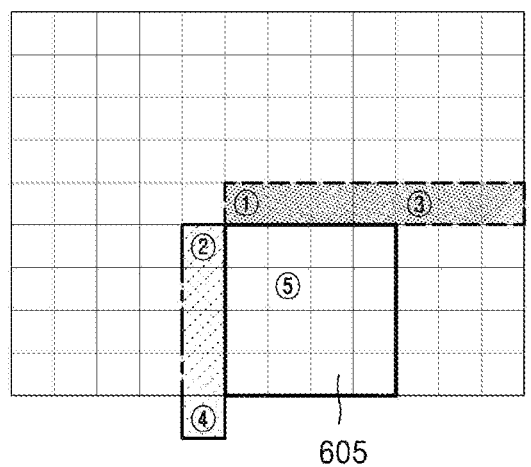

FIGS. 6A to 6C are diagrams for describing a process of performing intra prediction on a current block when an intra prediction mode is a planar mode, according to an embodiment.

Referring to FIG. 6A, with respect to a left region 610 of a current block 605, N−1 samples may be obtained in a left-horizontal direction 625 from each of samples 620 neighboring a left corner 615, and filtering may be performed by using each of the samples 620 and N−1 samples with respect to each of the samples 620. Hereinafter, for convenience of description, with reference to FIG. 6B, a case in which filtering is performed by using a sample h from among the samples 620 neighboring the left corner 615, and samples e, f, and g that are located in a horizontal direction 625 from the sample h will now be described in detail.

For example, the video decoding apparatus 100 may perform filtering by using the sample h, and the sample e, the sample f, and the sample g which are located in the left-horizontal direction 625 from the sample h. In this regard, when a value of the sample h is h, a value of the sample e is e, a value of the sample f is f, and a value of the sample g is g, a value of $(e+f+g+h+2)/4$ may be calculated as an average value of the samples e to h, and a predicted sample value of the current block 605 may be generated by using the calculated average value.

Referring back to FIG. 6A, with respect to an upper region 630 of the current block 605, N−1 samples may be obtained in an up-vertical direction 645 from each of samples 640 neighboring an upper corner 635, and filtering may be performed by using each of the samples 640 and N−1 samples with respect to each of the samples 640. Hereinafter, for convenience of description, with reference to FIG. 6B, a case in which filtering is performed by using a sample d from among the samples 640 neighboring the upper corner 635, and samples a, b, and c which are located in a vertical direction from the sample d will now be described in detail.

For example, the video decoding apparatus 100 may perform filtering by using the sample d, and the sample a, the sample b, and the sample c which are located in the up-vertical direction 645 from the sample d. In this regard, when a value of the sample d is d, a value of the sample a is a, a value of the sample b is b, and a value of the sample c is c, a value of $(a+b+c+d+2)/4$ may be calculated as an average value of the samples a to d, and a predicted sample value of the current block 605 may be generated by using the calculated average value.

Referring to FIG. 6C, the video decoding apparatus 100 may perform filtering on samples located in a horizontal direction from each of samples neighboring a left corner of the current block 605, and may determine values, which are generated as a result of the filtering, as new values at locations of the samples neighboring the left corner of the current block 605.

The video decoding apparatus 100 may perform filtering on samples located in a vertical direction from each of samples neighboring an upper corner of the current block 605, and may determine values, which are generated as a result of the filtering, as new values at locations of the samples neighboring the upper corner of the current block 605.

For example, as described with reference to FIG. 5B, when the video decoding apparatus 100 performed filtering on each of the samples d and h, and adjacent pixels thereof, the video decoding apparatus 100 may determine, as values of a sample ⌐ and a sample ⌐, values that are generated as a result of the filtering. Equally, values of a sample □ and a sample □ may be determined in a similar manner to that of determining the values of the sample □ and the sample □. The video decoding apparatus 100 may generate a predicted sample value of a sample □ in the current block 605 by using the values of the samples □, □, □, and □. Equally, to generate a predicted sample value of a sample in the current block 605, the sample being different from the sample □, the video decoding apparatus 100 may determine a value of a sample adjacent to an upper corner of a current block, the sample being from among samples located in an up direction from each sample, and a value of a sample adjacent to a left corner of the current block, the sample being from among samples located in a left direction from each sample, and may generate a predicted sample value of each sample by using the determined values of the samples adjacent to the left corner and the upper corner of the current block, and the values of the samples □ and □.

Figure 7A:
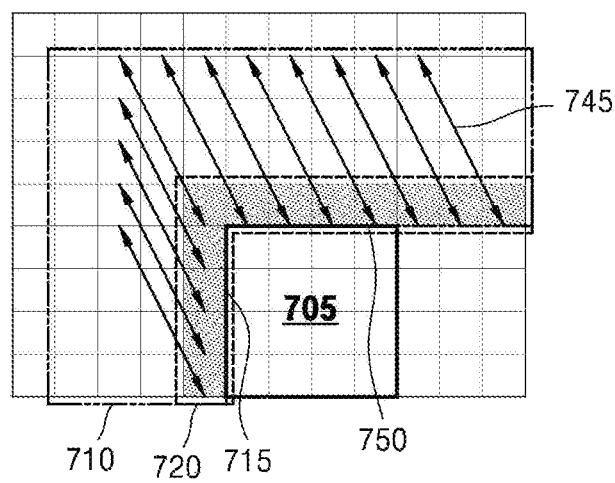
FIGS. 7A to 7C are diagrams for describing a process of performing intra prediction on a current block when an intra prediction mode is an angular mode, according to an embodiment.
Figure 7A:
Figure 7A:
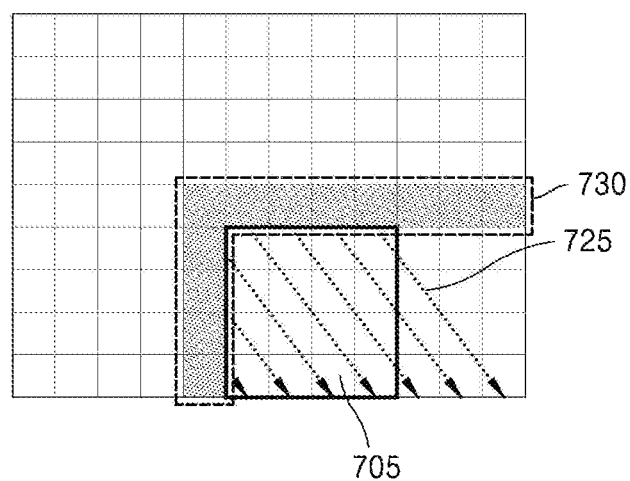
Figure 7B:
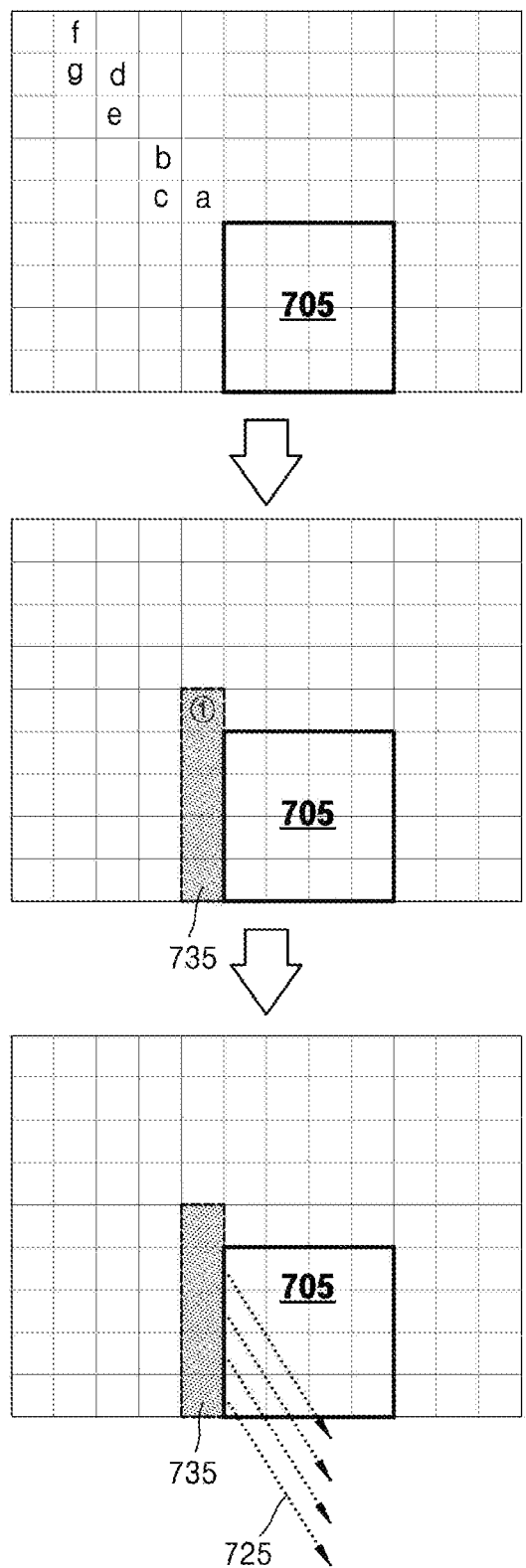
Figure 7C:
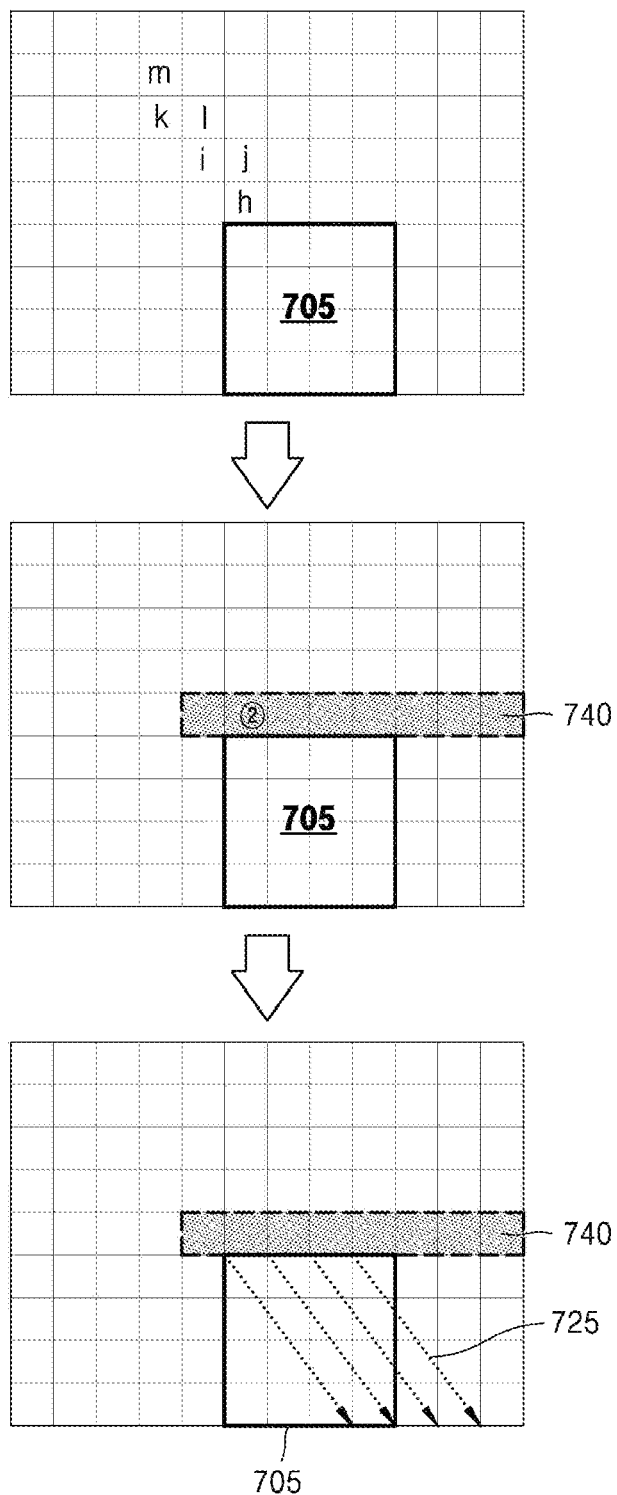

FIGS. 7A to 7C are diagrams for describing a process of performing intra prediction on a current block when an intra prediction mode is an angular mode, according to an embodiment.

Referring to FIG. 7A, with respect to a left region in an adjacent region 710 of a current block 705, N−1 samples may be obtained in an intra prediction direction 725 from each of samples 720 neighboring a left corner 715 of the current block 705, and filtering may be performed by using each of the samples 720 and N−1 samples with respect to each of the samples 720.

Values generated by performing filtering on the samples 720, respectively, may be determined as new values 730 at locations of the samples 720, respectively. The video decoding apparatus 100 may perform intra prediction on the current block 705 in the intra prediction direction 725 by using the determined new values 730 at the locations of the samples 720.

Hereinafter, for convenience of description, with reference to FIG. 7B, a case in which filtering is performed by using a sample a from among the samples 720 neighboring the left corner 715, and samples b to g that are located in the intra prediction direction 725 from the sample a will now be described in detail.

Referring to FIG. 7B, the video decoding apparatus 100 may obtain the sample b, the sample e, and the sample g which are located away from the sample a by N−1 samples (where N is 4) in the intra prediction direction 725. However, an extension line extending in the intra prediction direction 725 from the sample a may meet a corner of a fractional sample location with respect to the samples b, e, and g. In this case, linearly-interpolated samples may be generated by performing linear interpolation by using the samples b, e, and g, and their adjacent samples c, d, and f. For example, the video decoding apparatus 100 may generate the linearly-interpolated sample by performing linear interpolation by using the sample b and its adjacent sample c, may generate the linearly-interpolated sample by performing linear interpolation by using the sample e and its adjacent sample d, may generate the linearly-interpolated sample by performing linear interpolation by using the sample g and its adjacent sample f, and may determine a value of a sample □ at a location of the sample a in a left region 735 by performing filtering on the linearly-interpolated samples and the sample a. Equally, filtering is similarly performed on other samples neighboring a left corner of the current block 705, such that new values at locations of samples in the left region 735 may be determined, respectively. In this regard, linear interpolation may be performed by varying a weight with respect to each adjacent sample, based on a distance between each adjacent sample and a corner of a fractional sample location with respect to samples that meet the extension line.

In a case where a current intra prediction direction is close to a horizontal direction, linear interpolation may be performed on samples that are vertically adjacent to each other. In this regard, the intra prediction direction close to the horizontal direction may indicate an intra prediction direction in which an angle of the intra prediction direction is greater than 0 degrees and less than 45 degrees.

The video decoding apparatus 100 may determine samples that are located in an extension line in the intra prediction direction 725 from a current sample of the current block 705 and are located in the left region 735 of the current block 705, and may determine a predicted sample value of the current sample by using the determined samples.

Referring back to FIG. 7A, with respect to an upper region in the adjacent region 710 of the current block 705, N−1 samples may be obtained in the intra prediction direction 725 from each of the samples 720 neighboring an upper corner 750 of the current block 705, and filtering may be performed by using each of the samples 720 and N−1 samples with respect to each of the samples 720. Values generated by performing filtering on the samples 720, respectively, may be determined as the new values 730 at the locations of the samples 720, respectively. The video decoding apparatus 100 may perform intra prediction on the current block 705 in the intra prediction direction 725 by using the determined new values 730 at the locations of the samples 720.

Hereinafter, for convenience of description, with reference to FIG. 7C, a case in which filtering is performed by using a sample h from among the samples 720 neighboring the upper corner 750, and samples that are located in the intra prediction direction 725 from the sample h will now be described in detail.

Referring to FIG. 7C, the video decoding apparatus 100 may obtain a sample j, a sample l, and a sample m which are located away from the sample h by N−1 samples (where N is 4) in the intra prediction direction 725. However, an extension line extending in the intra prediction direction 725 from the sample h may meet a corner of a fractional sample location with respect to the samples j and l. In this case, linearly-interpolated samples may be generated by performing linear interpolation by using samples and their adjacent samples. For example, the video decoding apparatus 100 may generate a linearly-interpolated sample by performing linear interpolation by using the sample j and its adjacent sample i, may generate a linearly-interpolated sample by performing linear interpolation by using the sample l and its adjacent sample m, and may determine a value of a sample □ at a location of the sample h in an upper region 740 by performing filtering on the linearly-interpolated samples and the samples h and m. Equally, filtering is similarly performed on other samples neighboring an upper corner of the current block 705, such that new values at locations of samples in the upper region 740 may be determined, respectively. In this regard, linear interpolation may be performed by varying a weight with respect to each adjacent sample, based on a distance between each adjacent sample and a corner of a fractional sample location with respect to samples that meet the extension line.

In a case where a current intra prediction direction is close to a vertical direction, linear interpolation may be performed on samples that are horizontally adjacent to each other. In this regard, the intra prediction direction close to the vertical direction may indicate an intra prediction direction in which an angle of the intra prediction direction with respect to the vertical direction is greater than 45 degrees and less than 90 degrees (i.e., an angle formed with respect to the vertical direction).

The video decoding apparatus 100 may determine the samples that are located in the extension line in the intra prediction direction 725 from the current sample of the current block 705 and are located in the left region 735 of the current block 705, and may determine the predicted sample value of the current sample by using the determined samples.

The video decoding apparatus 100 may determine samples that are located in an extension line in the intra prediction direction 725 from a current sample of the current block 705 and are located in the upper region 740 of the current block 705, and may determine a predicted sample value of the current sample by using the determined samples.

Figure 8A:
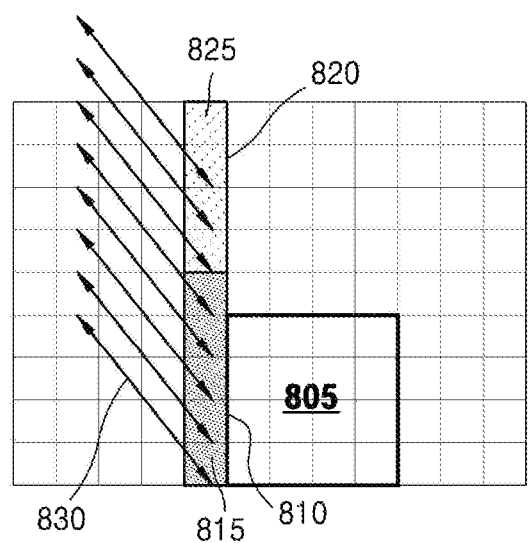
FIGS. 8A and 8B are diagrams for describing a process of generating a predicted sample value of a current block when an intra prediction direction is close to a horizontal direction, according to another embodiment.
Figure 8B:
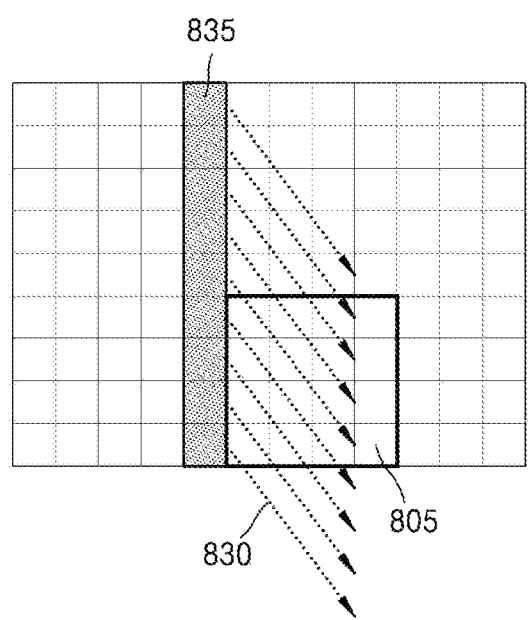

FIGS. 8A and 8B are diagrams for describing a process of generating a predicted sample value of a current block when an intra prediction direction is close to a horizontal direction, according to another embodiment.

Referring to FIG. 8A, the video decoding apparatus 100 may perform filtering on samples 815, samples 825, and samples, wherein the samples 815 are adjacent to a left corner 810 of a current block 805, the samples 825 are adjacent to an extension line 820 extending in a vertical direction from the left corner 810, and the samples are located in N−1 samples in an intra prediction direction 830 of the current block 805 from each of the samples 815 adjacent to the left corner 810 and the samples 825 adjacent to the extension line 820 extending in the vertical direction from the left corner 810, and may re-determine values of the samples 815 and the samples 825 in a left region of the current block 805.

Referring to FIG. 8B, the video decoding apparatus 100 may generate a predicted sample value of the current block 805 by using the values of the samples 815 and the samples 825, the values being re-determined in the left region.

For example, the video decoding apparatus 100 may generate a predicted sample value of a sample by using values that are located in an extension line in the intra prediction direction 830 from each of samples located in the current block and are located in the left region. In a case where a location of a cross-point where a sample adjacent to a left corner of the current block and an extension line in a vertical direction from the left corner meets an extension line of an intra prediction direction from the sample is not an integer sample location, the video decoding apparatus 100 may perform linear interpolation by using two samples adjacent to the cross-point and may generate a predicted sample value of a sample included in the current block by using a value of the linearly-interpolated sample.

Figure 9A:
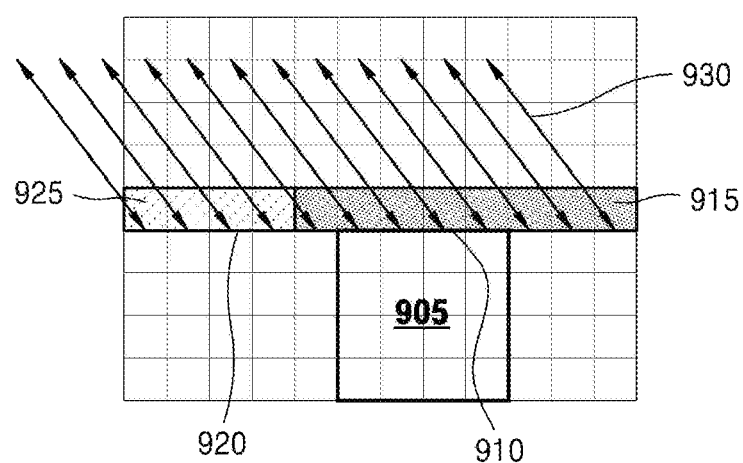
FIGS. 9A and 9B are diagrams for describing a process of generating a predicted sample value of a current block when an intra prediction direction is close to a vertical direction, according to another embodiment.
Figure 9B:
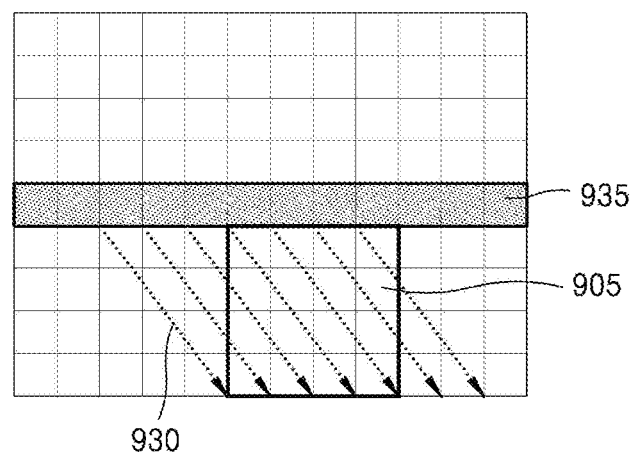

FIGS. 9A and 9B are diagrams for describing a process of generating a predicted sample value of a current block when an intra prediction direction is close to a vertical direction, according to another embodiment.

Referring to FIG. 9A, the video decoding apparatus 100 may perform filtering on samples 915, samples 925, and samples, wherein the samples 915 are adjacent to an upper corner 910 of a current block 905, the samples 925 are adjacent to an extension line 920 extending in a horizontal direction from the upper corner 910, and the samples are located in N−1 samples in an intra prediction direction 930 of the current block 905 from each of the samples 915 adjacent to the upper corner 910 and the samples 925 adjacent to the extension line 920 extending in the horizontal direction from the upper corner 910, and may re-determine values of the samples 915 and the samples 925 in an upper region of the current block 905.

Referring to FIG. 9B, the video decoding apparatus 100 may generate a predicted sample value of the current block 905 by using the values of the samples 915 and the samples 925, the values being re-determined in the upper region.

For example, the video decoding apparatus 100 may generate a predicted sample value of a sample by using values that are located in an extension line in the intra prediction direction 930 from each of samples located in the current block and are located in the upper region.

In a case where a location of a cross-point where a sample adjacent to an upper corner of the current block and an extension line in a horizontal direction from the upper corner meets an extension line of an intra prediction direction from the sample is not an integer sample location, the video decoding apparatus 100 may perform linear interpolation by using two samples adjacent to the cross-point and may generate a predicted sample value of a sample included in the current block by using a value of the linearly-interpolated sample.

It is described in detail in the above that the video decoding apparatus 100 performs filtering on samples included in an adjacent reference region of a current block by referring to an intra prediction direction of the current block, but the present disclosure is not limited thereto and it is obvious filtering may be performed on the samples included in the adjacent reference region of the current block by referring to an intra prediction direction of the adjacent reference region, not the intra prediction direction of the current block.

According to the various embodiments, a reference sample is determined by referring to an intra prediction direction, and filtering is performed on the reference sample, such that a factor such as an edge smoothing phenomenon which increases a prediction error is decreased, and noise or an outlier included in the reference sample in the intra prediction direction is removed, whereby prediction efficiency may be improved.

Hereinafter, a method of determining a data unit that may be used in the process of decoding an image by the video decoding apparatus 100 according to an embodiment will be described with reference to FIGS. 10 to 23. The operation of the video encoding apparatus 150 may be similar to or opposite to various embodiments of the operation of the video decoding apparatus 100 described below.

Figure 10:
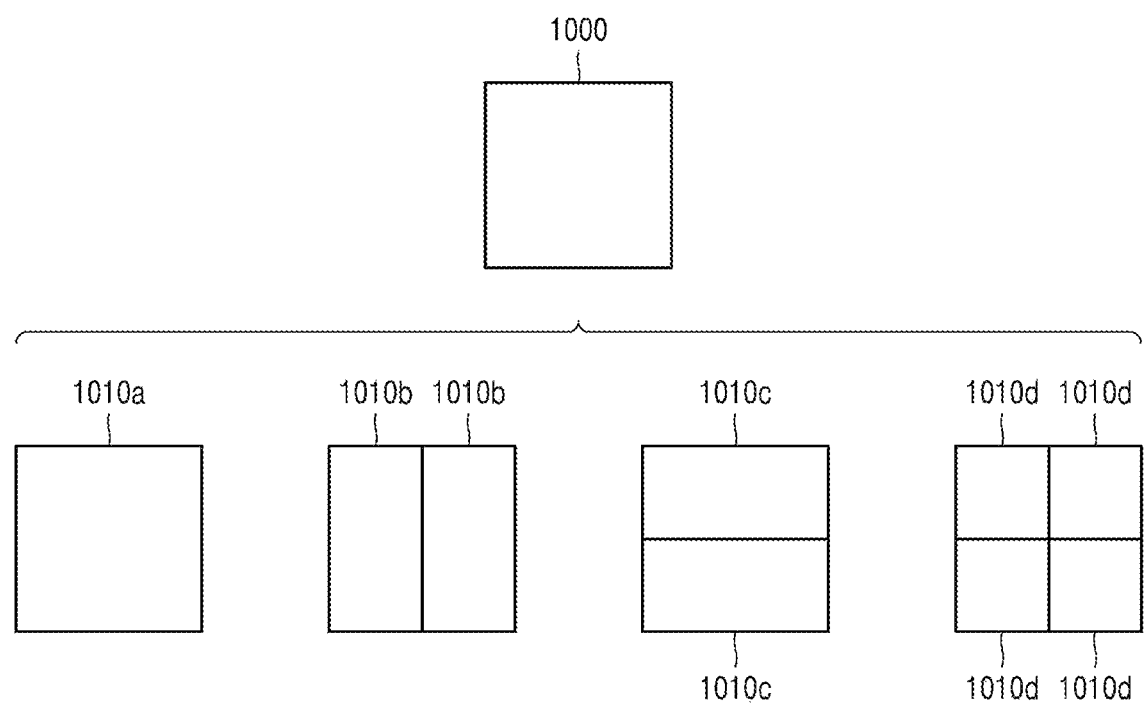
FIG. 10 illustrates an operation of determining one or more coding units by partitioning a current coding unit, according to an embodiment.

FIG. 10 illustrates an operation, performed by the video decoding apparatus 100, of determining one or more coding units by partitioning a current coding unit, according to an embodiment.

According to an embodiment, the video decoding apparatus 100 may determine a shape of a coding unit by using block shape information, and determine a partitioning method of the coding unit by using partition shape information. That is, a coding unit partitioning method indicated by the partition shape information may be determined based on a block shape indicated by the block shape information used by the video decoding apparatus 100.

According to an embodiment, the video decoding apparatus 100 may use the block shape information indicating that the current coding unit has a square shape. For example, the video decoding apparatus 100 may determine whether not to partition a square coding unit, whether to vertically partition the square coding unit, whether to horizontally partition the square coding unit, or whether to partition the square coding unit into four coding units, based on the partition shape information. Referring to FIG. 10, when the block shape information of a current coding unit 1000 indicates a square shape, the video decoding apparatus 100 may determine that a coding unit 1010a having the same size as the current coding unit 1000 is not partitioned, based on the partition shape information indicating not to perform partitioning, or may determine coding units 1010b, 1010c, or 1010d partitioned based on the partition shape information indicating a predetermined partitioning method.

Referring to FIG. 10, according to an embodiment, the video decoding apparatus 100 may determine two coding units 1010b obtained by partitioning the current coding unit 1000 in a vertical direction, based on the partition shape information indicating to perform partitioning in a vertical direction. The video decoding apparatus 100 may determine two coding units 1010c obtained by partitioning the current coding unit 1000 in a horizontal direction, based on the partition shape information indicating to perform partitioning in a horizontal direction. The video decoding apparatus 100 may determine four coding units 1010d obtained by partitioning the current coding unit 1000 in vertical and horizontal directions, based on the partition shape information indicating to perform partitioning in vertical and horizontal directions. However, partitioning methods of the square coding unit are not limited to the above-described methods, and the partition shape information may indicate various methods. Predetermined partitioning methods of partitioning the square coding unit will be described in detail below in relation to various embodiments.

Figure 11:
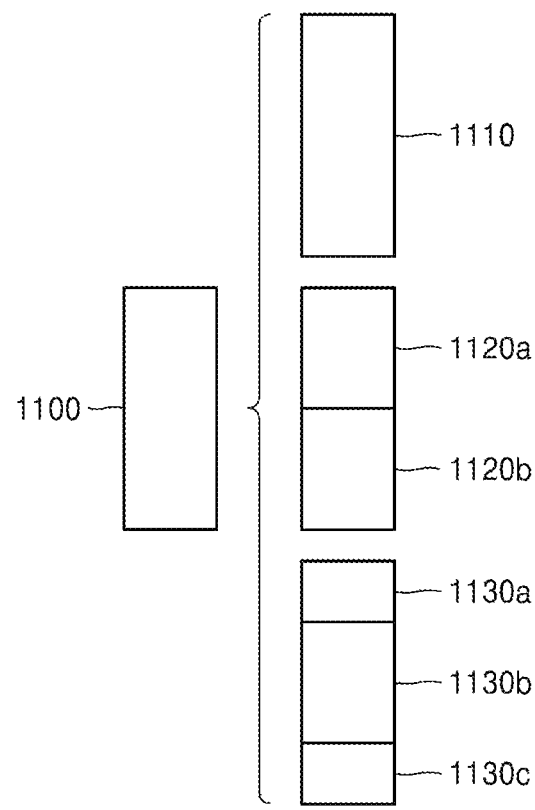
FIG. 11 illustrates an operation of determining one or more coding units by partitioning a non-square coding unit, according to an embodiment.
Figure 11:
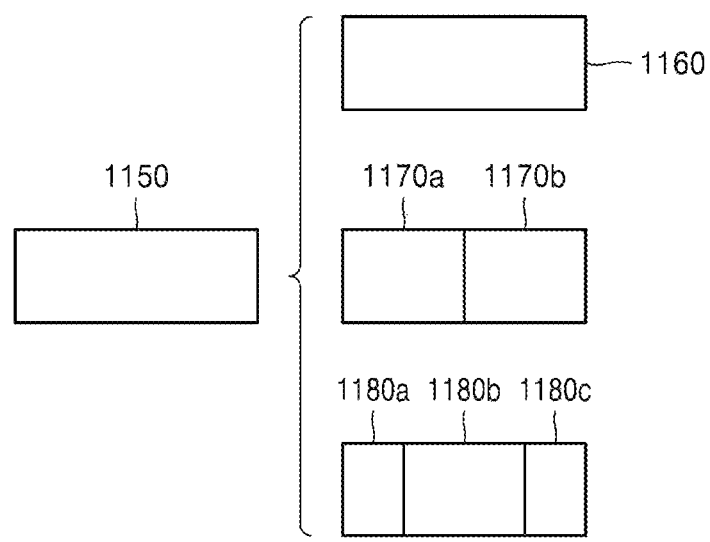

FIG. 11 illustrates an operation, performed by the video decoding apparatus 100, of determining one or more coding units by partitioning a non-square coding unit, according to an embodiment.

According to an embodiment, the video decoding apparatus 100 may use block shape information indicating that a current coding unit has a non-square shape. The video decoding apparatus 100 may determine whether not to partition the non-square current coding unit or whether to partition the non-square current coding unit by using a predetermined partitioning method, based on partition shape information. Referring to FIG. 11, when the block shape information of a current coding unit 1100 or 1150 indicates a non-square shape, the video decoding apparatus 100 may determine that a coding unit 1110 or 1160 having the same size as the current coding unit 1100 or 1150 is not partitioned, based on the partition shape information indicating not to perform partitioning, or determine coding units 1120a and 1120b, 1130a to 1130c, 1170a and 1170b, or 1180a to 1180c partitioned based on the partition shape information indicating a predetermined partitioning method. Predetermined partitioning methods of partitioning a non-square coding unit will be described in detail below in relation to various embodiments.

According to an embodiment, the video decoding apparatus 100 may determine a partitioning method of a coding unit by using the partition shape information and, in this case, the partition shape information may indicate the number of one or more coding units generated by partitioning a coding unit. Referring to FIG. 11, when the partition shape information indicates to partition the current coding unit 1100 or 1150 into two coding units, the video decoding apparatus 100 may determine two coding units 1120a and 1120b, or 1170a and 1170b included in the current coding unit 1100 or 1150, by partitioning the current coding unit 1100 or 1150 based on the partition shape information.

According to an embodiment, when the video decoding apparatus 100 partitions the non-square current coding unit 1100 or 1150 based on the partition shape information, the location of a long side of the non-square current coding unit 1100 or 1150 may be considered. For example, the video decoding apparatus 100 may determine a plurality of coding units by dividing a long side of the current coding unit 1100 or 1150 considering the shape of the current coding unit 1100 or 1150.

According to an embodiment, when the partition shape information indicates to partition a coding unit into an odd number of blocks, the video decoding apparatus 100 may determine an odd number of coding units included in the current coding unit 1100 or 1150. For example, when the partition shape information indicates to partition the current coding unit 1100 or 1150 into three coding units, the video decoding apparatus 100 may partition the current coding unit 1100 or 1150 into three coding units 1130a, 1130b, and 1130c, or 1180a, 1180b, and 1180c. According to an embodiment, the video decoding apparatus 100 may determine an odd number of coding units included in the current coding unit 1100 or 1150, and not all the determined coding units have the same size. For example, a predetermined coding unit 1130b or 1180b from among the determined odd number of coding units 1130a, 1130b, and 1130c, or 1180a, 1180b, and 1180c may have a size different from the size of the other coding units 1130a and 1130c, or 1180a and 1180c. That is, coding units which may be determined by partitioning the current coding unit 1100 or 1150 may have multiple sizes and, in some cases, all of the odd number of coding units 1130a, 1130b, and 1130c, or 1180a, 1180b, and 1180c may have different sizes.

According to an embodiment, when the partition shape information indicates to partition a coding unit into an odd number of blocks, the video decoding apparatus 100 may determine an odd number of coding units included in the current coding unit 1100 or 1150, and put a predetermined restriction on at least one coding unit from among the odd number of coding units generated by partitioning the current coding unit 1100 or 1150. Referring to FIG. 11, the video decoding apparatus 100 may allow a decoding method of the coding unit 1130b or 1180b to be different from that of the other coding units 1130a and 1130c, or 1180a and 1180c, wherein the coding unit 1130b or 1180b is at a center location from among the three coding units 1130a, 1130b, and 1130c, or 1180a, 1180b, and 1180c generated by partitioning the current coding unit 1100 or 1150. For example, the video decoding apparatus 100 may restrict the coding unit 1130b or 1180b at the center location to be no longer partitioned or to be partitioned by only a predetermined number of times, unlike the other coding units 1130a and 1130c, or 1180a and 1180c.

Figure 12:
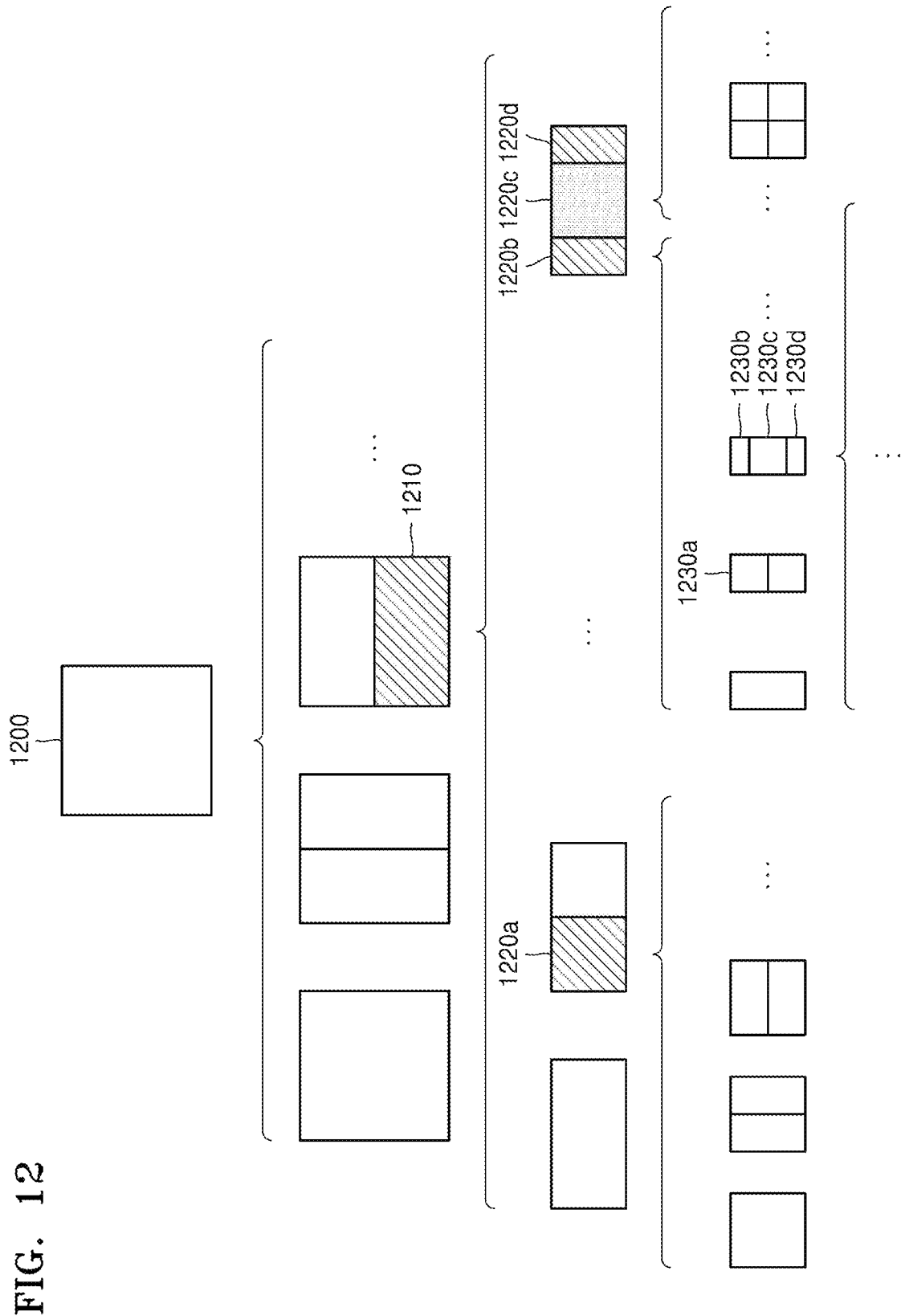
FIG. 12 illustrates an operation of partitioning a coding unit, based on at least one of block shape information and partition shape information, according to an embodiment.

FIG. 12 illustrates an operation, performed by the video decoding apparatus 100, of partitioning a coding unit based on at least one of block shape information and partition shape information, according to an embodiment.

According to an embodiment, the video decoding apparatus 100 may determine to or not to partition a square first coding unit 1200 into coding units, based on at least one of the block shape information and the partition shape information. According to an embodiment, when the partition shape information indicates to partition the first coding unit 1200 in a horizontal direction, the video decoding apparatus 100 may determine a second coding unit 1210 by partitioning the first coding unit 1200 in a horizontal direction. A first coding unit, a second coding unit, and a third coding unit used according to an embodiment are terms used to understand a relation before and after partitioning a coding unit. For example, a second coding unit may be determined by partitioning a first coding unit, and a third coding unit may be determined by partitioning the second coding unit. It will be understood that the structure of the first, second, and third coding units follows the above descriptions.

According to an embodiment, the video decoding apparatus 100 may determine to or not to partition the determined second coding unit 1210 into coding units, based on at least one of the block shape information and the partition shape information. Referring to FIG. 12, the video decoding apparatus 100 may or may not partition the non-square second coding unit 1210, which is determined by partitioning the first coding unit 1200, into one or more third coding units 1220a, or 1220b, 1220c, and 1220d based on at least one of the block shape information and the partition shape information. The video decoding apparatus 100 may obtain at least one of the block shape information and the partition shape information, and determine a plurality of various-shaped second coding units (e.g., 1210) by partitioning the first coding unit 1200, based on the obtained at least one of the block shape information and the partition shape information, and the second coding unit 1210 may be partitioned by using the partitioning method of the first coding unit

1200, based on at least one of the block shape information and the partition shape information. According to an embodiment, when the first coding unit 1200 is partitioned into the second coding units 1210 based on at least one of the block shape information and the partition shape information of the first coding unit 1200, the second coding unit 1210 may also be partitioned into the third coding units 1220a, or 1220b, 1220c, and 1220d based on at least one of the block shape information and the partition shape information of the second coding unit 1210. That is, a coding unit may be recursively partitioned based on at least one of the block shape information and the partition shape information of each coding unit. Therefore, a square coding unit may be determined by partitioning a non-square coding unit, and a non-square coding unit may be determined by recursively partitioning the square coding unit. Referring to FIG. 12, a predetermined coding unit from among an odd number of third coding units 1220b, 1220c, and 1220d determined by partitioning the non-square second coding unit 1210 (e.g., a coding unit at a center location or a square coding unit) may be recursively partitioned. According to an embodiment, the square third coding unit 1220c from among the odd number of third coding units 1220b, 1220c, and 1220d may be partitioned in a horizontal direction into a plurality of fourth coding units. A non-square fourth coding unit from among the plurality of fourth coding units may be partitioned into a plurality of coding units. For example, the non-square fourth coding unit 1240 may be partitioned into an odd number of coding units.

A method that may be used to recursively partition a coding unit will be described below in relation to various embodiments.

According to an embodiment, the video decoding apparatus 100 may determine to partition each of the third coding units 1220a, or 1220b, 1220c, and 1220d into coding units or not to partition the second coding unit 1210, based on at least one of the block shape information and the partition shape information. According to an embodiment, the video decoding apparatus 100 may partition the non-square second coding unit 1210 into the odd number of third coding units 1220b, 1220c, and 1220d. The video decoding apparatus 100 may put a predetermined restriction on a predetermined third coding unit from among the odd number of third coding units 1220b, 1220c, and 1220d. For example, the video decoding apparatus 100 may restrict the third coding unit 1220c at a center location from among the odd number of third coding units 1220b, 1220c, and 1220d to be no longer partitioned or to be partitioned by a settable number of times. Referring to FIG. 12, the video decoding apparatus 100 may restrict the third coding unit 1220c, which is at the center location from among the odd number of third coding units 1220b, 1220c, and 1220d included in the non-square second coding unit 1210, to be no longer partitioned, to be partitioned by using a predetermined partitioning method (e.g., partitioned into only four coding units or partitioned by using a partitioning method of the second coding unit 1210), or to be partitioned by only a predetermined number of times (e.g., partitioned by only n times (where n>0)). However, the restrictions on the third coding unit 1220c at the center location are not limited to the above-described examples, and may include various restrictions for decoding the third coding unit 1220c at the center location differently from the other third coding units 1220b and 1220d.

According to an embodiment, the video decoding apparatus 100 may obtain at least one of the block shape information and the partition shape information, which is used to partition a current coding unit, from a predetermined location in the current coding unit.

Figure 13:
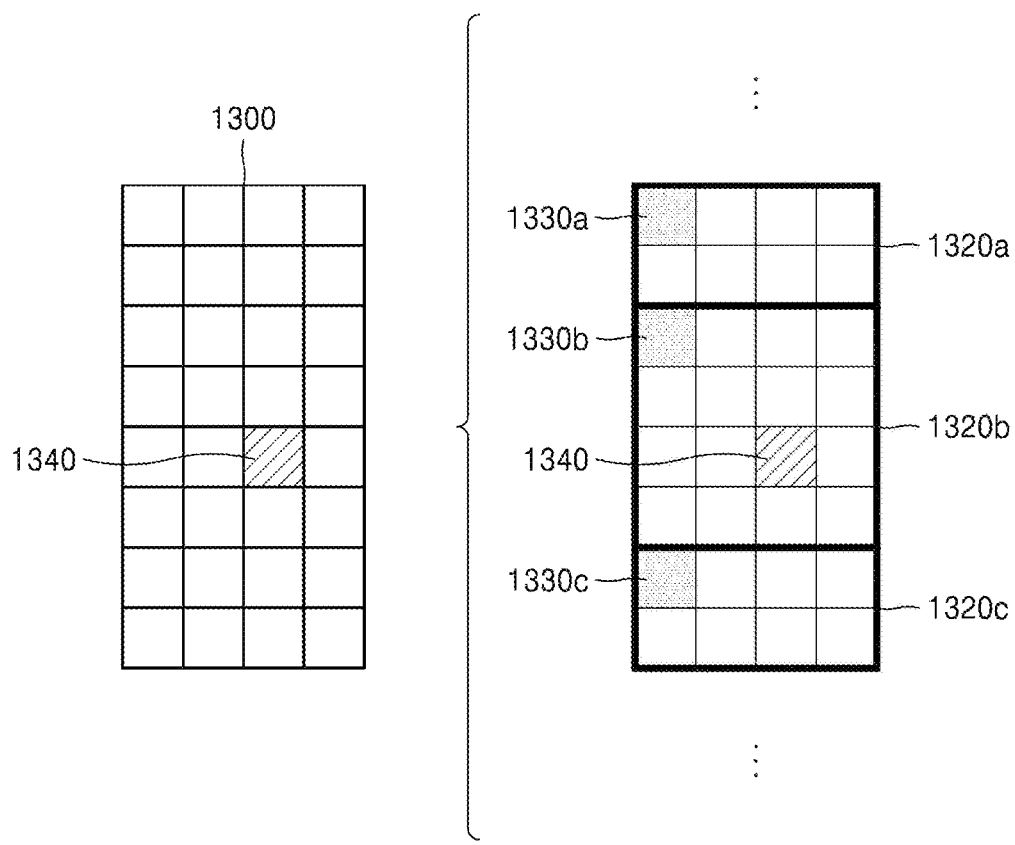
FIG. 13 illustrates a method of determining a predetermined coding unit from among an odd number of coding units, according to an embodiment.

FIG. 13 illustrates a method, performed by the video decoding apparatus 100, of determining a predetermined coding unit from among an odd number of coding units, according to an embodiment. Referring to FIG. 13, at least one of block shape information and partition shape information of a current coding unit 1300 may be obtained from a sample of a predetermined location from among a plurality of samples included in the current coding unit 1300 (e.g., a sample 1340 of a center location). However, the predetermined location in the current coding unit 1300, from which at least one of the block shape information and the partition shape information may be obtained, is not limited to the center location in FIG. 13, and may include various locations included in the current coding unit 1300 (e.g., top, bottom, left, right, top left, bottom left, top right, and bottom right locations). The video decoding apparatus 100 may obtain at least one of the block shape information and the partition shape information from the predetermined location and determine to or not to partition the current coding unit into various-shaped and various-sized coding units.

According to an embodiment, when the current coding unit is partitioned into a predetermined number of coding units, the video decoding apparatus 100 may select one of the coding units. Various methods may be used to select one of a plurality of coding units, as will be described below in relation to various embodiments.

According to an embodiment, the video decoding apparatus 100 may partition the current coding unit into a plurality of coding units, and determine a coding unit at a predetermined location.

FIG. 13 illustrates a method, performed by the video decoding apparatus 100, of determining a coding unit of a predetermined location from among an odd number of coding units, according to an embodiment.

According to an embodiment, the video decoding apparatus 100 may use information indicating locations of the odd number of coding units, to determine a coding unit at a center location from among the odd number of coding units. Referring to FIG. 13, the video decoding apparatus 100 may determine an odd number of coding units 1320a, 1320b, and 1320c by partitioning the current coding unit 1300. The video decoding apparatus 100 may determine a coding unit 1320b at a center location by using information about locations of the odd number of coding units 1320a to 1320c. For example, the video decoding apparatus 100 may determine the coding unit 1320b of the center location by determining the locations of the coding units 1320a, 1320b, and 1320c based on information indicating locations of predetermined samples included in the coding units 1320a, 1320b, and 1320c. In more detail, the video decoding apparatus 100 may determine the coding unit 1320b at the center location by determining the locations of the coding units 1320a, 1320b, and 1320c based on information indicating locations of top left samples 1330a, 1330b, and 1330c of the coding units 1320a, 1320b, and 1320c.

According to an embodiment, the information indicating the locations of the top left samples 1330a, 1330b, and 1330c, which are included in the coding units 1320a, 1320b, and 1320c, respectively, may include information about locations or coordinates of the coding units 1320a, 1320b, and 1320c in a picture. According to an embodiment, the information indicating the locations of the top left samples 1330a, 1330b, and 1330c, which are included in the coding units 1320a, 1320b, and 1320c, respectively, may include information indicating widths or heights of the coding units 1320*a*, 1320*b*, and 1320*c* included in the current coding unit 1300, and the widths or heights may correspond to information indicating differences between the coordinates of the coding units 1320*a*, 1320*b*, and 1320*c* in the picture. That is, the video decoding apparatus 100 may determine the coding unit 1320*b* at the center location by directly using the information about the locations or coordinates of the coding units 1320*a*, 1320*b*, and 1320*c* in the picture, or by using the information about the widths or heights of the coding units, which correspond to the difference values between the coordinates.

According to an embodiment, information indicating the location of the top left sample 1330*a* of the upper coding unit 1320*a* may include a coordinate (xa, ya), information indicating the location of the top left sample 1330*b* of the middle coding unit 1320*b* may include a coordinate (xb, yb), and information indicating the location of the top left sample 1330*c* of the lower coding unit 1320*c* may include a coordinate (xc, yc). The video decoding apparatus 100 may determine the middle coding unit 1320*b* by using the coordinates of the top left samples 1330*a*, 1330*b*, and 1330*c* which are included in the coding units 1320*a*, 1320*b*, and 1320*c*, respectively. For example, when the coordinates of the top left samples 1330*a*, 1330*b*, and 1330*c* are sorted in an ascending or descending order, the coding unit 1320*b* including the coordinate (xb, yb) of the sample 1330*b* at a center location may be determined as a coding unit at a center location from among the coding units 1320*a*, 1320*b*, and 1320*c* determined by partitioning the current coding unit 1300. However, the coordinates indicating the locations of the top left samples 1330*a*, 1330*b*, and 1330*c* may include coordinates indicating absolute locations in the picture, or may use a coordinate (dxb, dyb) indicating a relative location of the top left sample 1330*b* of the middle coding unit 1320*b* and a coordinate (dxc, dyc) indicating a relative location of the top left sample 1330*c* of the lower coding unit 1320*c* with reference to the location of the top left sample 1330*a* of the upper coding unit 1320*a*. A method of determining a coding unit at a predetermined location by using a coordinate of a sample included in the coding unit, as information indicating a location of the sample, is not limited to the above-described method, and may include various arithmetic methods capable of using the coordinate of the sample.

According to an embodiment, the video decoding apparatus 100 may partition the current coding unit 1300 into a plurality of coding units 1320*a*, 1320*b*, and 1320*c*, and select one of the coding units 1320*a*, 1320*b*, and 1320*c* based on a predetermined criterion. For example, the video decoding apparatus 100 may select the coding unit 1320*b*, which has a size different from that of the others, from among the coding units 1320*a*, 1320*b*, and 1320*c*.

According to an embodiment, the video decoding apparatus 100 may determine the widths or heights of the coding units 1320*a*, 1320*b*, and 1320*c* by using the coordinate (xa, ya) indicating the location of the top left sample 1330*a* of the upper coding unit 1320*a*, the coordinate (xb, yb) indicating the location of the top left sample 1330*b* of the middle coding unit 1320*b*, and the coordinate (xc, yc) indicating the location of the top left sample 1330*c* of the lower coding unit 1320*c*. The video decoding apparatus 100 may determine the sizes of the coding units 1320*a*, 1320*b*, and 1320*c* by using the coordinates (xa, ya), (xb, yb), and (xc, yc) indicating the locations of the coding units 1320*a*, 1320*b*, and 1320*c*.

According to an embodiment, the video decoding apparatus 100 may determine the width of the upper coding unit 1320*a* to be xb-xa and determine the height thereof to be yb-ya. According to an embodiment, the video decoding apparatus 100 may determine the width of the middle coding unit 1320*b* to be xc-xb and determine the height thereof to be yc-yb. According to an embodiment, the video decoding apparatus 100 may determine the width or height of the lower coding unit 1320*c* by using the width or height of the current coding unit 1300 or the widths or heights of the upper and middle coding units 1320*a* and 1320*b*. The video decoding apparatus 100 may determine a coding unit, which has a size different from that of the others, based on the determined widths and heights of the coding units 1320*a* to 1320*c*. Referring to FIG. 13, the video decoding apparatus 100 may determine the middle coding unit 1320*b*, which has a size different from the size of the upper and lower coding units 1320*a* and 1320*c*, as the coding unit of the predetermined location. However, the above-described method, performed by the video decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the video decoding apparatus 100 may select a coding unit at a predetermined location from among an odd number of coding units determined by partitioning the current coding unit, considering the shape of the current coding unit. For example, when the current coding unit has a non-square shape, a width of which is longer than a height, the video decoding apparatus 100 may determine the coding unit at the predetermined location in a horizontal direction. That is, the video decoding apparatus 100 may determine one of coding units at different locations in a horizontal direction and put a restriction on the coding unit. When the current coding unit has a non-square shape, a height of which is longer than a width, the video decoding apparatus 100 may determine the coding unit at the predetermined location in a vertical direction. That is, the video decoding apparatus 100 may determine one of coding units at different locations in a vertical direction and put a restriction on the coding unit.

According to an embodiment, the video decoding apparatus 100 may use information indicating locations of an even number of coding units, to determine the coding unit at the predetermined location from among the even number of coding units. The video decoding apparatus 100 may determine an even number of coding units by partitioning the current coding unit, and determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 13, and thus detailed descriptions thereof will not be provided herein.

According to an embodiment, when a non-square current coding unit is partitioned into a plurality of coding units, predetermined information about a coding unit at a predetermined location may be used in a partitioning operation to determine the coding unit at the predetermined location from among the plurality of coding units. For example, the video decoding apparatus 100 may use at least one of block shape information and partition shape information, which is stored in a sample included in a coding unit at a center location, in a partitioning operation to determine the coding unit at the center location from among the plurality of coding units determined by partitioning the current coding unit.

Referring to FIG. 13, the video decoding apparatus 100 may partition the current coding unit 1300 into a plurality of coding units 1320a, 1320b, and 1320c based on at least one of the block shape information and the partition shape information, and determine a coding unit 1320b at a center location from among the plurality of the coding units 1320a, 1320b, and 1320c. Furthermore, the video decoding apparatus 100 may determine the coding unit 1320b at the center location, in consideration of a location from which at least one of the block shape information and the partition shape information is obtained. That is, at least one of the block shape information and the partition shape information of the current coding unit 1300 may be obtained from the sample 1340 at a center location of the current coding unit 1300 and, when the current coding unit 1300 is partitioned into the plurality of coding units 1320a, 1320b, and 1320c based on at least one of the block shape information and the partition shape information, the coding unit 1320b including the sample 1340 may be determined as the coding unit at the center location. However, information used to determine the coding unit at the center location is not limited to at least one of the block shape information and the partition shape information, and various types of information may be used to determine the coding unit at the center location.

According to an embodiment, predetermined information for identifying the coding unit at the predetermined location may be obtained from a predetermined sample included in a coding unit to be determined. Referring to FIG. 13, the video decoding apparatus 100 may use at least one of the block shape information and the partition shape information, which is obtained from a sample at a predetermined location in the current coding unit 1300 (e.g., a sample at a center location of the current coding unit 1300) to determine a coding unit at a predetermined location from among the plurality of the coding units 1320a, 1320b, and 1320c determined by partitioning the current coding unit 1300 (e.g., a coding unit at a center location from among a plurality of partitioned coding units). That is, the video decoding apparatus 100 may determine the sample at the predetermined location by considering a block shape of the current coding unit 1300, determine the coding unit 1320b including a sample, from which predetermined information (e.g., at least one of the block shape information and the partition shape information) may be obtained, from among the plurality of coding units 1320a, 1320b, and 1320c determined by partitioning the current coding unit 1300, and put a predetermined restriction on the coding unit 1320b. Referring to FIG. 13, according to an embodiment, the video decoding apparatus 100 may determine the sample 1340 at the center location of the current coding unit 1300 as the sample from which the predetermined information may be obtained, and put a predetermined restriction on the coding unit 1320b including the sample 1340, in a decoding operation. However, the location of the sample from which the predetermined information may be obtained is not limited to the above-described location, and may include arbitrary locations of samples included in the coding unit 1320b to be determined for a restriction.

According to an embodiment, the location of the sample from which the predetermined information may be obtained may be determined based on the shape of the current coding unit 1300. According to an embodiment, the block shape information may indicate whether the current coding unit has a square or non-square shape, and the location of the sample from which the predetermined information may be obtained may be determined based on the shape. For example, the video decoding apparatus 100 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the video decoding apparatus 100 may determine one of samples adjacent to a boundary for dividing a long side of the current coding unit in half, as the sample from which the predetermined information may be obtained.

According to an embodiment, when the current coding unit is partitioned into a plurality of coding units, the video decoding apparatus 100 may use at least one of the block shape information and the partition shape information to determine a coding unit at a predetermined location from among the plurality of coding units. According to an embodiment, the video decoding apparatus 100 may obtain at least one of the block shape information and the partition shape information from a sample at a predetermined location in a coding unit, and partition the plurality of coding units, which are generated by partitioning the current coding unit, by using at least one of the partition shape information and the block shape information, which is obtained from the sample of the predetermined location in each of the plurality of coding units. That is, a coding unit may be recursively partitioned based on at least one of the block shape information and the partition shape information, which is obtained from the sample of the predetermined location in each coding unit. An operation of recursively partitioning a coding unit has been described above in relation to FIG. 12, and thus detailed descriptions thereof will not be provided herein.

According to an embodiment, the video decoding apparatus 100 may determine one or more coding units by partitioning the current coding unit, and determine an order of decoding the one or more coding units, based on a predetermined block (e.g., the current coding unit).

Figure 14:
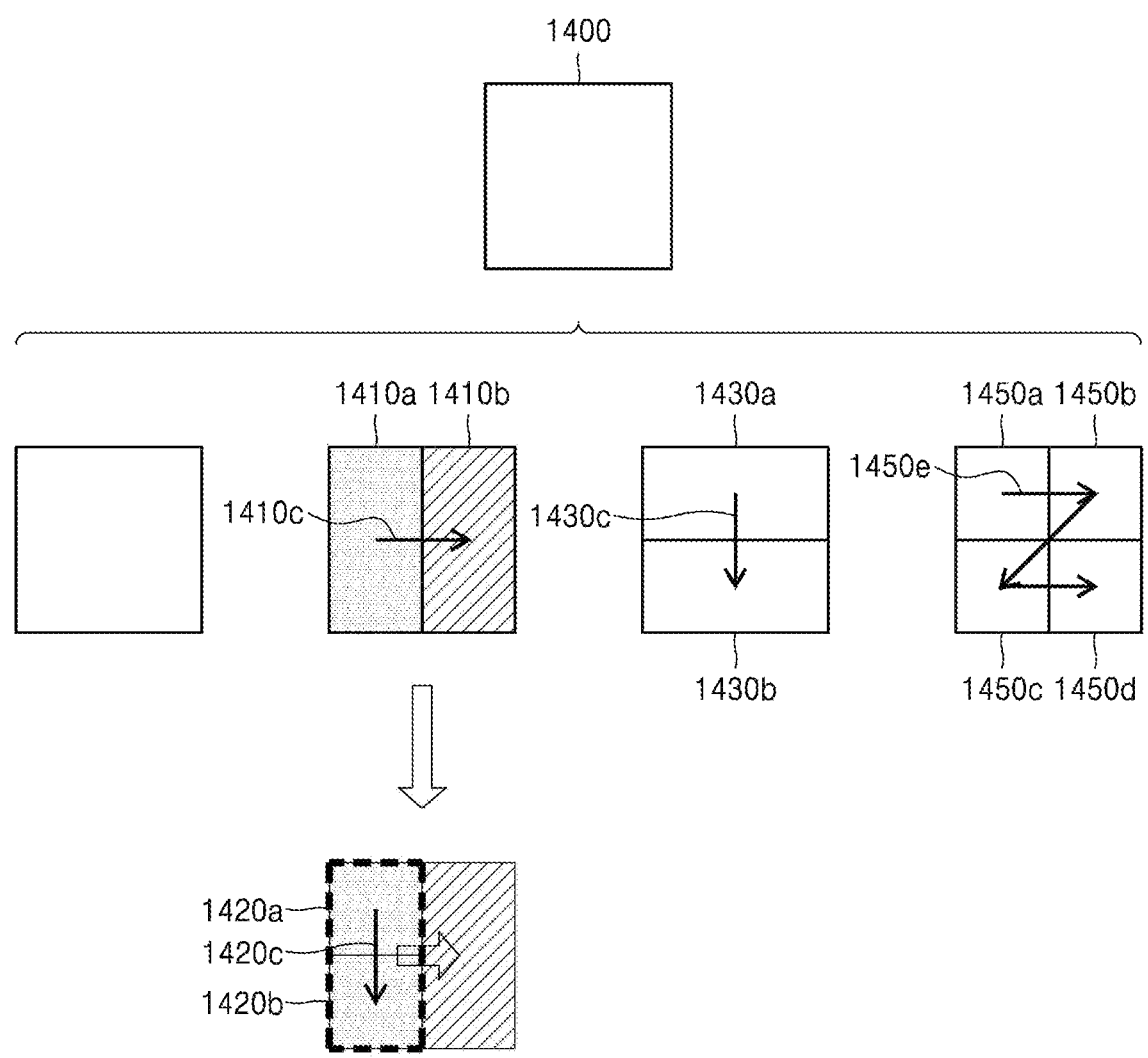
FIG. 14 illustrates a processing order of a plurality of coding units determined by partitioning a current coding unit, according to an embodiment.

FIG. 14 illustrates a processing order of a plurality of coding units when the video decoding apparatus 100 determines the plurality of coding units by partitioning a current coding unit, according to an embodiment.

According to an embodiment, the video decoding apparatus 100 may determine second coding units 1410a and 1410b by partitioning a first coding unit 1400 in a vertical direction, determine second coding units 1430a and 1430b by partitioning the first coding unit 1400 in a horizontal direction, or determine second coding units 1450a to 1450d by partitioning the first coding unit 1400 in vertical and horizontal directions, based on block shape information and partition shape information.

Referring to FIG. 14, the video decoding apparatus 100 may determine to process the second coding units 1410a and 1410b, which are determined by partitioning the first coding unit 1400 in a vertical direction, in a horizontal direction order 1410c. The video decoding apparatus 100 may determine to process the second coding units 1430a and 1430b, which are determined by partitioning the first coding unit 1400 in a horizontal direction, in a vertical direction order 1430*c*. The video decoding apparatus 100 may determine to process the second coding units 1450*a* to 1450*d*, which are determined by partitioning the first coding unit 1400 in vertical and horizontal directions, in a predetermined order for processing coding units in a row and then processing coding units in a next row (e.g., in a raster scan order or Z-scan order 1450*e*).

According to an embodiment, the video decoding apparatus 100 may recursively partition coding units. Referring to FIG. 14, the video decoding apparatus 100 may determine a plurality of coding units 1410*a*, 1410*b*, 1430*a*, 1430*b*, 1450*a*, 1450*b*, 1450*c*, and 1450*d* by partitioning the first coding unit 1400, and recursively partition each of the determined plurality of coding units 1410*a*, 1410*b*, 1430*a*, 1430*b*, 1450*a*, 1450*b*, 1450*c*, and 1450*d*. A partitioning method of the plurality of coding units 1410*a*, 1410*b*, 1430*a*, 1430*b*, 1450*a*, 1450*b*, 1450*c*, and 1450*d* may correspond to a partitioning method of the first coding unit 1400. As such, each of the plurality of coding units 1410*a*, 1410*b*, 1430*a*, 1430*b*, 1450*a*, 1450*b*, 1450*c*, and 1450*d* may be independently partitioned into a plurality of coding units. Referring to FIG. 14, the video decoding apparatus 100 may determine the second coding units 1410*a* and 1410*b* by partitioning the first coding unit 1400 in a vertical direction, and determine to independently partition or not to partition each of the second coding units 1410*a* and 1410*b*.

According to an embodiment, the video decoding apparatus 100 may determine third coding units 1420*a* and 1420*b* by partitioning the left second coding unit 1410*a* in a horizontal direction, and may not partition the right second coding unit 1410*b*.

According to an embodiment, a processing order of coding units may be determined based on an operation of partitioning a coding unit. In other words, a processing order of partitioned coding units may be determined based on a processing order of coding units immediately before being partitioned. The video decoding apparatus 100 may determine a processing order of the third coding units 1420*a* and 1420*b* determined by partitioning the left second coding unit 1410*a*, independently of the right second coding unit 1410*b*. Since the third coding units 1420*a* and 1420*b* are determined by partitioning the left second coding unit 1410*a* in a horizontal direction, the third coding units 1420*a* and 1420*b* may be processed in a vertical direction order 1420*c*. Since the left and right second coding units 1410*a* and 1410*b* are processed in the horizontal direction order 1410*c*, the right second coding unit 1410*b* may be processed after the third coding units 1420*a* and 1420*b* included in the left second coding unit 1410*a* are processed in the vertical direction order 1420*c*. An operation of determining a processing order of coding units based on a coding unit before being partitioned is not limited to the above-described example, and various methods may be used to independently process coding units, which are partitioned and determined to various shapes, in a predetermined order.

Figure 15:
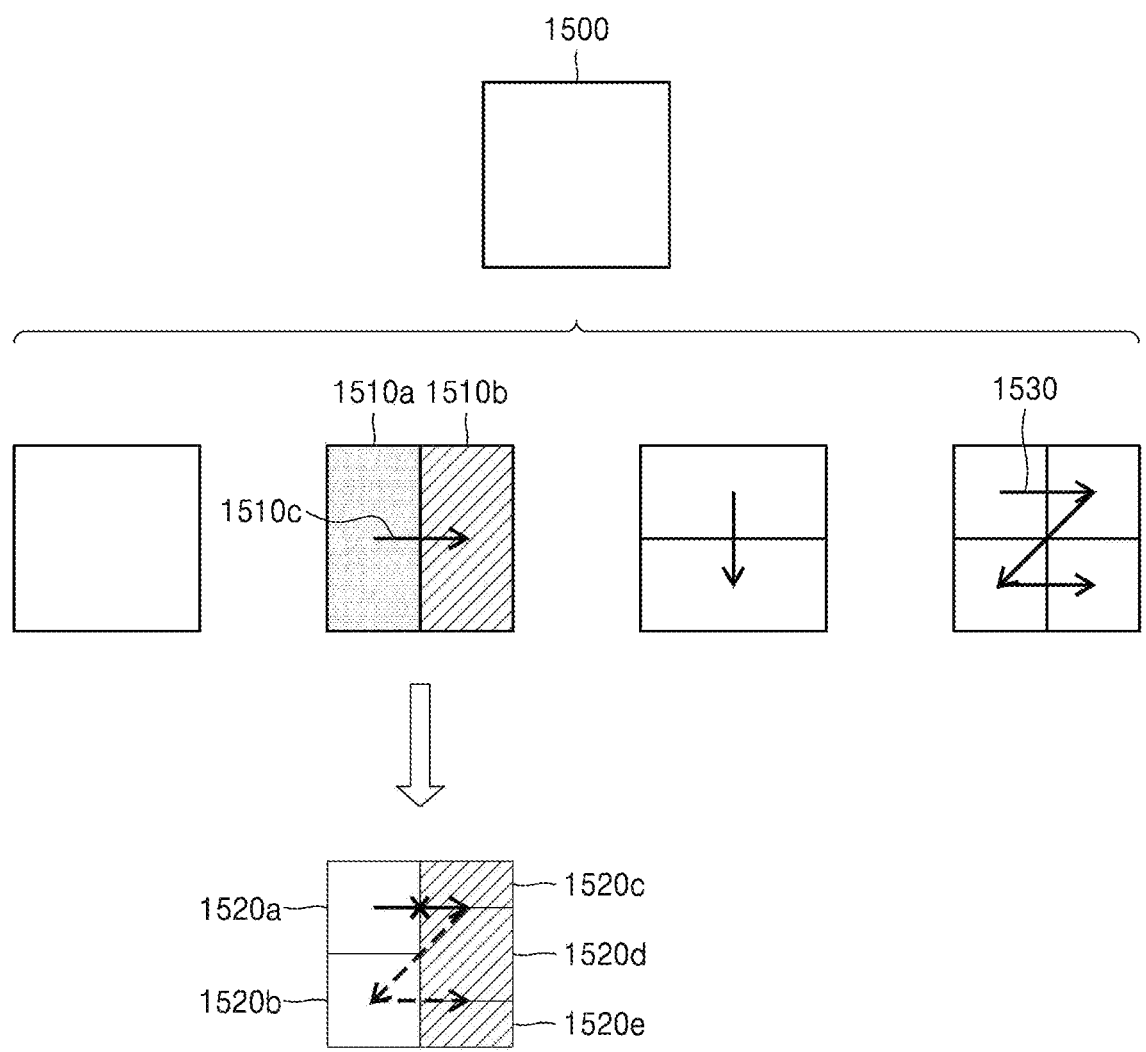
FIG. 15 illustrates an operation of determining that a current coding unit is partitioned into an odd number of coding units, when the coding units are not processable in a predetermined order, according to an embodiment.

FIG. 15 illustrates an operation, performed by the video decoding apparatus 100, of determining that a current coding unit is partitioned into an odd number of coding units, when the coding units are not processable in a predetermined order, according to an embodiment.

According to an embodiment, the video decoding apparatus 100 may determine whether the current coding unit is partitioned into an odd number of coding units, based on obtained block shape information and partition shape information. Referring to FIG. 15, a square first coding unit 1500 may be partitioned into non-square second coding units 1510*a* and 1510*b*, and the second coding units 1510*a* and 1510*b* may be independently partitioned into third coding units 1520*a* and 1520*b*, and 1520*c* to 1520*e*. According to an embodiment, the video decoding apparatus 100 may determine a plurality of third coding units 1520*a* and 1520*b* by partitioning the left second coding unit 1510*a* in a horizontal direction, and partition the right second coding unit 1510*b* into an odd number of third coding units 1520*c* to 1520*e*.

According to an embodiment, the video decoding apparatus 100 may determine whether any coding unit is partitioned into an odd number of coding units, by deciding whether the third coding units 1520*a* and 1520*b*, and 1520*c* to 1520*e* are processable in a predetermined order. Referring to FIG. 15, the video decoding apparatus 100 may determine the third coding units 1520*a* and 1520*b*, and 1520*c* to 1520*e* by recursively partitioning the first coding unit 1500. The video decoding apparatus 100 may determine whether any of the first coding unit 1500, the second coding units 1510*a* and 1510*b*, and the third coding units 1520*a* and 1520*b*, and 1520*c* to 1520*e* is partitioned into an odd number of coding units, based on at least one of the block shape information and the partition shape information. For example, the right second coding unit 1510*b* may be partitioned into an odd number of third coding units 1520*c* to 1520*e*. A processing order of a plurality of coding units included in the first coding unit 1500 may be a predetermined order (e.g., a Z-scan order 1530), and the video decoding apparatus 100 may decide whether the third coding units 1520*c* to 1520*e*, which are determined by partitioning the right second coding unit 1510*b* into an odd number of coding units, satisfy a condition for processing in the predetermined order.

According to an embodiment, the video decoding apparatus 100 may determine whether the third coding units 1520*a* and 1520*b*, and 1520*c* to 1520*e* included in the first coding unit 1500 satisfy the condition for processing in the predetermined order, and the condition relates to whether at least one of a width and height of the second coding units 1510*a* and 1510*b* is divided in half along a boundary of the third coding units 1520*a* and 1520*b*, and 1520*c* to 1520*e*. For example, the third coding units 1520*a* and 1520*b* determined by dividing the height of the non-square left second coding unit 1510*a* in half satisfy the condition. However, since boundaries of the third coding units 1520*c* to 1520*e* determined by partitioning the right second coding unit 1510*b* into three coding units do not divide the width or height of the right second coding unit 1510*b* in half, it may be determined that the third coding units 1520*c* to 1520*e* do not satisfy the condition. When the condition is not satisfied as described above, the video decoding apparatus 100 may decide disconnection of a scan order, and determine that the right second coding unit 1510*b* is partitioned into an odd number of coding units, based on the result of decision. According to an embodiment, when a coding unit is partitioned into an odd number of coding units, the video decoding apparatus 100 may put a predetermined restriction on a coding unit of a predetermined location among the partitioned coding units. The restriction or the predetermined location has been described above in relation to various embodiments, and thus a detailed description thereof will not be provided herein.

Figure 16:
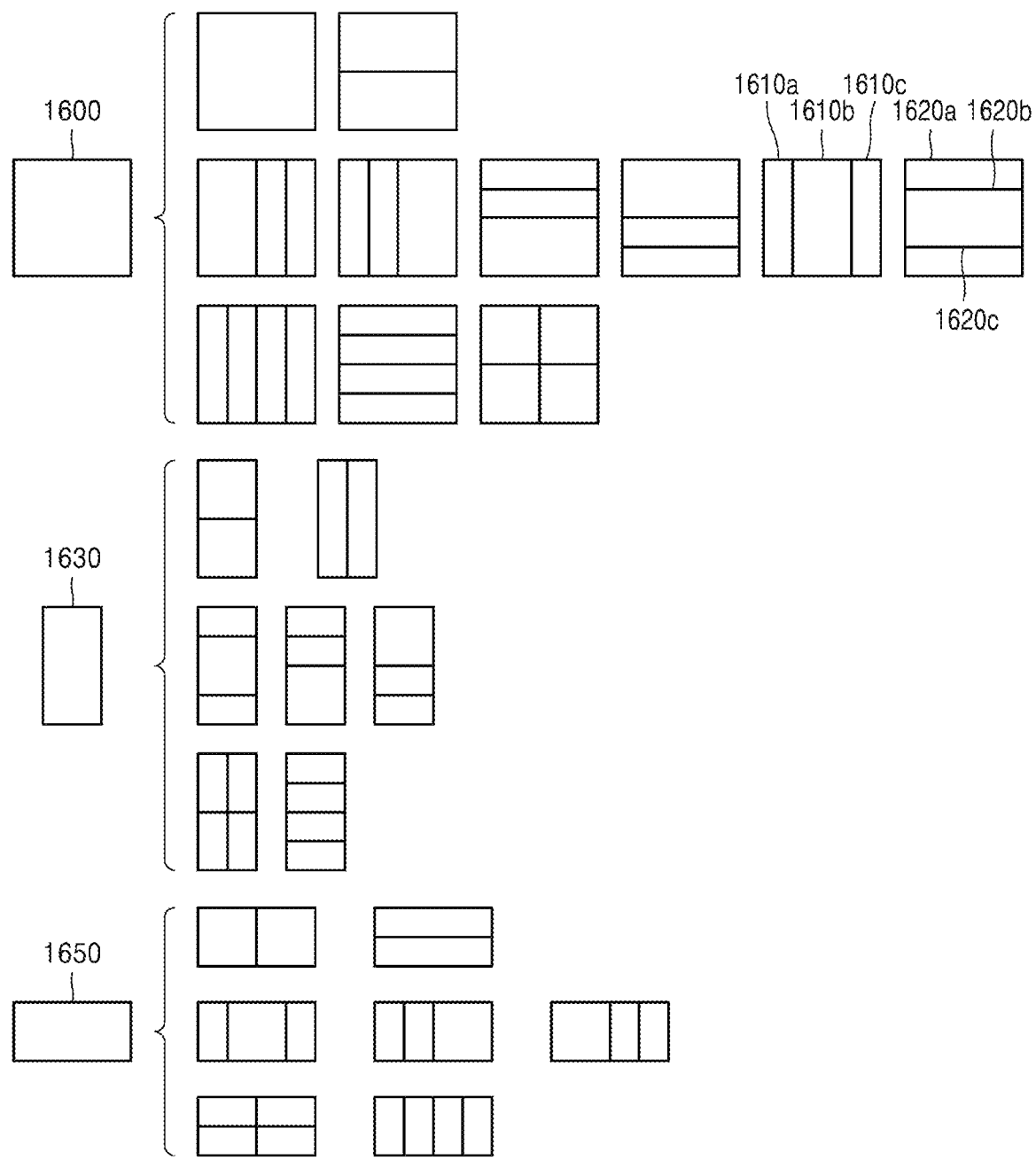
FIG. 16 illustrates an operation of determining one or more coding units by partitioning a first coding unit, according to an embodiment.

FIG. 16 illustrates an operation, performed by the video decoding apparatus 100, of determining one or more coding units by partitioning a first coding unit 1600, according to an embodiment. According to an embodiment, the video decoding apparatus 100 may partition the first coding unit 1600, based on at least one of block shape information and partition shape information, which is obtained by the obtainer 110. The square first coding unit 1600 may be partitioned into four square coding units or into a plurality of non-square coding units. For example, referring to FIG. 16, when the block shape information indicates that the first coding unit 1600 has a square shape and the partition shape information indicates to partition the first coding unit 1600 into non-square coding units, the video decoding apparatus 100 may partition the first coding unit 1600 into a plurality of non-square coding units. In more detail, when the partition shape information indicates to determine an odd number of coding units by partitioning the first coding unit 1600 in a horizontal direction or a vertical direction, the video decoding apparatus 100 may partition the square first coding unit 1600 into an odd number of coding units, e.g., second coding units 1610a, 1610b, and 1610c determined by partitioning the square first coding unit 1600 in a vertical direction or second coding units 1620a, 1620b, and 1620c determined by partitioning the square first coding unit 1600 in a horizontal direction.

According to an embodiment, the video decoding apparatus 100 may determine whether the second coding units 1610a, 1610b, 1610c, 1620a, 1620b, and 1620c included in the first coding unit 1600 satisfy a condition for processing in a predetermined order, and the condition relates to whether at least one of a width and height of the first coding unit 1600 is divided in half along a boundary of the second coding units 1610a, 1610b, 1610c, 1620a, 1620b, and 1620c. Referring to FIG. 16, since boundaries of the second coding units 1610a, 1610b, and 1610c determined by partitioning the square first coding unit 1600 in a vertical direction do not divide the width of the first coding unit 1600 in half, it may be determined that the first coding unit 1600 does not satisfy the condition for processing in the predetermined order. In addition, since boundaries of the second coding units 1620a, 1620b, and 1620c determined by partitioning the square first coding unit 1600 in a horizontal direction do not divide the height of the first coding unit 1600 in half, it may be determined that the first coding unit 1600 does not satisfy the condition for processing in the predetermined order. When the condition is not satisfied as described above, the video decoding apparatus 100 may decide disconnection of a scan order, and determine that the first coding unit 1600 is partitioned into an odd number of coding units, based on the result of decision. According to an embodiment, when a coding unit is partitioned into an odd number of coding units, the video decoding apparatus 100 may put a predetermined restriction on a coding unit at a predetermined location from among the partitioned coding units. The restriction or the predetermined location has been described above in relation to various embodiments, and thus detailed descriptions thereof will not be provided herein.

According to an embodiment, the video decoding apparatus 100 may determine various-shaped coding units by partitioning a first coding unit.

Referring to FIG. 16, the video decoding apparatus 100 may partition the square first coding unit 1600 or a non-square first coding unit 1630 or 1650 into various-shaped coding units.

Figure 17:
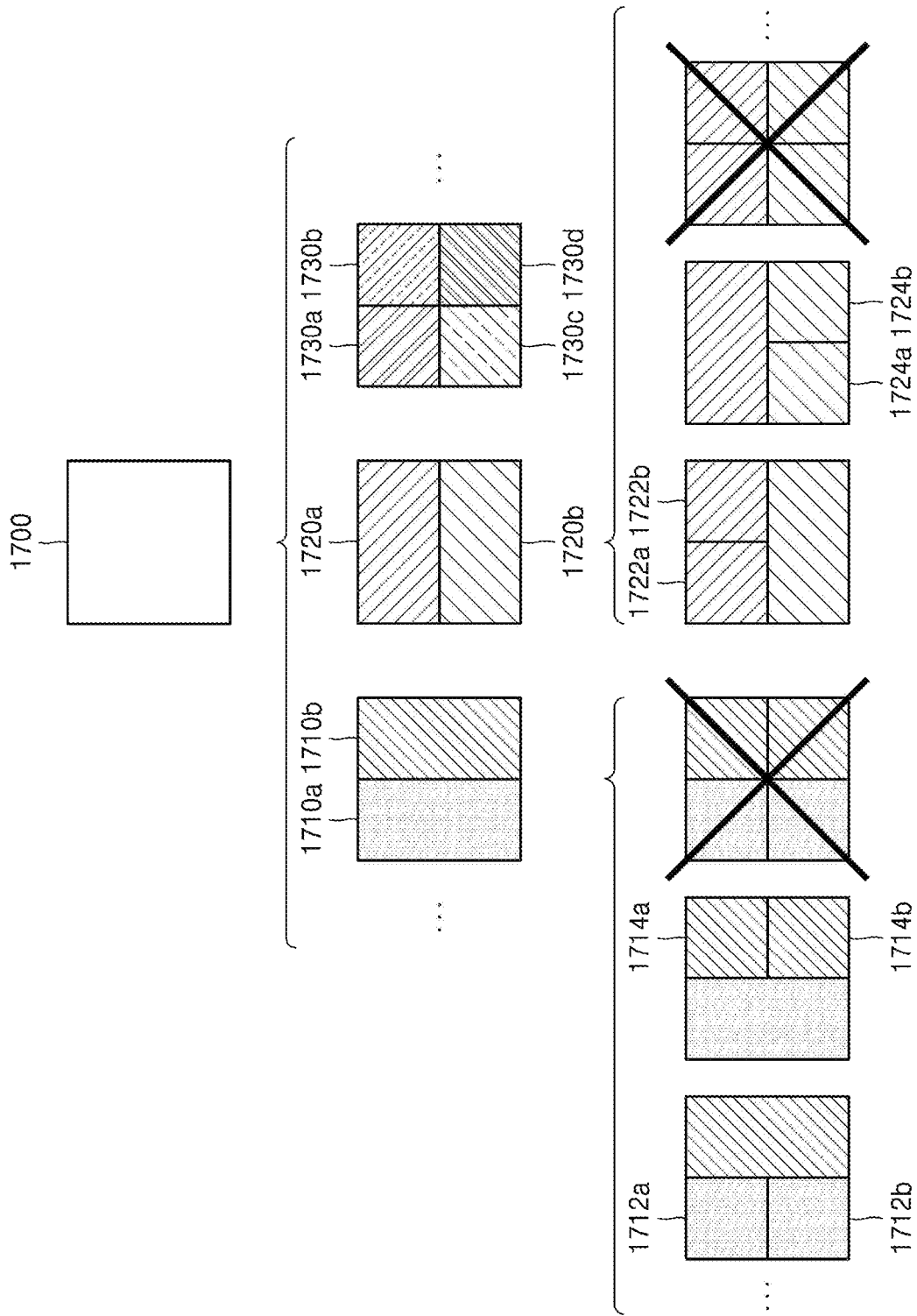
FIG. 17 illustrates that partitioning methods of determining non-square second coding units by partitioning a first coding unit are restricted when the second coding units satisfy a predetermined condition, according to an embodiment.

FIG. 17 illustrates that a shape into which a second coding unit is splittable by the video decoding apparatus 100 is restricted when the second coding unit having a non-square shape, which is determined by partitioning a first coding unit 1700, satisfies a predetermined condition, according to an embodiment.

According to an embodiment, the video decoding apparatus 100 may determine to partition the square first coding unit 1700 into non-square second coding units 1710a, 1710b, 1720a, and 1720b, based on at least one of block shape information and partition shape information, which is obtained by the obtainer 110. The second coding units 1710a, 1710b, 1720a, and 1720b may be independently partitioned. As such, the video decoding apparatus 100 may determine to or not to partition the first coding unit 1700 into a plurality of coding units, based on at least one of the block shape information and the partition shape information of each of the second coding units 1710a, 1710b, 1720a, and 1720b. According to an embodiment, the video decoding apparatus 100 may determine third coding units 1712a and 1712b by partitioning the non-square left second coding unit 1710a, which is determined by partitioning the first coding unit 1700 in a vertical direction, in a horizontal direction. However, when the left second coding unit 1710a is partitioned in a horizontal direction, the video decoding apparatus 100 may restrict the right second coding unit 1710b not to be partitioned in a horizontal direction in which the left second coding unit 1710a is partitioned. When third coding units 1714a and 1714b are determined by also partitioning the right second coding unit 1710b in a horizontal direction, since the left and right second coding units 1710a and 1710b are independently partitioned in a horizontal direction, the third coding units 1712a, 1712b, 1714a, and 1714b may be determined. However, this case serves equally as a case in which the video decoding apparatus 100 partitions the first coding unit 1700 into four square second coding units 1730a, 1730b, 1730c, and 1730d, based on at least one of the block shape information and the partition shape information, and may be inefficient in terms of image decoding.

According to an embodiment, the video decoding apparatus 100 may determine third coding units 1722a, 1722b, 1724a, and 1724b by partitioning the non-square second coding unit 1720a or 1720b, which is determined by partitioning the first coding unit 1700 in a horizontal direction, in a vertical direction. However, when a second coding unit (e.g., the upper second coding unit 1720a) is partitioned in a vertical direction, due to the above-described reason, the video decoding apparatus 100 may restrict the other second coding unit (e.g., the lower second coding unit 1720b) not to be partitioned in a vertical direction in which the upper second coding unit 1720a is partitioned.

Figure 18:
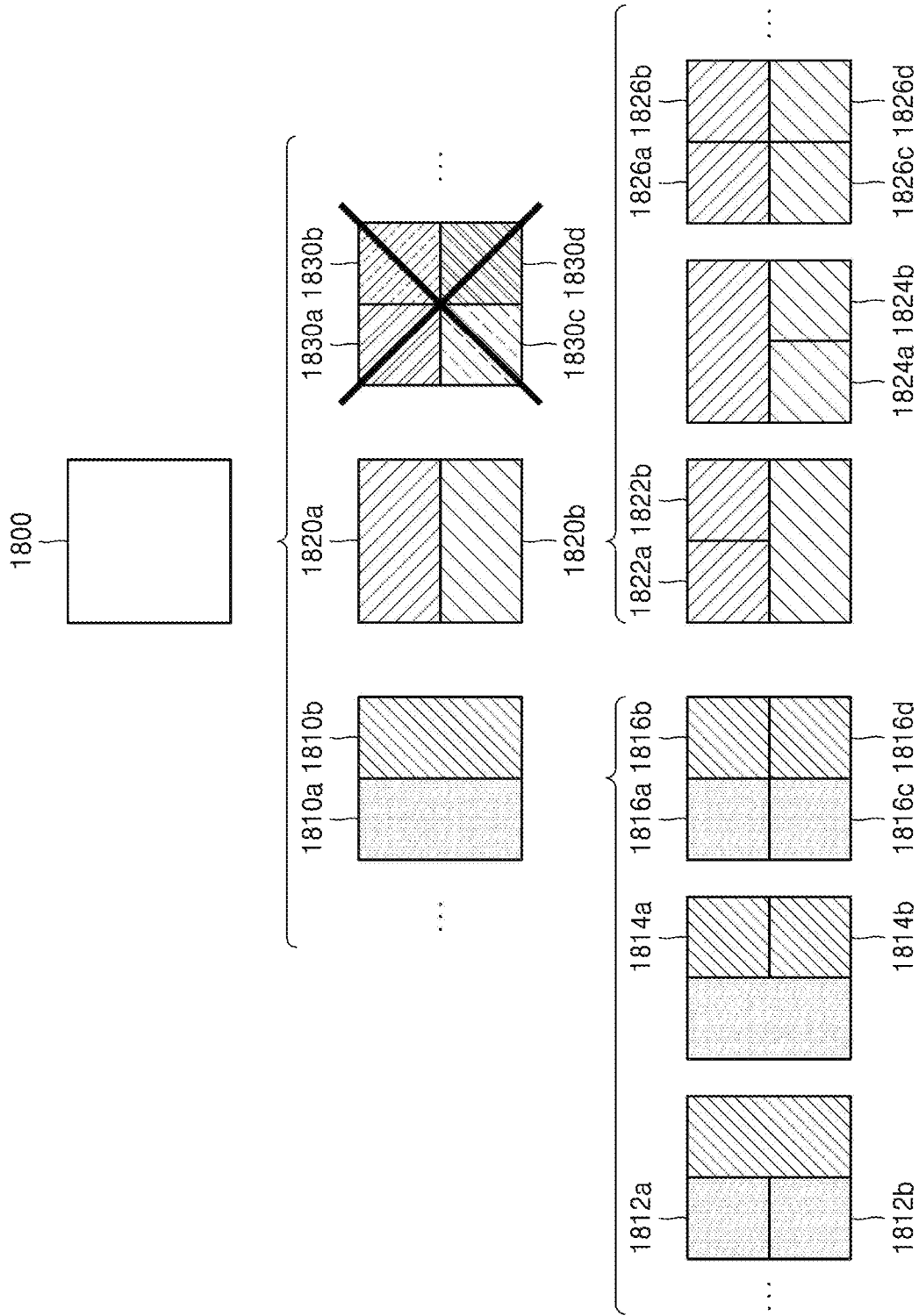
FIG. 18 illustrates an operation of partitioning a square coding unit when partition shape information indicates not to partition the square coding unit into four square coding units, according to an embodiment.

FIG. 18 illustrates an operation, performed by the video decoding apparatus 100, of partitioning a square coding unit when partition shape information indicates not to partition the square coding unit into four square coding units, according to an embodiment.

According to an embodiment, the video decoding apparatus 100 may determine second coding units 1810a, 1810b, 1820a, 1820b, etc. by partitioning a first coding unit 1800, based on at least one of block shape information and partition shape information. The partition shape information may include information about various methods of partitioning a coding unit but, the information about various partitioning methods may not include information for partitioning a coding unit into four square coding units. According to this partition shape information, the video decoding apparatus 100 may not partition the first square coding unit 1800 into four square second coding units 1830a, 1830b, 1830c, and 1830d. The video decoding apparatus 100 may determine the non-square second coding units 1810a, 1810b, 1820a, 1820b, etc., based on the partition shape information.

According to an embodiment, the video decoding apparatus 100 may independently partition the non-square second coding units 1810a, 1810b, 1820a, 1820b, etc. Each of the second coding units 1810a, 1810b, 1820a, 1820b, etc. may be recursively partitioned in a predetermined order, and this may correspond to a partitioning method of the first coding unit 1800, based on at least one of the block shape information and the partition shape information.

For example, the video decoding apparatus 100 may determine square third coding units 1812a and 1812b by partitioning the left second coding unit 1810a in a horizontal direction, and determine square third coding units 1814a and 1814b by partitioning the right second coding unit 1810b in a horizontal direction. Furthermore, the video decoding apparatus 100 may determine square third coding units 1816a to 1816d by partitioning both of the left and right second coding units 1810a and 1810b in a horizontal direction. In this case, coding units having the same shape as the four square second coding units 1830a, 1830b, 1830c, and 1830d partitioned from the first coding unit 1800 may be determined.

As another example, the video decoding apparatus 100 may determine square third coding units 1822a and 1822b by partitioning the upper second coding unit 1820a in a vertical direction, and determine square third coding units 1824a and 1824b by partitioning the lower second coding unit 1820b in a vertical direction. Furthermore, the video decoding apparatus 100 may determine square third coding units 1826a, 1826b, 1826c, and 1826d by partitioning both of the upper and lower second coding units 1820a and 1820b in a vertical direction. In this case, coding units having the same shape as the four square second coding units 1830a, 1830b, 1830c, and 1830d partitioned from the first coding unit 1800 may be determined.

Figure 19:
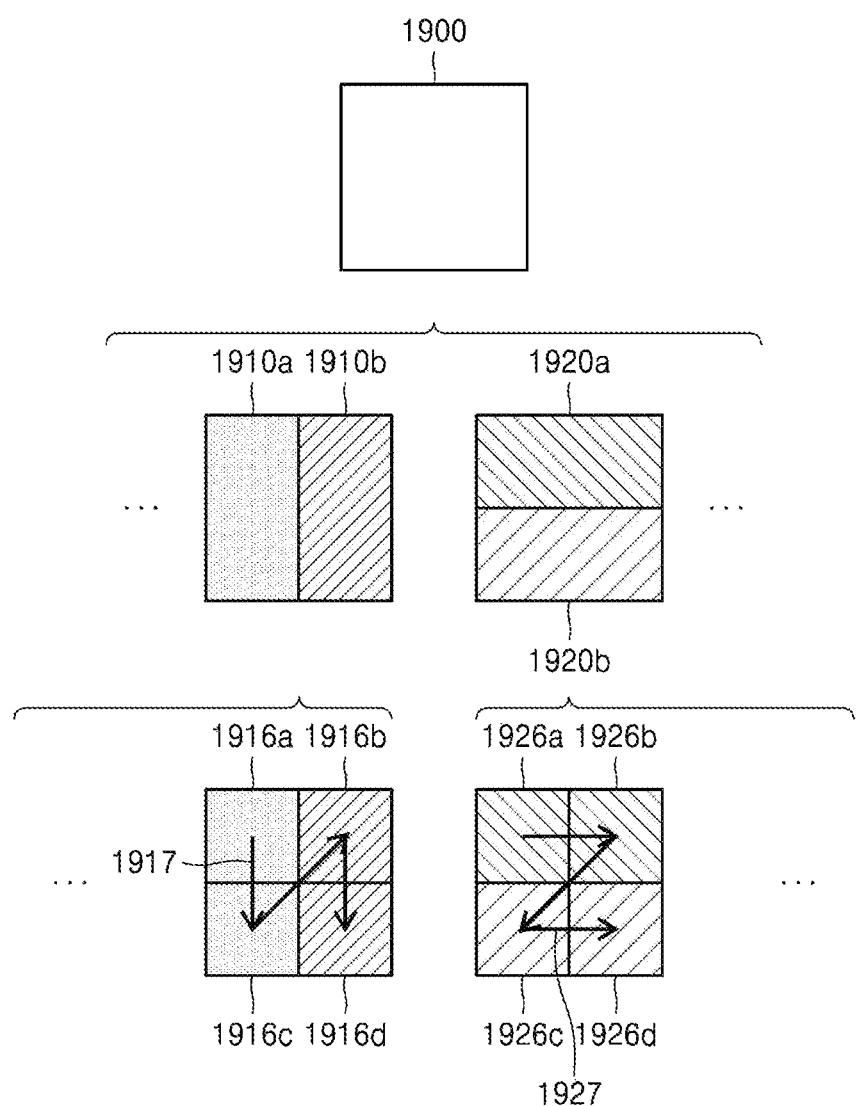
FIG. 19 illustrates that a processing order of a plurality of coding units is variable depending on an operation of partitioning a coding unit, according to an embodiment.

FIG. 19 illustrates that a processing order of a plurality of coding units is variable depending on an operation of partitioning a coding unit, according to an embodiment.

According to an embodiment, the video decoding apparatus 100 may partition a first coding unit 1900, based on block shape information and partition shape information. When the block shape information indicates a square shape and the partition shape information indicates to partition the first coding unit 1900 in at least one of horizontal and vertical directions, the video decoding apparatus 100 may determine second coding units 1910a, 1910b, 1920a, and 1920b by partitioning the first coding unit 1900. Referring to FIG. 19, the non-square second coding units 1910a, 1910b, 1920a, and 1920b determined by partitioning the first coding unit 1900 in only a horizontal direction or vertical direction may be independently partitioned based on the block shape information and the partition shape information of each coding unit. For example, the video decoding apparatus 100 may determine third coding units 1916a, 1916b, 1916c, and 1916d by partitioning the second coding units 1910a and 1910b, which are generated by partitioning the first coding unit 1900 in a vertical direction, in a horizontal direction, and determine third coding units 1926a, 1926b, 1926c, and 1926d by partitioning the second coding units 1920a and 1920b, which are generated by partitioning the first coding unit 1900 in a horizontal direction, in a horizontal direction. An operation of partitioning the second coding units 1910a, 1910b, 1920a, and 1920b has been described above in relation to FIG. 17, and thus detailed descriptions thereof will not be provided herein.

According to an embodiment, the video decoding apparatus 100 may process coding units in a predetermined order. An operation of processing coding units in a predetermined order has been described above in relation to FIG. 14, and thus detailed descriptions thereof will not be provided herein. Referring to FIG. 19, the video decoding apparatus 100 may determine the four square third coding units 1916a, 1916b, 1916c, 1916d, 1926a, 1926b, 1926c, and 1926d by partitioning the square first coding unit 1900. According to an embodiment, the video decoding apparatus 100 may determine a processing order of the third coding units 1916a, 1916b, 1916c, 1916d, 1926a, 1926b, 1926c, and 1926d based on a partitioning method of the first coding unit 1900.

According to an embodiment, the video decoding apparatus 100 may determine the third coding units 1916a, 1916b, 1916c, and 1916d by partitioning the second coding units 1910a and 1910b generated by partitioning the first coding unit 1900 in a vertical direction, in a horizontal direction, and process the third coding units 1916a, 1916b, 1916c, and 1916d in a processing order 1917 for initially processing the third coding units 1916a and 1916c, which are included in the left second coding unit 1910a, in a vertical direction and then processing the third coding unit 1916b and 1916d, which are included in the right second coding unit 1910b, in a vertical direction.

According to an embodiment, the video decoding apparatus 100 may determine the third coding units 1926a, 1926b, 1926c, and 1926d by partitioning the second coding units 1920a and 1920b generated by partitioning the first coding unit 1900 in a horizontal direction, in a vertical direction, and process the third coding units 1926a, 1926b, 1926c, and 1926d in a processing order 1927 for initially processing the third coding units 1926a and 1926b, which are included in the upper second coding unit 1920a, in a horizontal direction and then processing the third coding unit 1926c and 1926d, which are included in the lower second coding unit 1920b, in a horizontal direction.

Referring to FIG. 19, the square third coding units 1916a, 1916b, 1916c, 1916d, 1926a, 1926b, 1926c, and 1926d may be determined by partitioning the second coding units 1910a, 1910b, 1920a, and 1920b. Although the second coding units 1910a and 1910b are determined by partitioning the first coding unit 1900 in a vertical direction differently from the second coding units 1920a and 1920b which are determined by partitioning the first coding unit 1900 in a horizontal direction, the third coding units 1916a, 1916b, 1916c, 1916d, 1926a, 1926b, 1926c, and 1926d partitioned therefrom eventually show same-shaped coding units partitioned from the first coding unit 1900. As such, by recursively partitioning a coding unit in different manners based on at least one of the block shape information and the partition shape information, the video decoding apparatus 100 may process a plurality of coding units in different orders even when the coding units are eventually determined to the same shape.

FIG. 20 illustrates an operation of determining a depth of a coding unit as the shape and size of the coding unit varies when a plurality of coding units are determined by recursively partitioning the coding unit, according to an embodiment.

According to an embodiment, the video decoding apparatus 100 may determine the depth of the coding unit based on a predetermined criterion. For example, the predetermined criterion may be the length of a long side of the coding unit. When the length of a long side of a coding unit before being partitioned is 2n times (n>0) the length of a long side of a partitioned current coding unit, the video decoding apparatus 100 may determine that a depth of the current coding unit is increased from a depth of the coding unit before being partitioned, by n. In the following description, a coding unit having an increased depth is expressed as a coding unit of a deeper depth.

Referring to FIG. 20, according to an embodiment, the video decoding apparatus 100 may determine a second coding unit 2002 and a third coding unit 2004 of deeper depths by partitioning a square first coding unit 2000 based on block shape information indicating a square shape (for example, the block shape information may be expressed as '0: SQUARE'). Assuming that the size of the square first coding unit 2000 is 2N×2N, the second coding unit 2002 determined by reducing a width and height of the first coding unit 2000 to ½1 may have a size of N×N. Furthermore, the third coding unit 2004 determined by reducing a width and height of the second coding unit 2002 to ½ may have a size of N/2×N/2. In this case, a width and height of the third coding unit 2004 are ½^2 times those of the first coding unit 2000. When a depth of the first coding unit 2000 is D, a depth of the second coding unit 2002, the width and height of which are ½1 times those of the first coding unit 2000, may be D+1, and a depth of the third coding unit 2004, the width and height of which are ½^2 times those of the first coding unit 2000, may be D+2.

According to an embodiment, the video decoding apparatus 100 may determine a second coding unit 2012 or 2022 and a third coding unit 2014 or 2024 of deeper depths by partitioning a non-square first coding unit 2010 or 2020 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The video decoding apparatus 100 may determine a second coding unit 2002, 2012, or 2022 by dividing at least one of a width and height of the first coding unit 2010 having a size of N×2N. That is, the video decoding apparatus 100 may determine the second coding unit 2002 having a size of N×N or the second coding unit 2022 having a size of N×N/2 by partitioning the first coding unit 2010 in a horizontal direction, or determine the second coding unit 2012 having a size of N/2×N by partitioning the first coding unit 2010 in horizontal and vertical directions.

According to an embodiment, the video decoding apparatus 100 may determine the second coding unit 2002, 2012, or 2022 by dividing at least one of a width and height of the first coding unit 2020 having a size of 2N×N. That is, the video decoding apparatus 100 may determine the second coding unit 2002 having a size of N×N or the second coding unit 2012 having a size of N/2×N by partitioning the first coding unit 2020 in a vertical direction, or determine the second coding unit 2022 having a size of N×N/2 by partitioning the first coding unit 2020 in horizontal and vertical directions.

According to an embodiment, the video decoding apparatus 100 may determine a third coding unit 2004, 2014, or 2024 by dividing at least one of a width and height of the second coding unit 2002 having a size of N×N. That is, the video decoding apparatus 100 may determine the third coding unit 2004 having a size of N/2×N/2, the third coding unit 2014 having a size of N/2^2×N/2, or the third coding unit 2024 having a size of N/2×N/2^2 by partitioning the second coding unit 2002 in vertical and horizontal directions.

According to an embodiment, the video decoding apparatus 100 may determine the third coding unit 2004, 2014, or 2024 by dividing at least one of a width and height of the second coding unit 2012 having a size of N/2×N. That is, the video decoding apparatus 100 may determine the third coding unit 2004 having a size of N/2×N/2 or the third coding unit 2024 having a size of N/2×N/2^2 by partitioning the second coding unit 2012 in a horizontal direction, or determine the third coding unit 2014 having a size of N/2^2×N/2 by partitioning the second coding unit 2012 in vertical and horizontal directions.

According to an embodiment, the video decoding apparatus 100 may determine the third coding unit 2004, 2014, or 2024 by dividing at least one of a width and height of the second coding unit 2022 having a size of N×N/2. That is, the video decoding apparatus 100 may determine the third coding unit 2004 having a size of N/2×N/2 or the third coding unit 2014 having a size of N/2^2×N/2 by partitioning the second coding unit 2022 in a vertical direction, or determine the third coding unit 2024 having a size of N/2×N/2^2 by partitioning the second coding unit 2022 in vertical and horizontal directions.

According to an embodiment, the video decoding apparatus 100 may partition the square coding unit 2000, 2002, or 2004 in a horizontal or vertical direction. For example, the video decoding apparatus 100 may determine the first coding unit 2010 having a size of N×2N by partitioning the first coding unit 2000 having a size of 2N×2N in a vertical direction, or determine the first coding unit 2020 having a size of 2N×N by partitioning the first coding unit 2000 in a horizontal direction. According to an embodiment, when a depth is determined based on the length of the longest side of a coding unit, a depth of a coding unit determined by partitioning the first coding unit 2000 having a size of 2N×2N in a horizontal or vertical direction may be the same as the depth of the first coding unit 2000.

According to an embodiment, a width and height of the third coding unit 2014 or 2024 may be ½^2 times those of the first coding unit 2010 or 2020. When a depth of the first coding unit 2010 or 2020 is D, a depth of the second coding unit 2012 or 2022, the width and height of which are ½ times those of the first coding unit 2010 or 2020, may be D+1, and a depth of the third coding unit 2014 or 2024, the width and height of which are ½^2 times those of the first coding unit 2010 or 2020, may be D+2.

Figure 21:
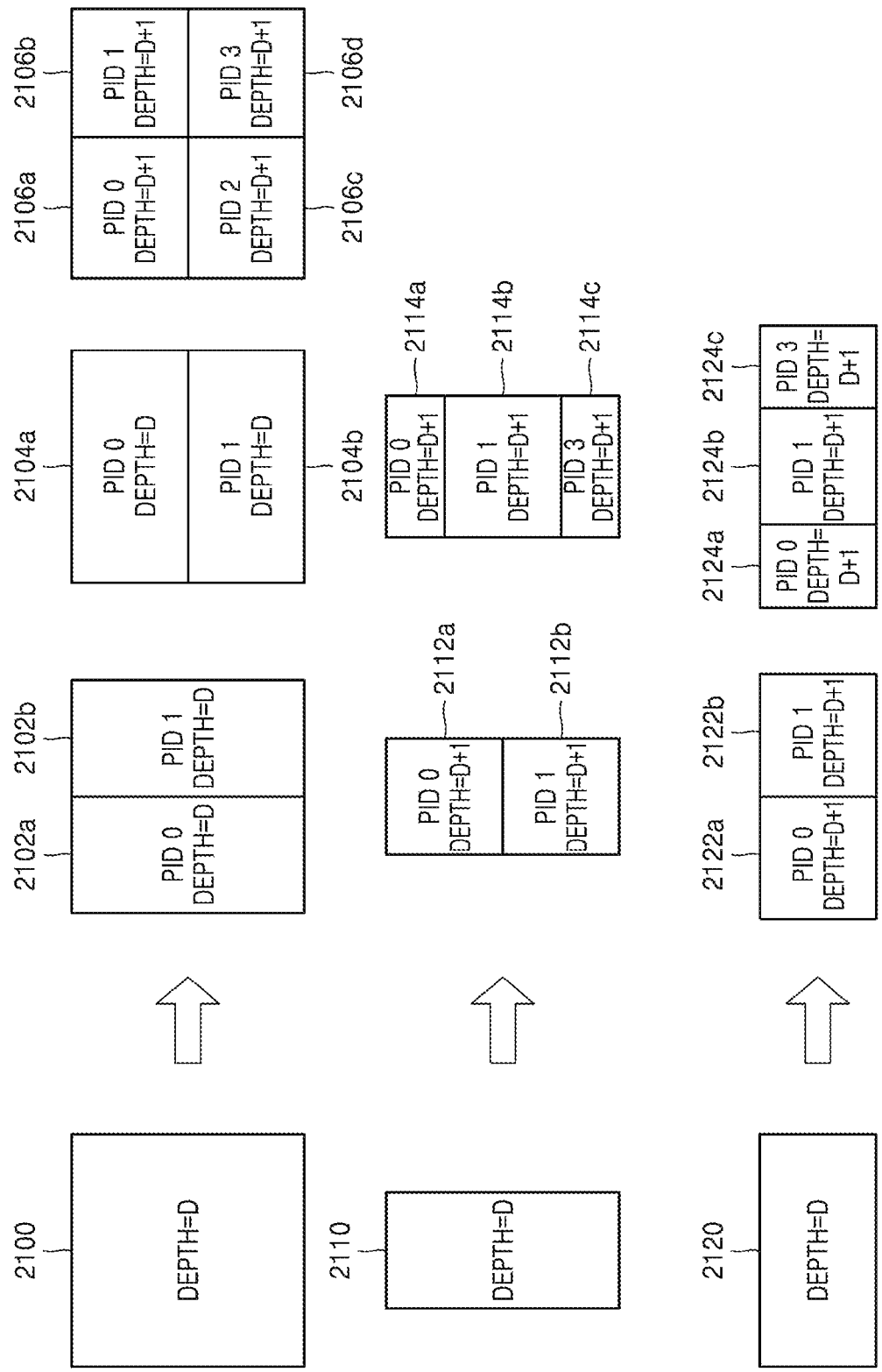
FIG. 21 illustrates depths of coding units and part indices (PIDs) for distinguishing the coding units, which are determinable based on the shapes and sizes of the coding units, according to an embodiment.

FIG. 21 illustrates depths of coding units and part indices (PIDs) for distinguishing the coding units, which may be determined based on the shapes and sizes of the coding units, according to an embodiment.

According to an embodiment, the video decoding apparatus 100 may determine various-shaped second coding units by partitioning a square first coding unit 2100. Referring to FIG. 21, the video decoding apparatus 100 may determine second coding units 2102a, 2102b, 2104a, 2104b, 2106a, 2106b, 2106c, and 2106d by partitioning the first coding unit 2100 in at least one of vertical and horizontal directions based on partition shape information. That is, the video decoding apparatus 100 may determine the second coding units 2102a, 2102b, 2104a, 2104b, 2106a, 2106b, 2106c, and 2106d based on the partition shape information of the first coding unit 2100.

According to an embodiment, a depth of the second coding units 2102a, 2102b, 2104a, 2104b, 2106a, 2106b, 2106c, and 2106d, which are determined based on the partition shape information of the square first coding unit 2100, may be determined based on the length of a long side thereof. For example, since the length of a side of the square first coding unit 2100 equals the length of a long side of the non-square second coding units 2102a, 2102b, 2104a, and 2104b, the first coding unit 2100 and the non-square second coding units 2102a, 2102b, 2104a, and 2104b may have the same depth, e.g., D. However, when the video decoding apparatus 100 partitions the first coding unit 2100 into the four square second coding units 2106a, 2106b, 2106c, and 2106d based on the partition shape information, since the length of a side of the square second coding units 2106a, 2106b, 2106c, and 2106d is ½ times the length of a side of the first coding unit 2100, a depth of the second coding units 2106a, 2106b, 2106c, and 2106d may be D+1 which is deeper than the depth D of the first coding unit 2100 by 1.

According to an embodiment, the video decoding apparatus 100 may determine a plurality of second coding units 2112a, 2112b, 2114a, 2114b, and 2114c by partitioning a first coding unit 2110, a height of which is longer than a width, in a horizontal direction based on the partition shape information. According to an embodiment, the video decoding apparatus 100 may determine a plurality of second coding units 2122a, 2122b, 2124a, 2124b, and 2124c by partitioning a first coding unit 2120, a width of which is longer than a height, in a vertical direction based on the partition shape information.

According to an embodiment, a depth of the second coding units 2112a, 2112b, 2114a, 2114b, 2114c, 2122a, 2122b, 2124a, 2124b, and 2124c, which are determined based on the partition shape information of the non-square first coding unit 2110 or 2120, may be determined based on the length of a long side thereof. For example, since the length of a side of the square second coding units 2112a and 2112b is ½ times the length of a long side of the first coding unit 2110 having a non-square shape, a height of which is longer than a width, a depth of the square second coding units 2112a and 2112b is D+1 which is deeper than the depth D of the non-square first coding unit 2110 by 1.

Furthermore, the video decoding apparatus 100 may partition the non-square first coding unit 2110 into an odd number of second coding units 2114a, 2114b, and 2114c based on the partition shape information. The odd number of second coding units 2114a, 2114b, and 2114c may include the non-square second coding units 2114a and 2114c and the square second coding unit 2114b. In this case, since the length of a long side of the non-square second coding units 2114a and 2114c and the length of a side of the square second coding unit 2114b are ½ times the length of a long side of the first coding unit 2110, a depth of the second coding units 2114a, 2114b, and 2114c may be D+1 which is deeper than the depth D of the non-square first coding unit 2110 by 1. The video decoding apparatus 100 may determine depths of coding units partitioned from the first coding unit 2120 having a non-square shape, a width of which is longer than a height, by using the above-described method of determining depths of coding units partitioned from the first coding unit 2110.

According to an embodiment, the video decoding apparatus 100 may determine PIDs for identifying partitioned coding units, based on a size ratio between the coding units when an odd number of partitioned coding units do not have equal sizes. Referring to FIG. 21, a coding unit 2114b of a center location among an odd number of partitioned coding units 2114a, 2114b, and 2114c may have a width equal to that of the other coding units 2114a and 2114c and a height which is two times that of the other coding units 2114a and 2114c. That is, in this case, the coding unit 2114b at the center location may include two of the other coding unit 2114a or 2114c. Therefore, assuming that a PID of the coding unit 2114b at the center location is 1 based on a scan order, a PID of the coding unit 2114c located next to the coding unit 2114b may be increased by 2 and thus may be 3. That is, discontinuity in PID values may be present. According to an embodiment, the video decoding apparatus 100 may determine whether an odd number of partitioned coding units do not have equal sizes, based on whether discontinuity is present in PIDs for identifying the partitioned coding units.

According to an embodiment, the video decoding apparatus 100 may determine whether to use a specific partitioning method, based on PID values for identifying a plurality of coding units determined by partitioning a current coding unit. Referring to FIG. 21, the video decoding apparatus 100 may determine an even number of coding units 2112a and 2112b or an odd number of coding units 2114a, 2114b, and 2114c by partitioning the first coding unit 2110 having a rectangular shape, a height of which is longer than a width. The video decoding apparatus 100 may use PIDs to identify a plurality of coding units. According to an embodiment, the PID may be obtained from a sample of a predetermined location of each coding unit (e.g., a top left sample).

According to an embodiment, the video decoding apparatus 100 may determine a coding unit at a predetermined location from among the partitioned coding units, by using the PIDs for distinguishing the coding units. According to an embodiment, when the partition shape information of the first coding unit 2110 having a rectangular shape, a height of which is longer than a width, indicates to partition a coding unit into three coding units, the video decoding apparatus 100 may partition the first coding unit 2110 into three coding units 2114a, 2114b, and 2114c. The video decoding apparatus 100 may assign a PID to each of the three coding units 2114a, 2114b, and 2114c. The video decoding apparatus 100 may compare PIDs of an odd number of partitioned coding units to determine a coding unit at a center location from among the coding units. The video decoding apparatus 100 may determine the coding unit 2114b having a PID corresponding to a middle value among the PIDs of the coding units, as the coding unit at the center location from among the coding units determined by partitioning the first coding unit 2110. According to an embodiment, the video decoding apparatus 100 may determine PIDs for distinguishing partitioned coding units, based on a size ratio between the coding units when the partitioned coding units do not have equal sizes. Referring to FIG. 21, the coding unit 2114b generated by partitioning the first coding unit 2110 may have a width equal to that of the other coding units 2114a and 2114c and a height which is two times that of the other coding units 2114a and 2114c. In this case, assuming that the PID of the coding unit 2114b at the center location is 1, the PID of the coding unit 2114c located next to the coding unit 2114b may be increased by 2 and thus may be 3. When the PID is not uniformly increased as described above, the video decoding apparatus 100 may determine that a coding unit is partitioned into a plurality of coding units including a coding unit having a size different from that of the other coding units. According to an embodiment, when the partition shape information indicates to partition a coding unit into an odd number of coding units, the video decoding apparatus 100 may partition a current coding unit in such a manner that a coding unit of a predetermined location among an odd number of coding units (e.g., a coding unit of a centre location) has a size different from that of the other coding units. In this case, the video decoding apparatus 100, may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the video decoding apparatus 100 may use a predetermined data unit where a coding unit starts to be recursively partitioned.

Figure 22:
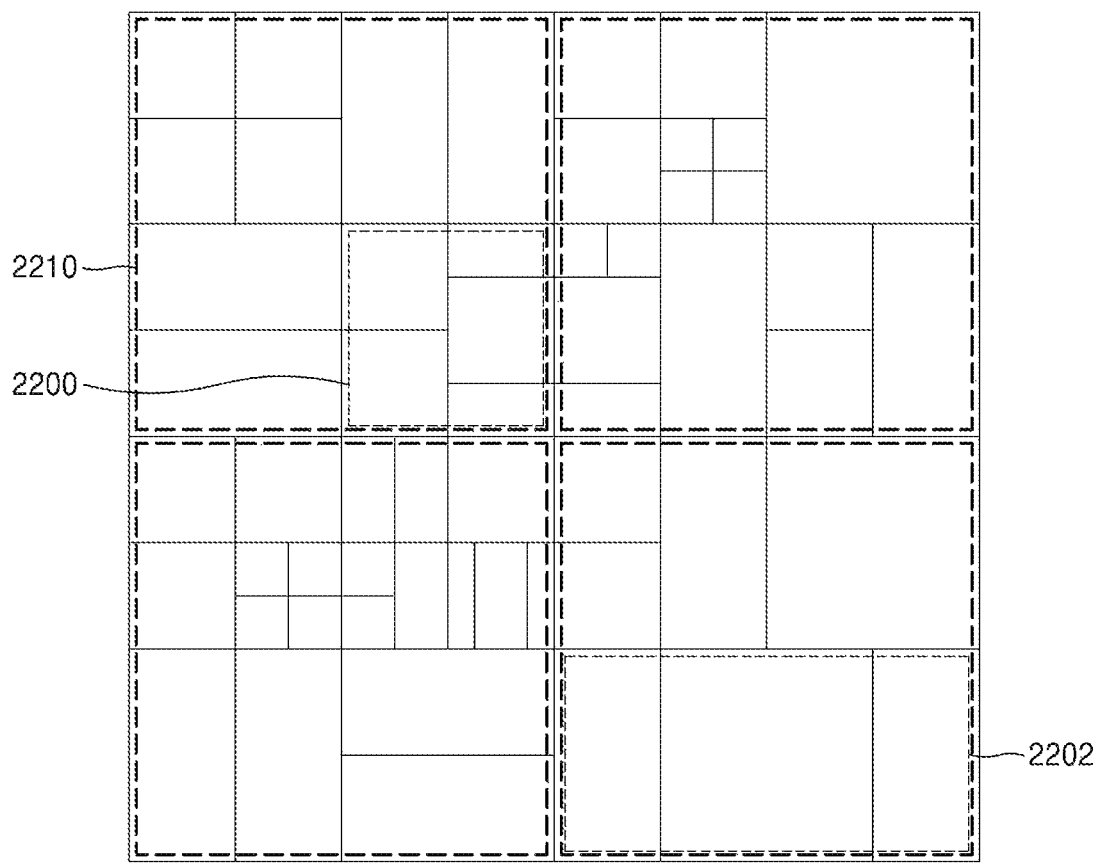
FIG. 22 illustrates that a plurality of coding units are determined based on a plurality of predetermined data units included in a picture, according to an embodiment.

FIG. 22 illustrates that a plurality of coding units are determined based on a plurality of predetermined data units included in a picture, according to an embodiment.

According to an embodiment, a predetermined data unit may be defined as a data unit where a coding unit starts to be recursively partitioned by using at least one of block shape information and partition shape information. That is, the predetermined data unit may correspond to a coding unit of an uppermost depth, which is used to determine a plurality of coding units partitioned from a current picture. In the following description, for convenience of explanation, the predetermined data unit is referred to as a reference data unit.

According to an embodiment, the reference data unit may have a predetermined size and shape. According to an embodiment, the reference data unit may include M×N samples. Herein, M and N may be equal values, and may be integers expressed as multipliers of 2. That is, the reference data unit may have a square or non-square shape, and may be an integer number of coding units.

According to an embodiment, the video decoding apparatus 100 may partition the current picture into a plurality of reference data units. According to an embodiment, the video decoding apparatus 100 may partition the plurality of reference data units, which are partitioned from the current picture, by using partitioning information of each reference data unit. The operation of partitioning the reference data unit may correspond to a partitioning operation using a quadtree structure.

According to an embodiment, the video decoding apparatus 100 may previously determine the minimum size allowed for the reference data units included in the current picture. As such, the video decoding apparatus 100 may determine various reference data units having sizes equal to or greater than the minimum size, and determine one or more coding units by using the block shape information and the partition shape information with reference to the determined reference data unit.

Referring to FIG. 22, the video decoding apparatus 100 may use a square reference coding unit 2200 or a non-square reference coding unit 2202. According to an embodiment, the shape and size of reference coding units may be determined based on various data units capable of including one or more reference coding units (e.g., sequences, pictures, slices, slice segments, and largest coding units).

According to an embodiment, the obtainer 110 of the video decoding apparatus 100 may obtain, from a bitstream, at least one of reference coding unit shape information and reference coding unit size information with respect to each of the various data units. An operation of partitioning the square reference coding unit 2200 into one or more coding units has been described above in relation to the operation of partitioning the current coding unit 1000 of FIG. 10, and an operation of partitioning the non-square reference coding unit 2202 into one or more coding units has been described above in relation to the operation of partitioning the current coding unit 1100 or 1150 of FIG. 11. Thus, detailed descriptions thereof will not be provided herein.

According to an embodiment, the video decoding apparatus 100 may use a PID for identifying the size and shape of reference coding units, to determine the size and shape of reference coding units according to some data units previously determined based on a predetermined condition. That is, the obtainer 110 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, and largest coding units). The video decoding apparatus 100 may determine the size and shape of reference data units with respect to each data unit, which satisfies the predetermined condition, by using the PID. When the reference coding unit shape information and the reference coding unit size information are obtained and used from the bitstream with respect to each data unit having a relatively small size, since efficiency of using the bitstream may not be good, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the video decoding apparatus 100 may determine at least one of the size and shape of reference coding units included in a data unit serving as a unit for obtaining the PID, by selecting the previously determined at least one of the size and shape of reference coding units based on the PID.

According to an embodiment, the video decoding apparatus 100 may use one or more reference coding units included in a largest coding unit. That is, a largest coding unit partitioned from a picture may include one or more reference coding units, and coding units may be determined by recursively partitioning each reference coding unit. According to an embodiment, at least one of a width and height of the largest coding unit may be integer times at least one of the width and height of the reference coding units. According to an embodiment, the size of reference coding units may be obtained by partitioning the largest coding unit n times based on a quadtree structure. That is, the video decoding apparatus 100 may determine the reference coding units by partitioning the largest coding unit n times based on a quadtree structure, and partition the reference coding unit based on at least one of the block shape information and the partition shape information according to various embodiments.

Figure 23:
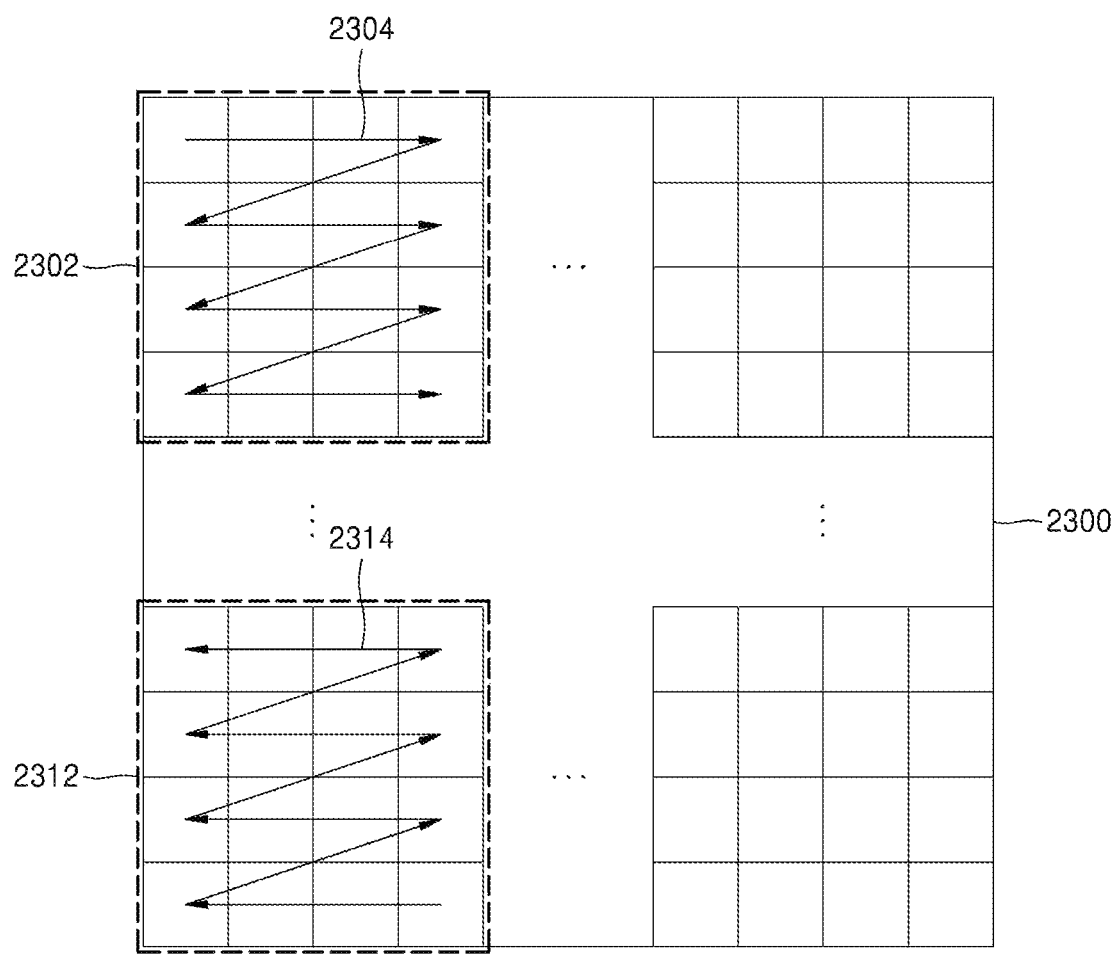
FIG. 23 illustrates a processing block serving as a unit for determining a determination order of reference coding units included in a picture, according to an embodiment.

FIG. 23 illustrates a processing block serving as a unit for determining a determination order of reference coding units included in a picture 2300, according to an embodiment.

According to an embodiment, the video decoding apparatus 100 may determine one or more processing blocks partitioned from a picture. The processing block is a data unit including one or more reference coding units partitioned from a picture, and the one or more reference coding units included in the processing block may be determined in a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the video decoding apparatus 100 may obtain processing block size information and determine the size of one or more processing blocks included in the picture. The video decoding apparatus 100 may obtain the processing block size information from a bitstream and determine the size of one or more processing blocks included in the picture. The size of processing blocks may be a predetermined size of data units, which is indicated by the processing block size information.

According to an embodiment, the obtainer 110 of the video decoding apparatus 100 may obtain the processing block size information from the bitstream with respect to each specific data unit. For example, the processing block size information may be obtained from the bitstream in a data unit such as image, sequence, picture, slice, or slice segment. That is, the obtainer 110 may obtain the processing block size information from the bitstream with respect to each of the various data units, and the video decoding apparatus 100 may determine the size of one or more processing blocks, which are partitioned from the picture, by using the obtained processing block size information. The size of processing blocks may be integer times that of the reference coding units.

According to an embodiment, the video decoding apparatus 100 may determine the size of processing blocks 2302 and 2312 included in the picture 2300. For example, the video decoding apparatus 100 may determine the size of processing blocks based on the processing block size information obtained from the bitstream. Referring to FIG. 23, according to an embodiment, the video decoding apparatus 100 may determine a width of the processing blocks 2302 and 2312 to be four times the width of the reference coding units, and determine a height of the processing blocks 2302 and 2312 to be four times the height of the reference coding units. The video decoding apparatus 100 may determine a determination order of one or more reference coding units in one or more processing blocks.

According to an embodiment, the video decoding apparatus 100 may determine the processing blocks 2302 and 2312, which are included in the picture 2300, based on the size of processing blocks, and determine a determination order of one or more reference coding units in the processing blocks 2302 and 2312. According to an embodiment, determination of reference coding units may include determination of the size of reference coding units.

According to an embodiment, the video decoding apparatus 100 may obtain, from the bitstream, determination order information of one or more reference coding units included in one or more processing blocks, and determine a determination order to one or more reference coding units based on the obtained determination order information. The determination order information may be defined as an order or direction for determining the reference coding units in the processing block. That is, the determination order of reference coding units may be independently determined with respect to each processing block.

According to an embodiment, the video decoding apparatus 100 may obtain the determination order information of reference coding units from the bitstream with respect to each specific data unit. For example, the obtainer 110 may obtain the determination order information of reference coding units from the bitstream with respect to each data unit such as image, sequence, picture, slice, slice segment, or processing block. Since the determination order information of reference coding units indicates an order for determining reference coding units in a processing block, the determination order information may be obtained with respect to each specific data unit including an integer number of processing blocks.

According to an embodiment, the video decoding apparatus 100 may determine one or more reference coding units based on the determined determination order.

According to an embodiment, the obtainer 110 may obtain the determination order information of reference coding units from the bitstream as information related to the processing blocks 2302 and 2312, and the video decoding apparatus 100 may determine a determination order of one or more reference coding units included in the processing blocks 2302 and 2312 and determine one or more reference coding units, which are included in the picture 2300, based on the determination order. Referring to FIG. 23, the video decoding apparatus 100 may determine determination orders 2304 and 2314 of one or more reference coding units in the processing blocks 2302 and 2312, respectively. For example, when the determination order information of reference coding units is obtained with respect to each processing block, different types of the determination order information of reference coding units may be obtained for the processing blocks 2302 and 2312. When the determination order 2304 of reference coding units in the processing block 2302 is a raster scan order, reference coding units included the processing block 2302 may be determined in a raster scan order. Unlike this, when the determination order 2314 of reference coding units in the other processing block 2312 is an inverse raster scan order, reference coding units included in the processing block 2312 may be determined in an inverse raster scan order.

According to an embodiment, the video decoding apparatus 100 may decode the determined one or more reference coding units. The video decoding apparatus 100 may decode the picture based on the reference coding units determined as described above. A method of decoding the reference coding units may include various image decoding methods.

According to an embodiment, the video decoding apparatus 100 may obtain block shape information indicating the shape of a current coding unit or partition shape information indicating a partitioning method of the current coding unit, from the bitstream, and use the obtained information. The block shape information or the partition shape information may be included in the bitstream related to various data units. For example, the video decoding apparatus 100 may use the block shape information or the partition shape information included in a sequence parameter set, a picture parameter set, a video parameter set, a slice header, or a slice segment header. Furthermore, the video decoding apparatus 100 may obtain syntax corresponding to the block shape information or the partition shape information from the bitstream with respect to each largest coding unit, reference coding unit, or processing block, and use the obtained syntax.

While the present disclosure has been particularly shown and described with reference to embodiments thereof, it will be understood by one of ordinary skill in the art that various changes in form and details may be made therein without departing from the scope of the disclosure as defined by the following claims. The embodiments should be considered in a descriptive sense only and not for purposes of limitation. Therefore, the scope of the disclosure is defined not by the detailed description of the disclosure but by the following claims, and all differences within the scope will be construed as being included in the present disclosure.

Meanwhile, the afore-described embodiments of the present disclosure can be written as computer programs and can be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

The invention claimed is:

1. A video decoding method comprising:
obtaining, from a bitstream, information about a prediction mode of a current block;
when the prediction mode of the current block is an intra mode, obtaining information about an intra prediction mode of the current block; and
obtaining a predicted sample value of the current block by using at least two samples in at least two lines in a plurality of lines that are from among samples comprised in an adjacent reference region of the plurality of lines and is located, from the current block, in an intra prediction direction indicated by an intra prediction mode,
wherein the adjacent reference region of the plurality of lines comprises a plurality of lines that are in a vertical direction and located at a left outside of the current block, or a plurality of lines that are in a horizontal direction and located at an upper outside of the current block, and
wherein the at least two samples include at least one sample in each of the at least two lines.

2. The video decoding method of claim 1, wherein, when the intra prediction direction indicates an omni-direction based on a direct current (DC) mode,
the obtaining of the predicted sample value of the current block comprises:
calculating an average value of samples comprised in the adjacent reference region of the plurality of lines at the left outside or the upper outside of the current block; and
obtaining the predicted sample value of the current block by using the calculated average value of the samples.

3. The video decoding method of claim 2, wherein
the adjacent reference region of the plurality of lines is a reference region of N left lines or N upper lines (where N is an integer equal to or greater than 1) adjacent to an upper left corner of the current block, and
N is determined based on a size of the current block.

4. The video decoding method of claim 2, wherein the calculating of the average value of the samples comprises calculating an average value of samples comprised in the adjacent reference region of an available left line or an available upper line, based on whether a left line or an upper line located adjacent to the current block is available.

5. The video decoding method of claim 1, further comprising determining whether to obtain the predicted sample value of the current block by using an adjacent reference region of one line adjacent to the current block or whether to obtain the predicted sample value of the current block by using the adjacent reference region of the plurality of lines located adjacent to the current block,
wherein the obtaining of the predicted sample value of the current block comprises, when it is determined to obtain the predicted sample value of the current block by using the adjacent reference region of the plurality of lines located adjacent to the current block, obtaining the predicted sample value of the current block by using the at least one sample that is from among the samples comprised in the adjacent reference region of the plurality of lines and is located, from the current block, in the intra prediction direction indicated by the intra prediction mode.

6. The video decoding method of claim 1, wherein, when the intra prediction direction is a prediction direction based on a planar mode,
the obtaining of the predicted sample value of the current block comprises:
performing filtering on a plurality of first adjacent samples that are located in a horizontal direction from a first adjacent sample adjacent to a left corner of the current block;
performing filtering on a plurality of second adjacent samples that are located in a vertical direction from a second adjacent sample adjacent to an upper corner of the current block; and
obtaining the predicted sample value of the current block, based on the plurality of filtered first adjacent samples and the plurality of filtered second adjacent samples.

7. The video decoding method of claim 1, wherein, when the intra prediction direction is a specific direction based on a specific-angle directional mode,
the obtaining of the predicted sample value of the current block comprises obtaining the predicted sample value of the current block by using at least one of a plurality of first adjacent samples that are located in the specific direction from a first adjacent sample adjacent to a left corner or an upper corner of the current block.

8. The video decoding method of claim 7, wherein the obtaining of the predicted sample value of the current block by using the at least one of the plurality of first adjacent samples that are located in the specific direction from the first adjacent sample adjacent to the left corner or the upper corner of the current block comprises:
performing filtering on the plurality of first adjacent samples that are located in the specific direction from the first adjacent sample adjacent to the left corner or the upper corner of the current block; and
obtaining the predicted sample value of the current block, based on the plurality of filtered first adjacent samples, and
wherein the performing of the filtering comprises, when an extension line extending in the specific direction from the first adjacent sample adjacent to the left corner or the upper corner passes through a fractional sample location, calculating a weighted average value of adjacent integer samples, based on distances between the fractional sample location and locations of adjacent integer samples.

9. The video decoding method of claim 7, wherein the obtaining of the predicted sample value of the current block comprises:
performing filtering on the plurality of first adjacent samples by varying a weight depending on a distance between the current block and each of samples comprised in the plurality of first adjacent samples; and
obtaining the predicted sample value of the current block, based on the plurality of filtered first adjacent samples.

10. The video decoding method of claim 7, wherein the obtaining of the predicted sample value of the current block comprises:
selecting an adjacent sample from among the plurality of first adjacent samples that are distant from the current block; and
obtaining the predicted sample value of the current block by using a value of the selected adjacent sample.

11. The video decoding method of claim 1, wherein, when the intra prediction direction is a specific direction based on a specific-angle directional mode, and when an angle in the specific direction from the horizontal direction is greater than an angle in a 45-degree direction from the horizontal direction and is less than an angle in a vertical direction, the obtaining of the predicted sample value of the current block comprises:

performing filtering on a plurality of first adjacent samples located in the specific direction from a first adjacent sample adjacent to an extension line extending in the horizontal direction from an upper corner of the current block; and obtaining the predicted sample value of the current block according to the specific direction by using the plurality of filtered first adjacent samples.

12. The video decoding method of claim 1, wherein, when the intra prediction direction is a specific direction based on a specific-angle directional mode, and when an angle in the specific direction from the horizontal direction is less than an angle in a 45-degree direction from the horizontal direction, the obtaining of the predicted sample value of the current block comprises:

performing filtering on a plurality of first adjacent samples located in the specific direction from a first adjacent sample adjacent to an extension line extending in the vertical direction from a left corner of the current block; and obtaining the predicted sample value of the current block according to the specific direction by using the plurality of filtered first adjacent samples.

13. The video decoding method of claim 1, wherein the obtaining of the predicted sample value of the current block comprises:

selecting a filtering method from among a plurality of filtering methods;

performing, based on the selected filtering method, filtering on at least one sample that is from among the samples comprised in the adjacent reference region of the plurality of lines and is located, from the current block, in the intra prediction direction indicated by the intra prediction mode; and obtaining the predicted sample value of the current block, based on the filtered at least one sample.

14. A video decoding apparatus comprising:

an obtainer configured to obtain, from a bitstream, information about a prediction mode of a current block, and when the prediction mode of the current block is an intra mode, to obtain information about an intra prediction mode of the current block; and an intra predictor configured to obtain a predicted sample value of the current block by using at least two samples in at least two lines in a plurality of lines that are from among samples comprised in an adjacent reference region of the plurality of lines and is located, from the current block, in an intra prediction direction indicated by an intra prediction mode, wherein the adjacent reference region of the plurality of lines comprises a plurality of lines that are in a vertical direction and located at a left outside of the current block, or a plurality of lines that are in a horizontal direction and located at an upper outside of the current block, and wherein the at least two samples include at least one sample in each of the at least two lines.

15. A video encoding method comprising:

obtaining a predicted sample value of a current block by using at least two samples in at least two lines in a plurality of lines that are from among samples comprised in an adjacent reference region of the plurality of lines and is located, from the current block, in an intra prediction direction indicated by an intra prediction mode of the current block;

encoding the current block by using the predicted sample value; and generating a bitstream comprising information about the intra prediction mode of the current block and information about the encoded current block, wherein the adjacent reference region of the plurality of lines comprises a plurality of lines that are in a vertical direction and located at a left outside of the current block, or a plurality of lines that are in a horizontal direction and located at an upper outside of the current block, and wherein the at least two samples include at least one sample in each of the at least two lines.

* * * * *